(12) United States Patent
Itoh et al.

(10) Patent No.: US 12,371,268 B2
(45) Date of Patent: Jul. 29, 2025

(54) MOTOR UNIT AND CONVEYANCE DEVICE

(71) Applicant: ITOH DENKI CO., LTD., Kasai (JP)

(72) Inventors: Kazuo Itoh, Kasai (JP); Tatsuhiko Nakamura, Kasai (JP); Koji Ueda, Kasai (JP); Tomoya Takeuchi, Kasai (JP); Hideo Naiki, Kasai (JP); Makoto Mitsuyoshi, Kasai (JP); Kazuwo Miki, Kasai (JP)

(73) Assignee: Itoh Denki Co., Ltd., Hyogo (JP)

( * ) Notice: Subject to any disclaimer, the term of this patent is extended or adjusted under 35 U.S.C. 154(b) by 5 days.

(21) Appl. No.: 18/279,144

(22) PCT Filed: Mar. 7, 2022

(86) PCT No.: PCT/JP2022/009656
§ 371 (c)(1),
(2) Date: Aug. 28, 2023

(87) PCT Pub. No.: WO2022/191114
PCT Pub. Date: Sep. 15, 2022

(65) Prior Publication Data
US 2024/0300743 A1 Sep. 12, 2024

(30) Foreign Application Priority Data

Mar. 8, 2021 (JP) .................. 2021-036789
Oct. 12, 2021 (JP) .................. 2021-167622

(51) Int. Cl.
*B65G 13/10* (2006.01)
*B65G 13/06* (2006.01)
(52) U.S. Cl.
CPC .......... *B65G 13/10* (2013.01); *B65G 13/065* (2013.01); *B65G 2207/30* (2013.01); *B65G 2207/34* (2013.01)

(58) Field of Classification Search
CPC ...... B65G 13/10; B65G 13/06; B65G 13/065; B65G 47/54; B65G 2207/30; B65G 2207/34
See application file for complete search history.

(56) References Cited

U.S. PATENT DOCUMENTS 5,101,962 A * 4/1992 Pritchard ................. B64D 9/00
198/782
5,938,003 A  8/1999 Huber et al.
(Continued)

FOREIGN PATENT DOCUMENTS

CN  208868904 U  5/2019
JP  2015163549 A  9/2015
(Continued)

OTHER PUBLICATIONS

International Search Report for PCT/JP2022/009656.
(Continued)

*Primary Examiner* — Gene O Crawford
*Assistant Examiner* — Keith R Campbell
(74) *Attorney, Agent, or Firm* — Wood, Phillips, Katz, Clark & Mortimer

(57) ABSTRACT

Provided are a motor unit and a conveyance device. In a motor unit having a motor portion and a gear portion, the motor portion is formed by accommodating a most part of a drive motor in a housing member. The gear portion is formed by arranging at least a part of a drive gear and a plurality of small gear portions in a space surrounded by an inner tooth train portion, and the plurality of small gear portions is positioned around the drive gear in the space. Each of the plurality of small gear portions meshes with one of the drive gear and the inner tooth train portion, and each of the plurality of small gear portions rotates by rotation of the (Continued)

drive gear. At least a part of the gear portion is at a position overlapping the motor portion in plan view.

2 Claims, 31 Drawing Sheets

(56) References Cited

U.S. PATENT DOCUMENTS

| | | | | |
|---|---|---|---|---|
| 6,516,936 | B2* | 2/2003 | Nakamura | B65G 13/10 198/782 |
| 10,518,975 | B2* | 12/2019 | Itoh | B65G 43/00 |
| 10,577,189 | B2* | 3/2020 | Itoh | B65G 47/244 |
| 2008/0169171 | A1* | 7/2008 | Itoh | B65G 13/10 198/412 |
| 2013/0192954 | A1 | 8/2013 | Fourney | |
| 2017/0001811 | A1 | 1/2017 | Itoh et al. | |
| 2018/0111767 | A1 | 4/2018 | Itoh et al. | |
| 2018/0319605 | A1 | 11/2018 | Itoh et al. | |

FOREIGN PATENT DOCUMENTS

| | | |
|---|---|---|
| JP | 6166737 B2 | 6/2017 |
| KR | 20190012431 A | 2/2019 |

OTHER PUBLICATIONS

International Preliminary Report on Patentability and Written Opinion of the International Searching Authority from the International Bureau of WIPO, for International Patent Application No. PCT/JP2022/009656 issued on Sep. 12, 2023, pp. 1-4.

Guo, Yichao, "Analytical Study on Compound Planetary Gear Dynamics", Aug. 1, 2011, pp. 1-273, XP093239658.

Supplementary European Search Report, issued Jan. 24, 2025, in European Patent Application No. EP 22 76 7070.

* cited by examiner

MOTOR UNIT AND CONVEYANCE DEVICE

BACKGROUND OF THE INVENTION

Field of the Invention

The present invention relates to a motor unit that can be used in a conveyance device that conveys an object. The present invention also relates to a conveyance device including such a motor unit.

Background Art

For example, Patent Document 1 discloses a conveyance device (transfer device) capable of switching a conveyance direction of an object. A conveyance device in the related art as disclosed in Patent Document 1 is provided at a portion where conveyor lines of a conveyor device intersect, and can switch the conveyance direction of the object. That is, with the conveyance device disclosed in Patent Document 1, it is possible to switch the conveyance direction of the object, and convey the object to a desired conveyance destination.

Patent Document 1: JP 2015-163549 A

The conveyance device of the prior art selectively carries out the introduced object in two specific directions. Therefore, in order to sort the object for each conveyance destination by the conveyor device of the prior art, complicatedly branched conveyor lines are required.

Therefore, the present inventors have considered providing a conveyance unit and a conveyance device capable of carrying out the object in an arbitrary direction without requiring a large installation place.

Since such a conveyance device is used in various places, it is preferable to downsize the entire conveyance device. In a case where a large driving motor is disposed below the conveyance surface as in the conveyance device of the prior art, the height of the entire device becomes high, and there is a problem that the degree of freedom of the installation place of the conveyance device becomes low in some cases.

SUMMARY OF THE INVENTION

An object of the present invention is to provide a motor unit and a conveyance device capable of reducing the overall height.

An object of the present invention for solving the above-described problem is a motor unit that can be used in a conveyance device including block-shaped conveyance units in a matrix by replacing one of the conveyance units with the motor unit, the motor unit including: a drive motor; a drive gear; an inner tooth train portion having a continuously annular shape; and a plurality of small gear portions, the drive gear being provided on an output shaft of the drive motor, wherein the motor unit further includes: a motor portion; and a gear portion, the motor portion including a housing member accommodating a most part of the drive motor therein, the gear portion including: a space surrounded by the inner tooth train portion; at least a part of the drive gear in the space; and the plurality of small gear portions in the space, the plurality of small gear portions being positioned around the drive gear in the space, wherein each of the plurality of small gear portions meshes with the drive gear as well as the inner tooth train portion, thereby rotation of the drive gear causing rotation of each of the plurality of small gear portions, and wherein at least a part of the gear portion is at a position overlapping the motor portion in plan view.

In the motor unit of the present aspect, the gear portion is formed by arranging at least a part of the drive gear and a plurality of small gear portions in a space surrounded by the inner tooth train portion, and the gear portion can be flattened. Furthermore, by adopting a structure in which at least a part of the gear portion is arranged at a position overlapping the motor portion in plan view, the overall height of the motor unit can be reduced.

Furthermore, by replacing the motor unit with the conveyance unit, the height of the entire device can be reduced as compared with a structure in which a motor unit is arranged below the conveyance unit.

In the above-described aspect, it is preferable that the motor unit further includes an output member that outputs rotational force transmitted from the drive motor to an outside, the output member being a gear including an output tooth train portion for output on an outer peripheral portion, wherein the output member includes a gear accommodation portion, the gear accommodation portion having an opening on one end side in a thickness direction and being depressed to the other side in the thickness direction, wherein the gear accommodation portion includes: the inner tooth train portion formed on an inner peripheral wall portion; at least a part of the drive gear therein; and the plurality of small gear portions therein, and wherein when the rotational force is applied from the plurality of small gear portions, the output member rotates so as to move the output tooth train portion in a circumferential direction.

In this aspect, the entire motor unit can be flattened and the overall height of the motor unit can be further reduced as compared with a structure in which the output member and the plurality of small gear portions are arranged vertically.

In the above-described preferable aspect, it is more preferable that when the motor portion and the gear portion are laid in a posture where they vertically overlap each other, a part of the output member protrudes laterally outward from a middle portion in a vertical direction.

According to the aspect, the overall height of the motor unit can be further reduced.

In the above-described preferable aspect, it is more preferable that the output member has portions protruding laterally outward in four directions in plan view.

According to the aspect, it is possible to replace the motor unit with the conveyance units in various places, and it is possible to transmit power to the conveyance units adjacent in various directions.

It is preferable that the above-described aspect further includes: a motor unit main body portion; and an attachment member attached to the motor unit main body portion, wherein the motor unit main body portion includes the motor portion and the gear portion, wherein the attachment member includes: an attachment plate portion; and leg portions extending from the attachment plate portion, the leg portion having a contact surface part on an extended end side, wherein the motor unit can be used in: a first posture where the attachment member is attached to the motor unit main body portion in a predetermined posture; and a second posture where the attachment member is attached to the motor unit main body portion in a posture vertically opposite to the predetermined posture, and wherein the contact surface part is positioned substantially flush with one of end portions of the motor unit main body portion in a height direction in each of the first posture and the second posture.

The term "substantially flush" as used herein means that a deviation of several millimeters is allowed.

According to the aspect, the overall height of the motor unit can be reduced in each of a posture in which the motor portion is on the upper side and a posture in which the motor portion is on a side vertically opposite thereto.

Another aspect of the present invention is a conveyance device constituted by arranging the motor unit and the conveyance unit in a matrix.

Also in the conveyance device of the present aspect, the overall height of the motor unit can be reduced, and the height of the entire conveyance device can be reduced.

In the above-described aspect, it is more preferable that the conveyance unit includes a rotating body, a support body, and a driving body, the rotating body being supported by a main body of the support body via a support shaft, an orientation of the rotating body being changed by rotating the main body of the support body together with the support shaft, the rotating body is rotationally driven around the support shaft with rotation of the driving body, the conveyance device includes at least two of the motor units, the at least two of the motor units including a first and a second motor units, the first motor unit functioning as a turning motor that outputs rotational force to be transmitted to the support body, the second motor unit functioning as a traveling motor that outputs rotational force to be transmitted to the driving body, and the first and the second motor units are in vertically opposite postures.

Since the members can be made common as compared with a case where separate motors are adopted for the turning motor and the traveling motor, the manufacturing cost can be reduced.

Another aspect of the present invention is a motor unit that can be used in a conveyance device, including: a drive motor; a drive gear; an inner tooth train portion having a continuously annular shape; and a plurality of small gear portions, the drive gear being provided on an output shaft of the drive motor, wherein the motor unit further includes: a motor portion; and a gear portion, the motor portion including a housing member accommodating a most part of the drive motor therein, the gear portion including: a space surrounded by the inner tooth train portion; at least a part of the drive gear in the space; and the plurality of small gear portions in the space, the plurality of small gear portions being positioned around the drive gear in the space, wherein each of the plurality of small gear portions meshes with the drive gear as well as the inner tooth train portion, thereby rotation of the drive gear causing rotation of each of the plurality of small gear portions, and wherein at least a part of the gear portion is at a position overlapping the motor portion in plan view.

Also in the motor unit of the present aspect, the gear portion is formed by arranging at least a part of the drive gear and a plurality of small gear portions in a space surrounded by the inner tooth train portion, and the gear portion can be flattened. Furthermore, by adopting a structure in which at least a part of the gear portion is arranged at a position overlapping the motor portion in plan view, the overall height of the motor unit can be reduced.

In the above-described aspect, it is preferable that the housing member includes a gear accommodation portion that accommodates at least a part of the drive gear and the plurality of small gear portions, and the inner tooth train portion is provided on an inner peripheral surface of the gear accommodation portion.

It is more preferable that the above-described preferable aspect further includes an output member that outputs rotational force transmitted from the drive motor to an outside, wherein the output member includes: a plate-shaped portion; and an output shaft portion that protrudes outward from one end portion of the plate-shaped portion in a thickness direction, an output tooth train portion for output being formed on a protruding end side of the output shaft portion, the plurality of small gear portions each being attached to the plate-shaped portion via a shaft member, wherein with rotation of the drive gear, the plurality of small gear portions each rotates around the shaft member while revolving around the drive gear, thereby this revolution of the small gear portions causing movement of the shaft member that generates rotation of the plate-shaped portion and the output shaft portion.

A first aspect of a related invention related to the present invention is a conveyance unit including a rotating body, a support body, a driving body, and a rotational force transmission member, wherein the rotational force transmission member includes a support body-side transmission portion and a driving body-side transmission portion, the driving body has a first power transmission portion and a power applying portion, the first power transmission portion is engaged with the driving body-side transmission portion of the rotational force transmission member to perform transmission of rotational force to an outside via the driving body-side transmission portion, the rotating body has a main rotating portion and a sub rotating portion, the support body has a support shaft and a second power transmission portion, the second power transmission portion is engaged with the support body-side transmission portion of the rotational force transmission member to perform transmission of rotational force with an outside via the support body-side transmission portion, the main rotating portion and the sub rotating portion of the rotating body are attached along the support shaft of the support body, and are rotatable independently of each other around the support shaft, the driving body rotates by power around a first axis in a direction intersecting the support shaft, the main rotating portion and the sub rotating portion are in contact with the power applying portion, and rotational force is applied to at least the main rotating portion, the sub rotating portion does not come into contact with an object, the main rotating portion can come into contact with the object to apply force to the object, the support body, the driving body, and the rotational force transmission member are integrated, and the support body and the driving body are rotatable around the first axis independently of each other.

Here, the term "axis" means an axis line serving as a rotation center, and is a concept including a virtual axis line without substance. On the other hand, the term "support shaft" is a substantial "object".

According to the aspect, the conveyance unit has the rotating body, the support body, the driving body, and the rotational force transmission member, the rotational force transmission member has the support body-side transmission portion and the driving body-side transmission portion, the driving body has the first power transmission portion and the power applying portion, the rotating body has the main rotating portion and the sub rotating portion, and the support body has the support shaft and the second power transmission portion.

The first power transmission portion is engaged with the driving body-side transmission portion of the rotational force transmission member, and performs the transmission of the rotational force (power) to the outside via the driving body-side transmission portion. That is, the rotational force (power) is transmitted via the driving body-side transmission portion of the rotational force transmission member so that the driving body rotates.

The main rotating portion and the sub rotating portion of the rotating body are attached along the support shaft of the support body, and are rotatable independently of each other around the support shaft, the driving body rotates by power around the first axis in the direction intersecting the support shaft, the main rotating portion and the sub rotating portion are in contact with the power applying portion, and the rotational force (power) is applied to at least the main rotating portion. That is, in a case where the driving body rotates, at least the main rotating portion of the rotating body also rotates.

Here, the term "direction intersecting" includes a configuration intersecting an inclined direction in addition to the orthogonal direction. In addition, the term "intersect" includes a state where axes intersect three-dimensionally in addition to a case where the axes intersect each other. That is, the case of intersecting the skew state is included.

Since the main rotating portion can come into contact with the object to apply force to the object, the object can be conveyed by the rotation of the main rotating portion.

Here, the support shaft receives an external force (pressing force) from the driving body in contact with the main rotating portion and the sub rotating portion attached along the support shaft. Therefore, the force acting on the support shaft from the driving body is equalized.

In other words, an external force (pressing force) received by the support shaft from the driving body acts on the support shaft via a portion of the support shaft to which the main rotating portion is attached and a portion of the support shaft to which the sub rotating portion is attached. Here, the main rotating portion and the sub rotating portion are attached along the support shaft, and the external force does not act on a specific deviated portion of the support shaft.

That is, since the external force (pressing force) acts at portions separated along the support shaft in a state of being dispersed, the support shaft is not inclined, and thus the posture of the rotating body attached to the support shaft is stabilized.

Since the driving body comes into contact with both the main rotating portion and the sub rotating portion to transmit power, the posture of the driving body is also stabilized.

The object is not brought into contact with the sub rotating portion, and is not given force by the sub rotating portion. In other words, the object is not applied force from the sub rotating portion, and even in a case where the sub rotating portion rotates in a direction opposite to that of the main rotating portion, the object is given force and conveyed only by the main rotating portion. Therefore, the conveyance of the object is stabilized.

On the other hand, the second power transmission portion is engaged with the support body-side transmission portion of the rotational force transmission member, and performs the transmission of the rotational force (power) to the outside via the support body-side transmission portion. That is, the rotational force (power) is transmitted via the support body-side transmission portion of the rotational force transmission member so that the support body rotates. The orientation of the support shaft is changed by the rotation of the support body, and thus the force applying direction to the object by the main rotating portion is changed. Therefore, the force applying direction (conveyance direction) to the object can be changed.

The support body, the driving body, and the rotational force transmission member are integrated into a unit. That is, the configuration of the conveyance unit is completed by the support body, the driving body, and the rotational force transmission member. Therefore, the conveyance unit is easily handled.

Further, since the support body and the driving body are rotatable around the same first axis independently of each other, a region occupied by the support body and the driving body is small. That is, the conveyance unit can achieve space saving, and can be arranged in a limited region.

It is preferable that the support body-side transmission portion and the driving body-side transmission portion of the rotational force transmission member are arranged on a same second axis.

According to this configuration, since the support body-side transmission portion and the driving body-side transmission portion of the rotational force transmission member are arranged on the same second axis, a region occupied by the rotational force transmission member is small. By reducing the region occupied by the rotational force transmission member, the conveyance unit can be downsized.

It is preferable that the driving body has a plate shape having an annular structure, the power applying portion is provided on an inner peripheral portion of the driving body having the annular structure, and the first power transmission portion is provided on an outer peripheral portion of the driving body.

According to the configuration, the driving body has the plate shape having the annular structure, the power applying portion is provided on the inner peripheral portion of the driving body having the annular structure, and the first power transmission portion is provided on the outer peripheral portion of the driving body. Therefore, the height dimension of the driving body can be reduced.

It is preferable that a housing that holds the support body, the driving body, and the rotational force transmission member is provided, and the housing has an uneven fitting portion, and can be coupled to another conveyance unit via the uneven fitting portion.

According to the configuration, the housing that holds the support body, the driving body, and the rotational force transmission member is provided, and the housing has the uneven fitting portion, and can be coupled to another conveyance unit via the uneven fitting portion. Therefore, the conveyance units can be easily aligned, and the conveyance units can be easily combined. In addition, there is no concern that the conveyance units are misaligned.

It is preferable that an external shape of the combination of the main rotating portion and the sub rotating portion is a spherical shape, a barrel shape, or a columnar shape, and regardless of orientation of the rotating body, the periphery of a part of each of the main rotating portion and the sub rotating portion in the support shaft direction is in contact with the power applying portion of the driving body and the other part of the main rotating portion and the sub rotating portion are substantially not in contact with the power applying portion.

Here, the term "substantially" includes not only a state in which the main rotating portion and the sub rotating portion are not in contact at all, but also a case in which the main rotating portion and the sub rotating portion are in contact to such an extent that no force is exerted on the counterpart side.

According to the configuration, the outer shape of the combination of the main rotating portion and the sub rotating portion is bilaterally symmetrical, and it is easy to uniformly apply the external force (pressing force) to the support shaft from the driving body via the main rotating portion and the sub rotating portion. Then, regardless of the orientation of the support shaft, the periphery of a part of each of the main rotating portion and the sub rotating portion in the direction of the support shaft is in contact with the driving body, and the other parts of the main rotating portion and the sub rotating portion are substantially not in contact with the driving body. Therefore, the rotation of the main rotating portion and the sub rotating portion is stabilized. As a result, the rotating body (main rotating portion) can similarly apply force to the object in any direction.

Here, the term "external shape of the combination of the main rotating portion and the sub rotating portion" means the shape (contour) of the entire periphery including the main rotating portion and the sub rotating portion except for the facing portions of the main rotating portion and the sub rotating portion adjacent to each other.

It is preferable that portions of the main rotating portion and the sub rotating portion in contact with the power applying portion of the driving body are made of an elastically deformable material.

According to the configuration, the portions of the main rotating portion and the sub rotating portion in contact with the driving body are elastically deformed, and a region where the main rotating portion and the sub rotating portion are in contact with the driving body expands. Therefore, power is easily transmitted from the driving body to the main rotating portion and the sub rotating portion.

Here, the elastic deformation does not mean a deformation so large as to change the external shapes of the main rotating portion and the sub rotating portion, but means a local deformation to such an extent that a portion in contact with the driving body is slightly recessed.

A second aspect of the related invention is a conveyance device in which a plurality of the conveyance units are arranged in a planar shape, power is transmitted between the first power transmission portion of the adjacent conveyance units, and power is transmitted between the second power transmission portions of the adjacent conveyance units.

In the conveyance device of the present aspect, the space of the conveyance unit is saved, and in a case where the plurality of conveyance units are arranged on a surface, the interval between the main rotating portions of the rotating bodies of the conveyance units in contact with the object is narrow. Therefore, the support of the object is stabilized. In addition, the support interval of the object is narrow, the object can be supported by dispersing the weight of the object, and there is little concern that the bottom of the object is damaged.

Power is transmitted between the first power transmission members and between the second power transmission members by, for example, a gear, a chain, a belt, or the like.

According to the present invention, it is possible to provide a motor unit and a conveyance device capable of reducing the overall height.

BRIEF DESCRIPTION OF THE DRAWINGS

FIG. 20A is a side view, and FIG. 20B is a perspective view as viewed from a direction different from that in FIG. 18.

FIG. 26A is a perspective view and FIG. 26B is a side view.

DETAILED DESCRIPTION OF THE PREFERRED EMBODIMENTS

Figure 1A:
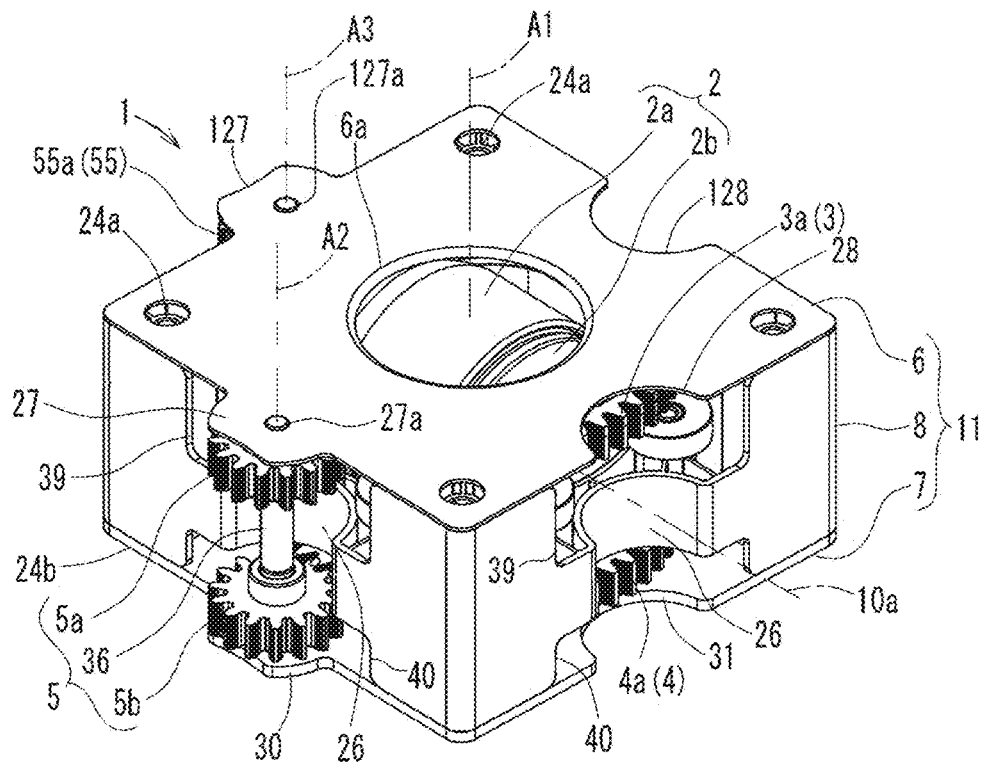
FIGS. 1A and 1B are perspective views of a conveyance unit according to an embodiment, and are perspective views viewed from different directions.

Hereinafter, description will be made with reference to the drawings.

As illustrated in FIG. 1, a conveyance unit 1 according to the present embodiment includes a rotating body 2, a support body 3, a driving body 4, and rotational force transmission members 5 and 55. The conveyance unit 1 also includes a housing 11 that fixes the driving body 4 and the rotational force transmission members 5 and 55.

The housing 11 includes a top plate 6, a bottom plate 7, and a main body 8. The housing 11 has a structure in which the upper and lower sides of the main body 8 are sandwiched between the top plate 6 and the bottom plate 7.

Figure 3:
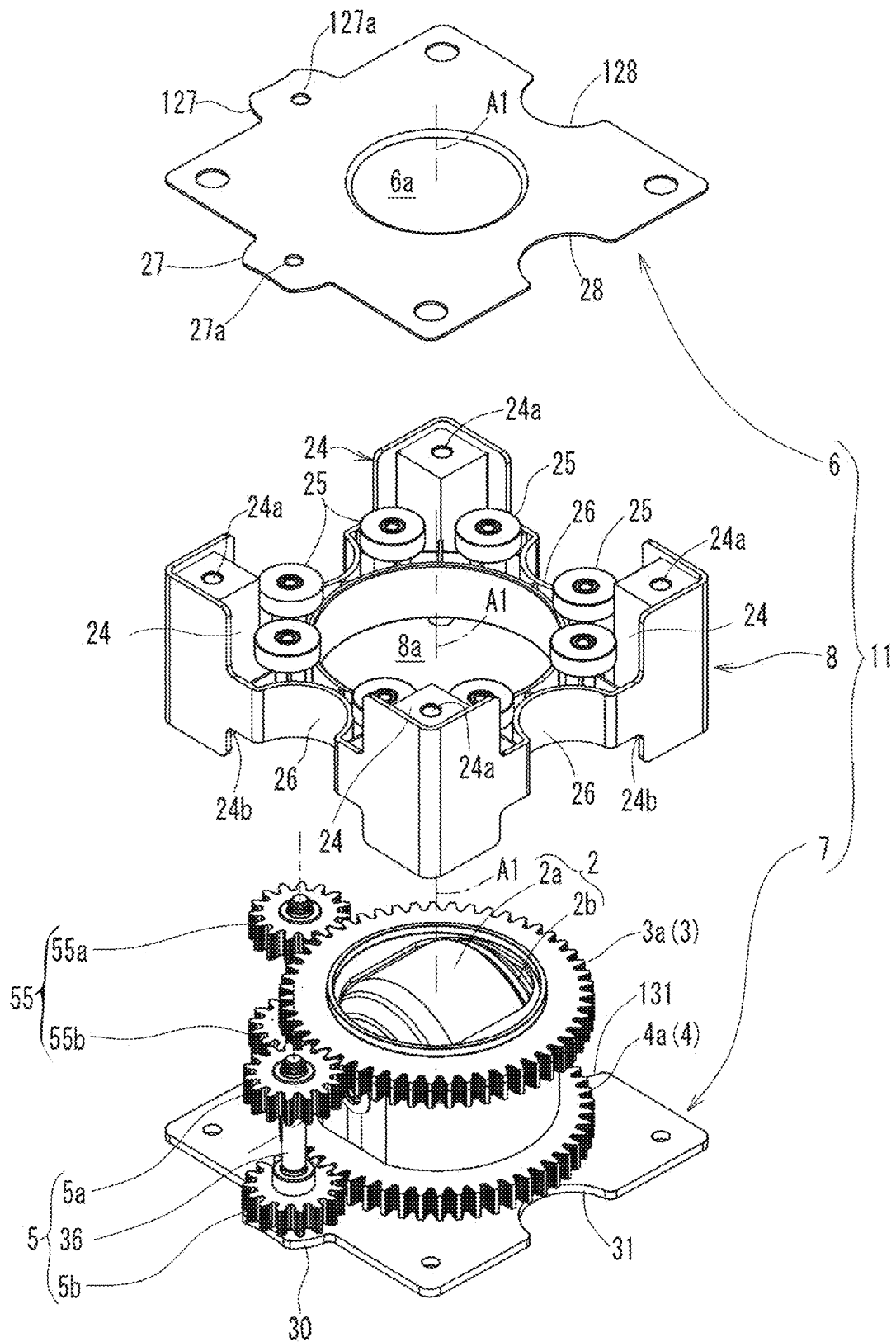
FIG. 3 is a perspective view illustrating the conveyance unit of FIG. 1 in a state where a power unit and a housing that supports the portion are separated.
Figure 4:
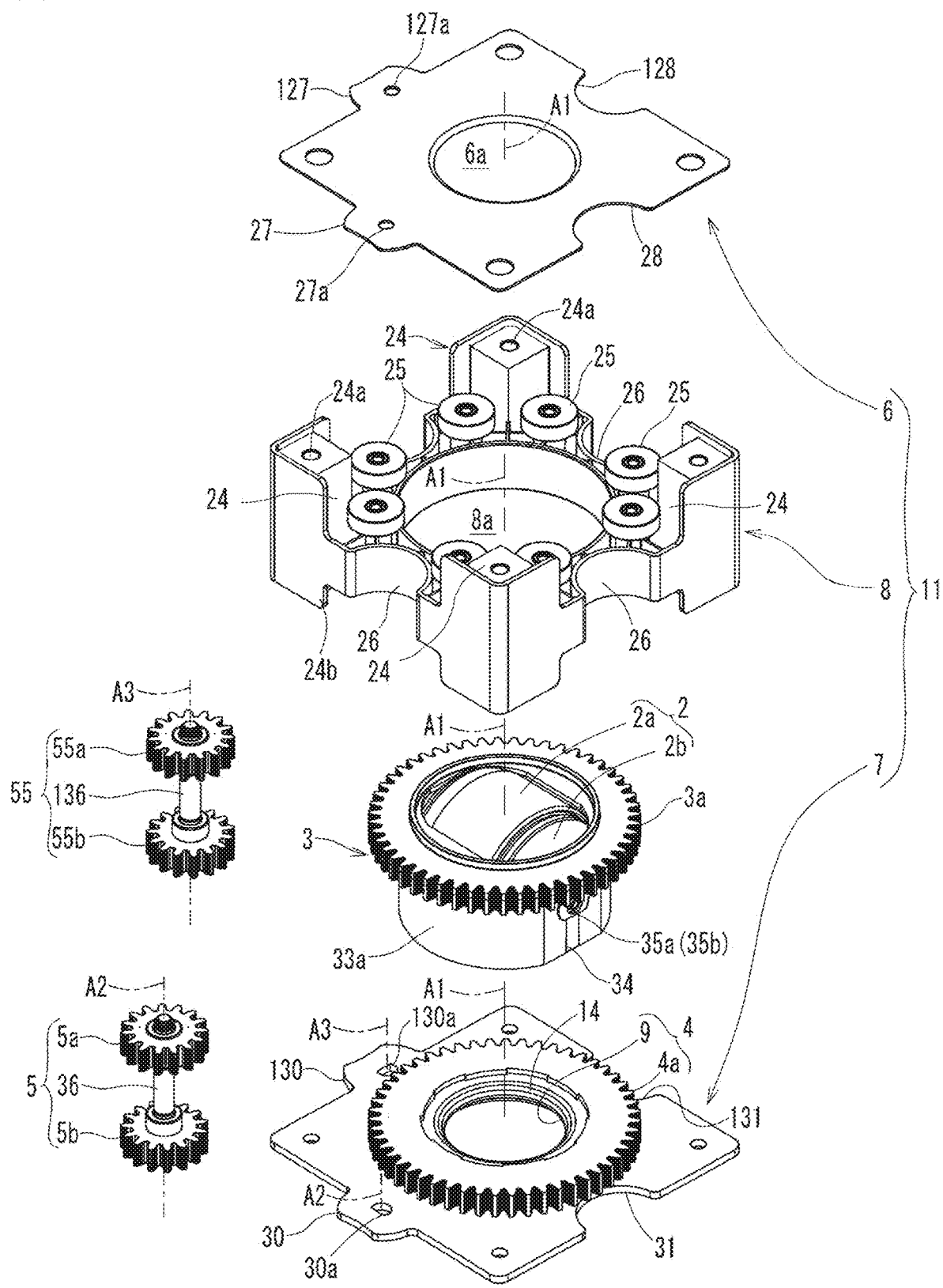
FIG. 4 is a perspective view illustrating a state in which the power unit of FIG. 3 is separated into its components.

As illustrated in FIGS. 3 and 4, the main body 8 of the housing 11 has a quadrangular outer shape, and a pillar portion 24 is provided at each of four corners of the main body 8. Each pillar portion 24 extends vertically, a fixing portion 24a for fixing the top plate 6 is provided at an upper end of the pillar portion 24, and a fixing portion 24b for fixing the bottom plate 7 is provided at a lower end of the pillar portion 24. Bearings 25 that rotate around the vertical axis are provided near the pillar portion 24. The bearings 25 are annularly arranged.

A hole 8a is opened at the center of the main body 8. That is, a space (hole 8a) is formed inside the main body 8. A part of the outer periphery of each bearing 25 enters the hole 8a.

Recess portions 26 are provided on the outer periphery of the main body 8. The recess portion 26 has a shape in which the central portions of the four sides of the quadrangle are recessed inward, and is formed between the adjacent pillar portions 24. The recess portion 26 is provided at a central portion of the main body 8 in the vertical direction.

The top plate 6 is a quadrangular plate-shaped member, and is provided with a hole 6a at the center. Protrusion portions 27 and 127 are provided on two of the four sides of the top plate 6. The protrusion portions 27 and 127 are provided with support holes 27a and 127a. Recess portions 28 and 128 are provided on the other two sides of the top plate 6. The protrusion portions 27 and 127 and the recess portions 28 and 128 correspond to the positions of the recess portions 26 of the main body 8. That is, the recess portions 26 of the main body 8 are disposed immediately below the protrusion portions 27 and 127 and the recess portions 28 and 128.

Figure 7:
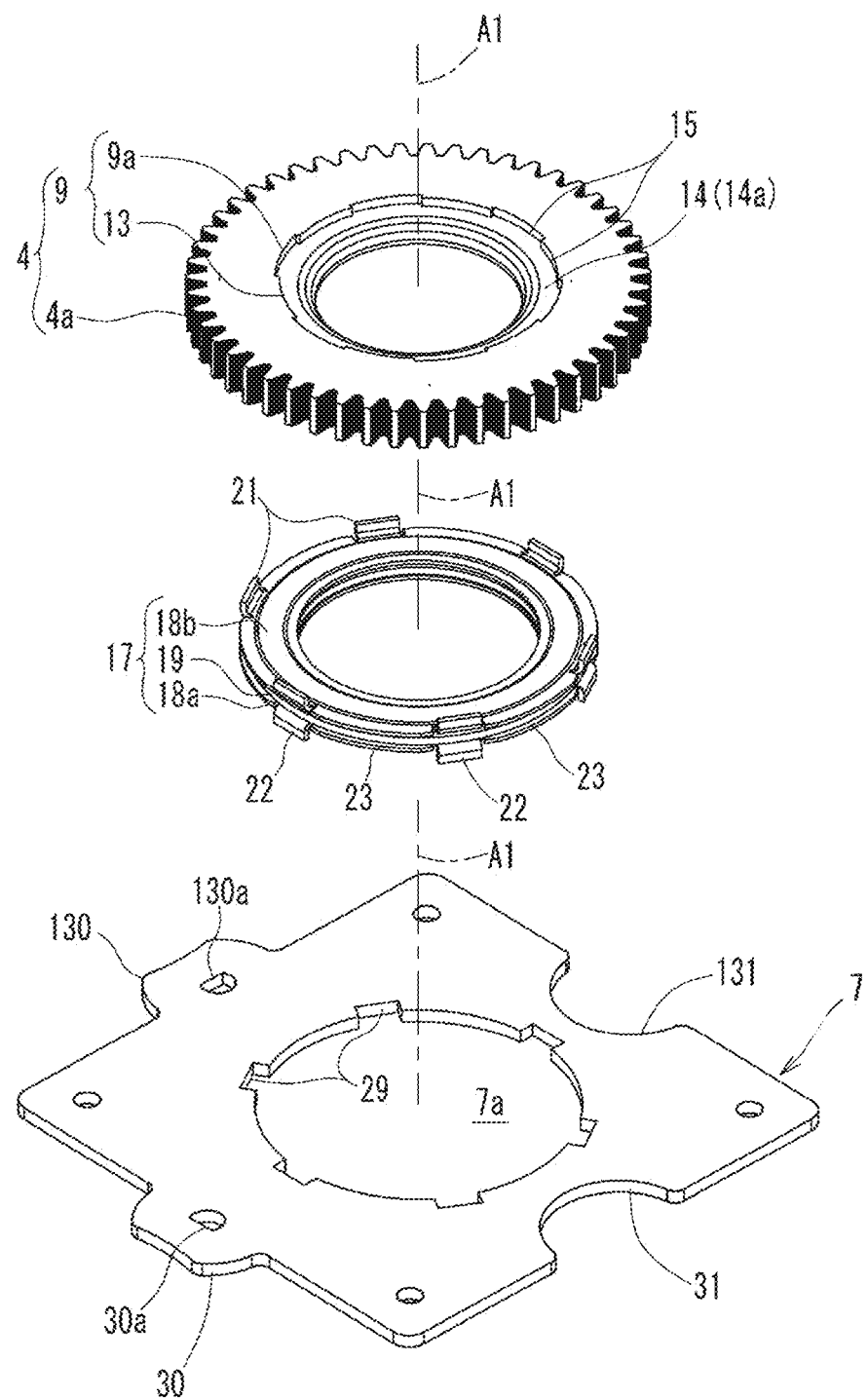
FIG. 7 is an exploded perspective view of a bottom plate and a driving body constituting a pedestal illustrated in FIG. 4 as viewed from above.

As illustrated in FIG. 7, the bottom plate 7 is a quadrangular plate-shaped member similar to the top plate 6, and is provided with a hole 7a at the center. The edge of the hole 7a is provided with notches 29 at predetermined angular intervals. In addition, similar to the top plate 6, the bottom plate 7 is provided with protrusion portions 30 and 130, and recess portions 31 and 131. The protrusion portions 30 and 130 are provided with support holes 30a and 130a. The protrusion portions 30 and 130 and the recess portions 31 and 131 are disposed immediately below the recess portions 26 of the main body 8.

The bottom plate 7 and the main body 8 are in close contact with each other at the four corners of the quadrangle, but are separated from each other at the central portions of the four sides, and an opening 40 is formed. A second power transmission portion 3a of the support body 3 in the housing 11 protrudes in a radial direction from the opening 40.

The support holes 27a and 127a of the protrusion portions 27 and 127 of the top plate 6 and the support holes 30a and 130a of the protrusion portions 30 and 130 of the bottom plate 7 are arranged on a second axis A2 and a third axis A3 extending in the vertical direction illustrated in FIG. 1A, and vertically coincide with each other.

The top plate 6 and the main body 8 are in close contact with each other at the four corners of the quadrangle, but are separated from each other at the central portions of the four sides, and an opening 39 is formed. The second power transmission portion 3a of the support body 3 in the housing 11 protrudes from the opening 39.

As illustrated in FIG. 7, the driving body 4 is installed on the bottom plate 7 via an annular thrust bearing 17.

The thrust bearing 17 includes a retainer ring 19 that holds a plurality of rolling elements 20 (FIG. 11), between a lower fixing member 18a and an upper rotating member 18b. In the rotating member 18b, protrusion engagement portions 21 protruding upward are provided at predetermined angular intervals. In the fixing member 18a, protrusion engagement portions 22 protruding downward are provided at predetermined angular intervals. Outward flange portions 23 projecting outward in the radial direction are provided between the protrusion engagement portions 22.

Each protrusion engagement portion 22 of the fixing member 18a is engaged with the notch 29 of the bottom plate 7. The outward flange portions 23 of the fixing member 18a are in contact with the edge of the hole 7a of the bottom plate 7. That is, the fixing member 18a is placed on the bottom plate 7, and cannot rotate relative to the bottom plate 7. The thrust bearing 17 is installed between the bottom plate 7 and the driving body 4, and can smoothly relatively rotationally move the bottom plate 7 and the driving body 4. In addition, the overall height of the conveyance unit 1 can be reduced by using the thrust bearing 17.

Next, the driving body 4 will be described.

Figure 8:
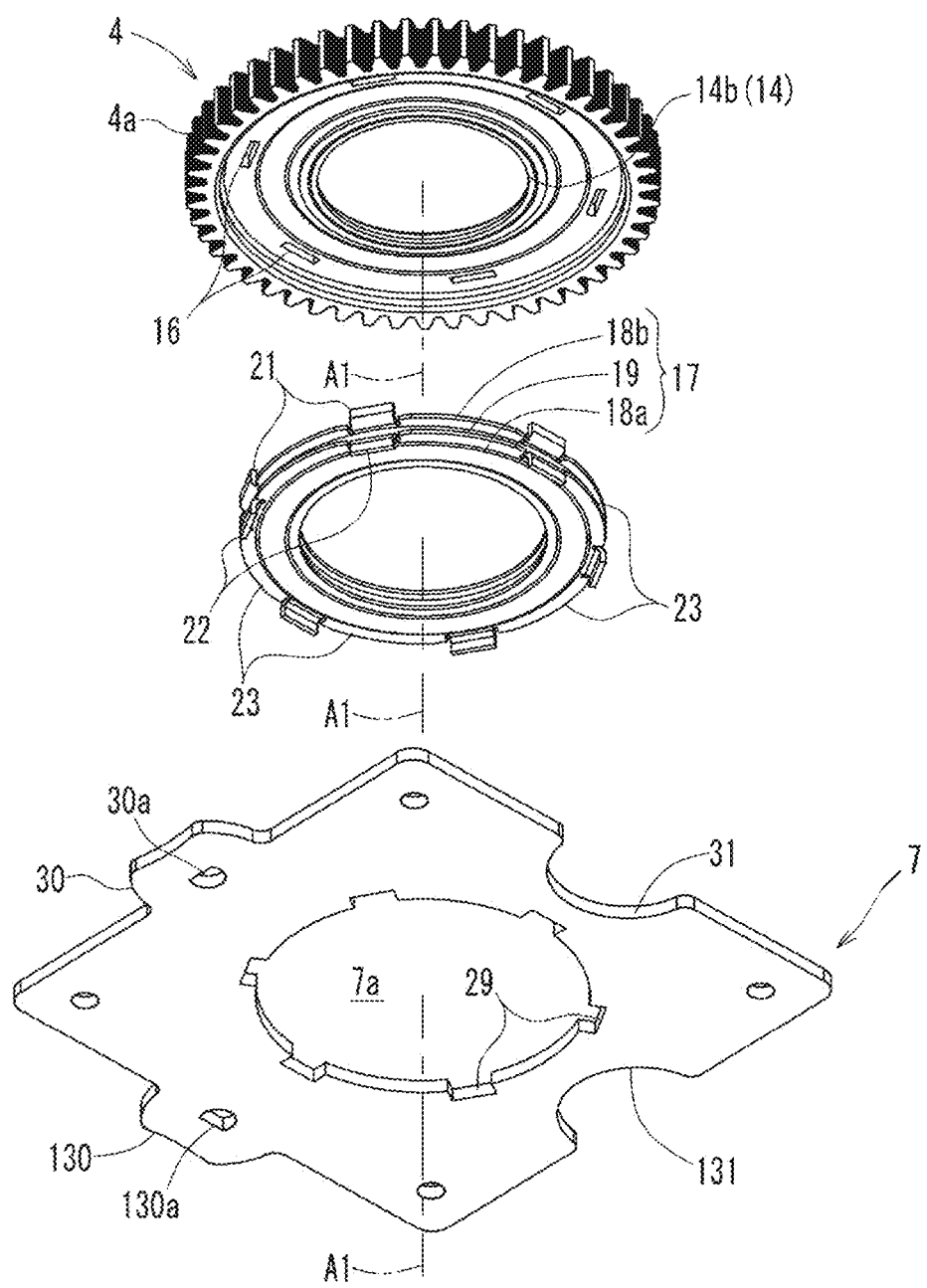
FIG. 8 is an exploded perspective view of a bottom plate and a driving body constituting a pedestal illustrated in FIG. 4 as viewed from below.
Figure 9A:
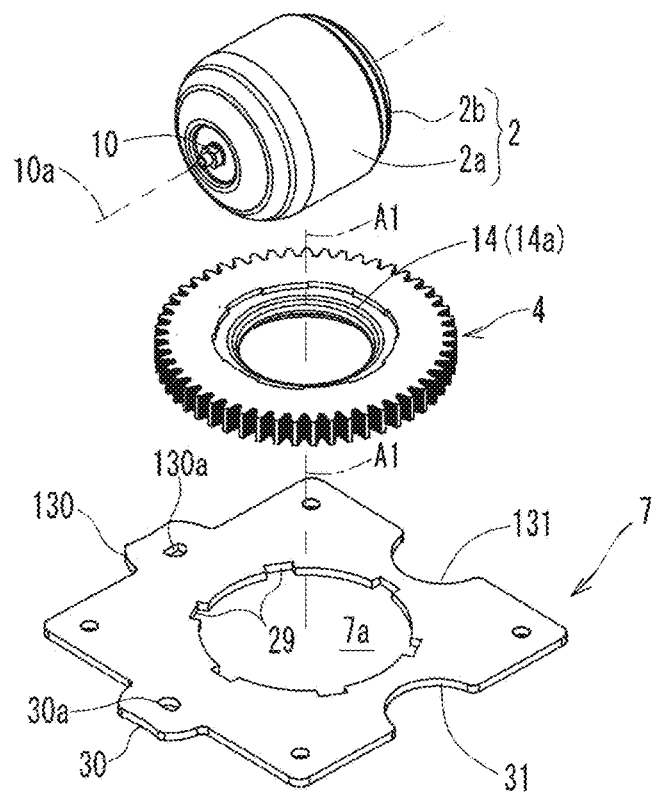
FIGS. 9A and 9B are exploded perspective views of a rotating body, a driving body, and a bottom plate, and are perspective views as viewed from above for FIG. 9A and below for FIG. 9B, respectively.
Figure 9B:
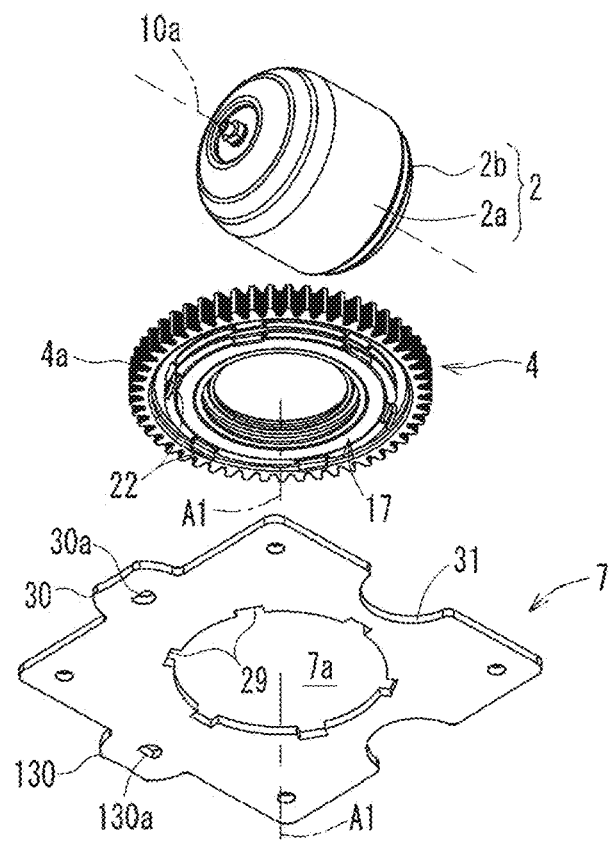

As illustrated in FIGS. 4, 7, and 8, the driving body 4 has a plate shape having an annular structure, has a first power transmission portion 4a that is an external gear at an outer peripheral portion, and has an annular pedestal 9 formed at an inner peripheral portion on an upper surface side. As illustrated in FIGS. 7 and 8, an uneven engagement portion 9a is provided on the inner peripheral surface of the driving body 4. An inward flange portion 13 projecting inward is provided below the uneven engagement portion 9a. That is, the annular pedestal 9 has the uneven engagement portion 9a and the inward flange portion 13.

As illustrated in FIGS. 4, 7, and 8, an annular rotating body mounting member 14 (power applying portion) is attached to the annular pedestal 9. The rotating body mounting member 14 is formed of a material having abrasion resistance. An annular mounting surface 14a is formed on the upper surface of the rotating body mounting member 14. Further, an uneven portion 15 is provided on the outer periphery of the rotating body mounting member 14. A cylindrical protrusion portion 14b extending downward is formed on the inner periphery of the rotating body mounting member 14. The cylindrical protrusion portion 14b is engaged with the inner peripheral portion of the inward flange portion 13 of the driving body 4. That is, the cylindrical protrusion portion enters and is engaged with the inside of the driving body 4. Further, by the engagement of the uneven portion 15 with the uneven engagement portion 9a on the annular pedestal 9 side, the rotating body mounting member 14 is integrated with the annular pedestal 9 (driving body 4) so as to be relatively non-rotatable. That is, the rotating body mounting member 14 rotates together with the driving body 4. The rotating body mounting member 14 may be configured integrally with the driving body 4.

As illustrated in FIG. 8, a plurality of engagement holes 16 is provided on the lower surface side of the driving body 4 at predetermined angular intervals. Each engagement hole 16 is engaged with each protrusion engagement portions 21 of the rotating member 18b of the thrust bearing 17. That is, the driving body 4 is placed on the rotating member 18b, and the rotating member 18b and the driving body 4 cannot relatively rotate.

Figure 1B:
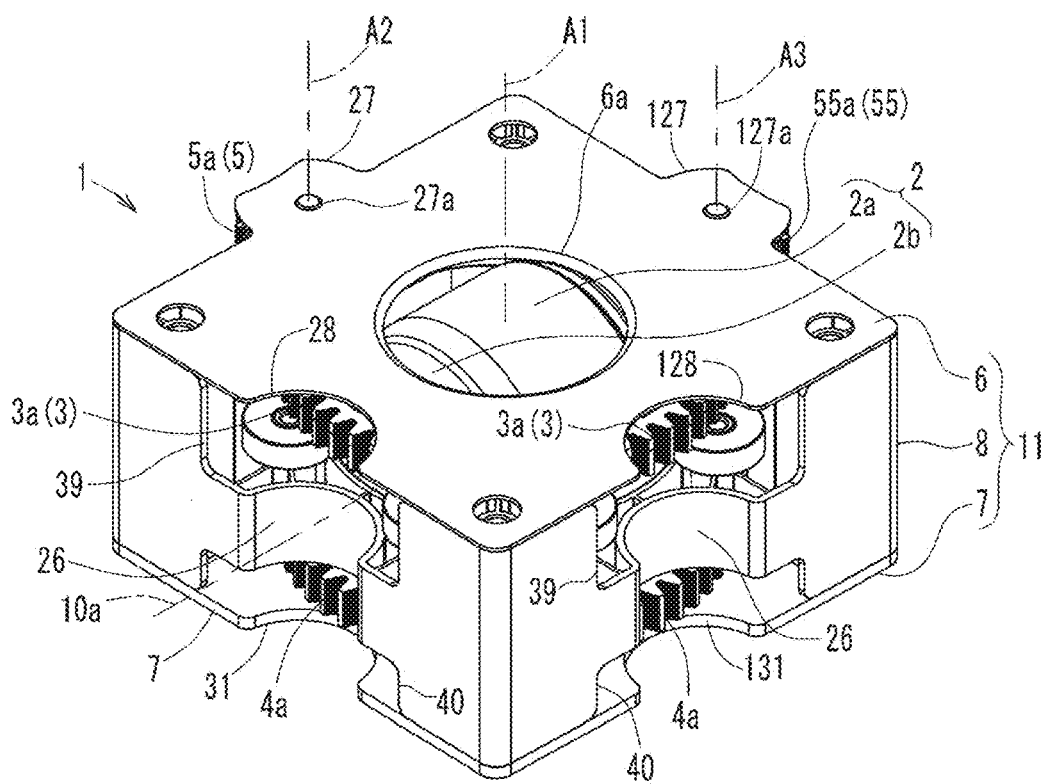

The driving body 4 (first power transmission portion 4a) and the rotating body mounting member 14 rotate around a first axis A1 (FIG. 1A and FIG. 11) which is a vertical axis line. As illustrated in FIG. 1B, the driving body 4 (first power transmission portion 4a) protrudes outward in the radial direction from between the recess portions 26 of the housing 11 and the recess portion 31 and the recess portion 131 of the bottom plate 7.

Next, the rotating body 2 will be described.

Figure 11:
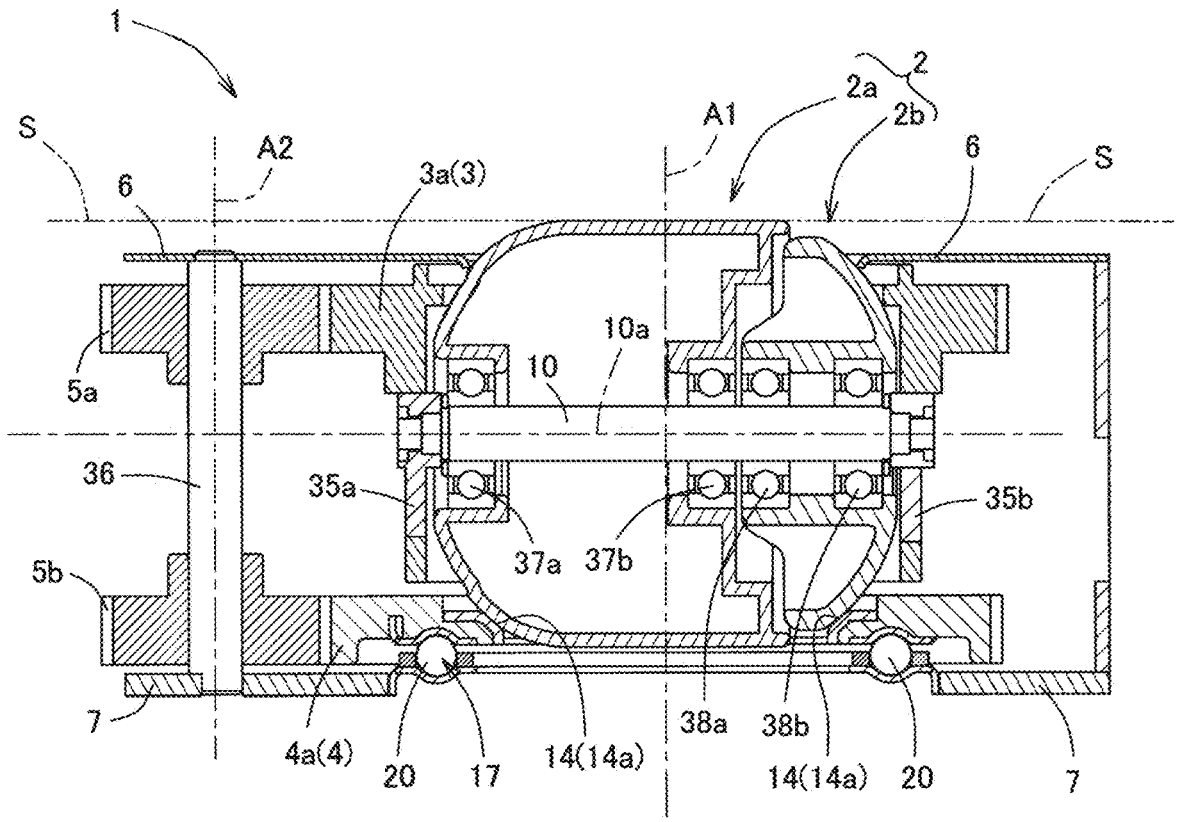
FIG. 11 is a cross-sectional view of a conveyance unit according to the present embodiment.

As illustrated in FIGS. 1A and 1B, the rotating body 2 includes a main rotating portion 2a and a sub rotating portion 2b. The main rotating portion 2a is a portion occupying most of the rotating body 2, and is a portion constituting a conveyance surface S as illustrated in FIG. 11. Here, the conveyance surface S is a surface formed by a portion on which an object is placed and which applies force to the placed object and moves the object. On the other hand, the sub rotating portion 2b is a portion constituting a part of the entire region of the rotating body 2. The sub rotating portion 2b is located below the conveyance surface S, and does not come into contact with the object.

The main rotating portion 2a and the sub rotating portion 2b are provided with through-holes 32a and 32b through which a support shaft 10 (FIG. 5 and FIG. 11) of the support body 3 to be described later passes. The main rotating portion 2a and the sub rotating portion 2b are attached along the support shaft 10.

Specifically, as illustrated in FIG. 11, bearings 37a and 37b are provided inside the main rotating portion 2a. The main rotating portion 2a is smoothly rotatably mounted on the support shaft 10 via the bearings 37a and 37b. Similarly, bearings 38a and 38b are provided inside the sub rotating portion 2b. The sub rotating portion 2b is smoothly rotatably mounted on the support shaft 10 via the bearings 38a and 38b.

The main rotating portion 2a and the sub rotating portion 2b can rotate independently of each other around the support shaft 10. That is, no power is transmitted between the main rotating portion 2a and the sub rotating portion 2b. Although the main rotating portion 2a and the sub rotating portion 2b are discontinuous in a strict sense, the external shape of the combination of the main rotating portion 2a and the sub rotating portion 2b is a spherical shape, a barrel shape, or a columnar shape.

As illustrated in FIG. 11, the main rotating portion 2a and the sub rotating portion 2b are mounted on the mounting surface 14a of the rotating body mounting member 14 on the driving body 4 side. A specific circumferential portion of the main rotating portion 2a around the support shaft 10 and a specific circumferential portion of the sub rotating portion 2b around the support shaft 10 are placed on the mounting surface 14a, and power is transmitted from the mounting surface 14a (driving body 4). That is, in a case where the driving body 4 rotates, force is applied to the main rotating portion 2a and the sub rotating portion 2b to rotate them in opposite directions to rotate.

Next, the support body 3 will be described.

Figure 5:
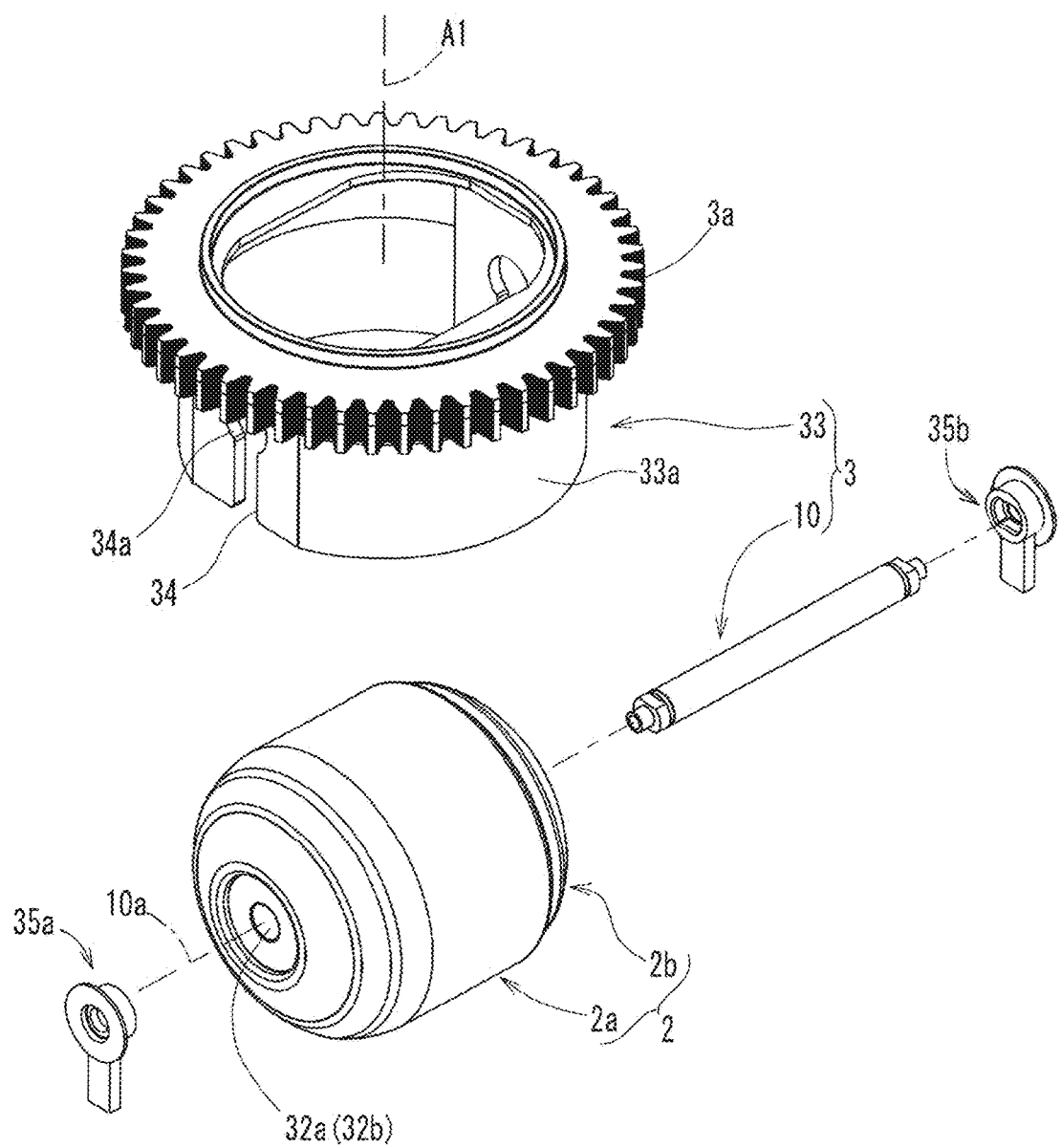
FIG. 5 is an exploded perspective view of a rotating body and a support body of FIG. 4.
Figure 6:
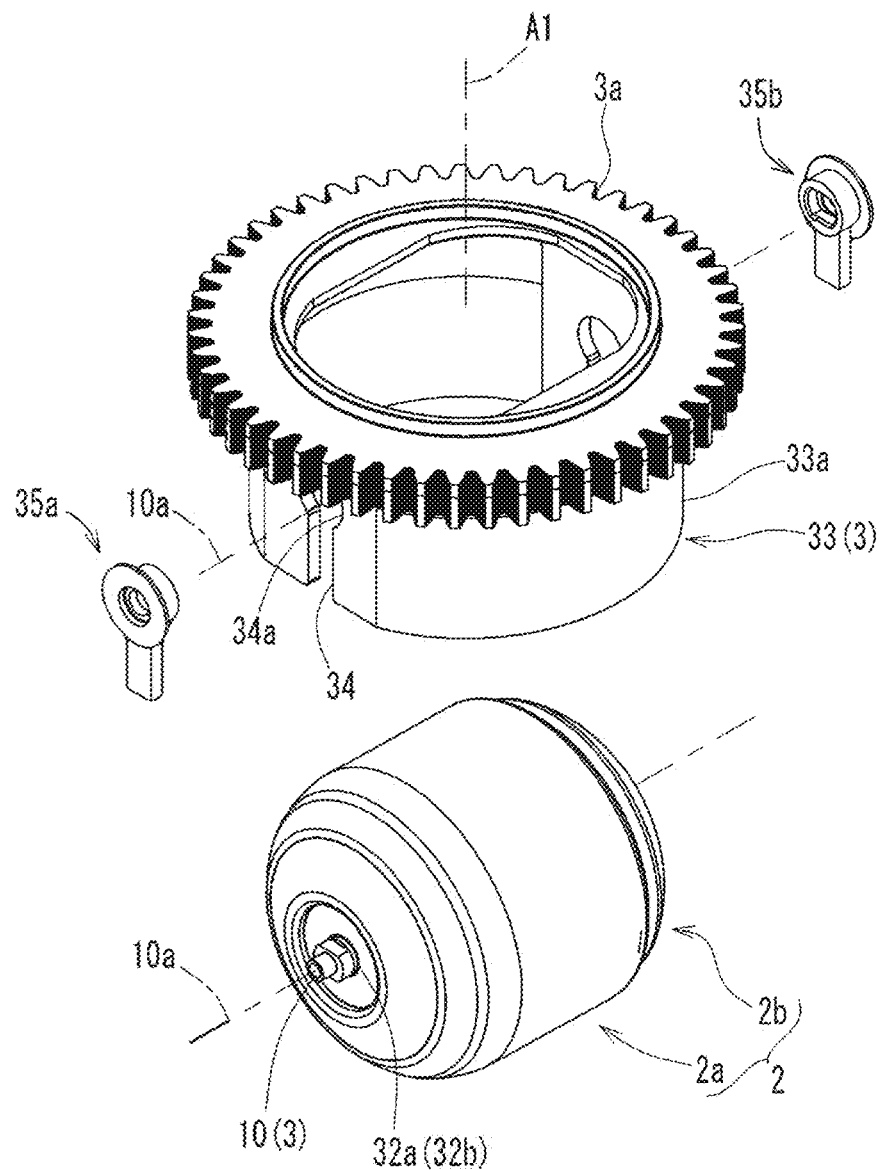
FIG. 6 is a perspective view illustrating a state in which a support shaft is attached to the rotating body of FIG. 5.

As illustrated in FIGS. 5 and 6, the support body 3 includes a main body 33 and the support shaft 10.

The main body 33 is a cylindrical member, and is provided with the second power transmission portion 3a that is an external gear, at an outer peripheral portion of an upper end. A side wall 33a of the main body 33 is provided with a slit 34 extending in the vertical direction upwardly from the lower end. A large diameter portion 34a is provided at an upper end of the slit 34. The diameter of the large diameter portion 34a is greater than the width of the slit 34.

The support shaft 10 is a shaft member having a length that allows the support shaft 10 to pass through the through-holes 32a and 32b of the rotating body 2 (the main rotating portion 2a and the sub rotating portion 2b). The support shaft 10 extends along an axis 10a, and retaining members 35a and 35b are attached to both ends of the support shaft 10, respectively. The end portions of the support shaft 10 are engaged with the retaining members 35a and 35b to non-rotatably support the support shaft 10. The retaining members 35a and 35b have a size to be exactly fitted into the slit 34 of the main body 33. That is, the upper end portions of the retaining members 35a and 35b have a size to be exactly fitted to the large diameter portion 34a. Therefore, in a case where the retaining members 35a and 35b are fitted into the slit 34, the rotating body 2 and the support body 3 are integrated as illustrated in FIG. 4.

The support body 3 is accommodated in the hole 8a of the main body 8 of the housing 11. The bearings 25 (FIG. 4) installed on the main body 8 of the housing 11 are arranged around the side wall 33a of the support body 3. The support body 3 is rotatably supported by the bearings 25. For convenience of drawings, the bearings 25 are omitted in FIG. 11.

Figure 10:
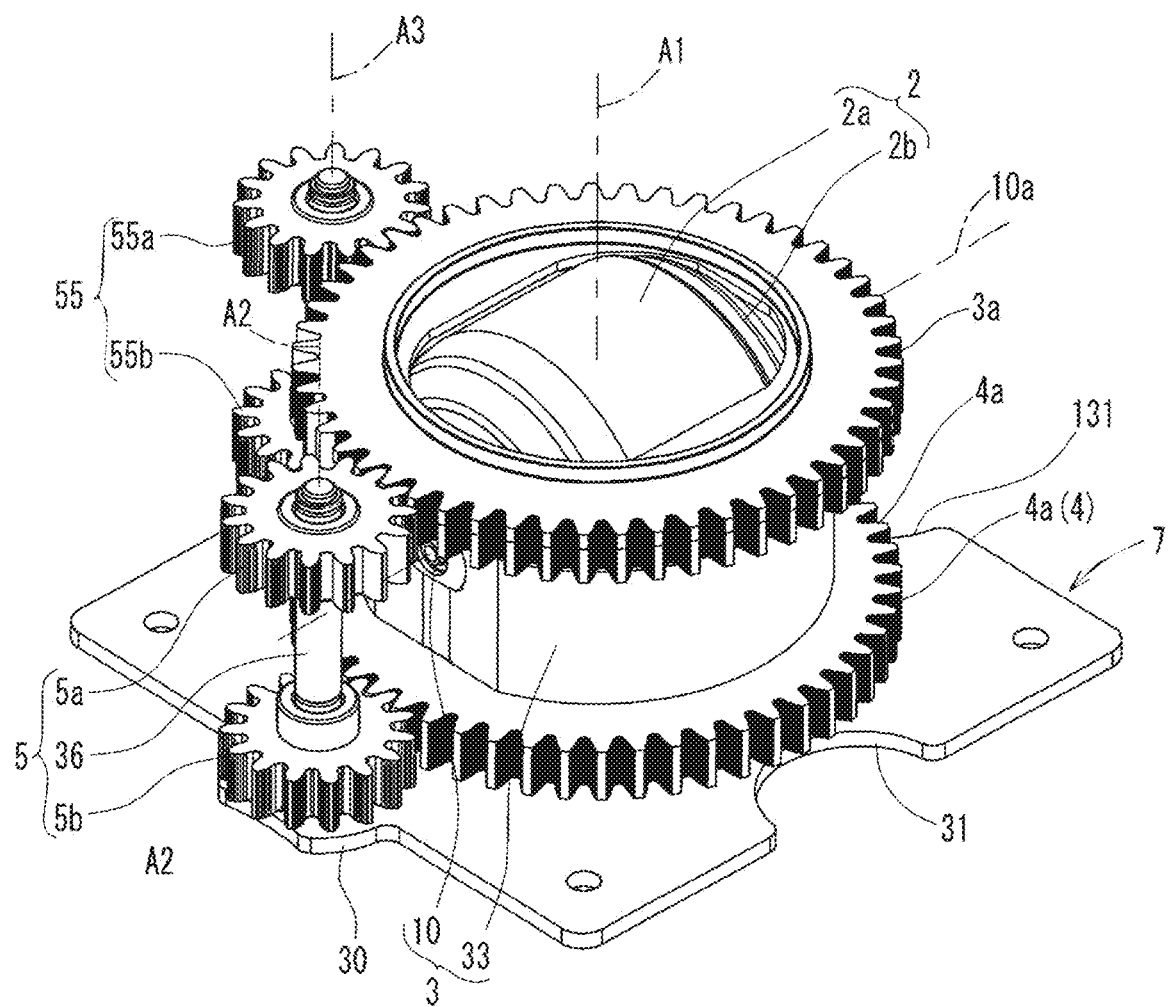
FIG. 10 is a perspective view of a main part of a conveyance unit.

As illustrated in FIG. 4, the support body 3 is integrated with the rotating body 2, is supported by the rotating body mounting member 14 (the mounting surface 14a) on the driving body 4 side together with the rotating body 2, and is in a state illustrated in FIG. 10. Therefore, the support body 3 (the rotating body 2) rotates around the first axis A1 (FIG. 1A, FIG. 10, and FIG. 11).

Next, the rotational force transmission members 5 and 55 will be described.

Figure 2:
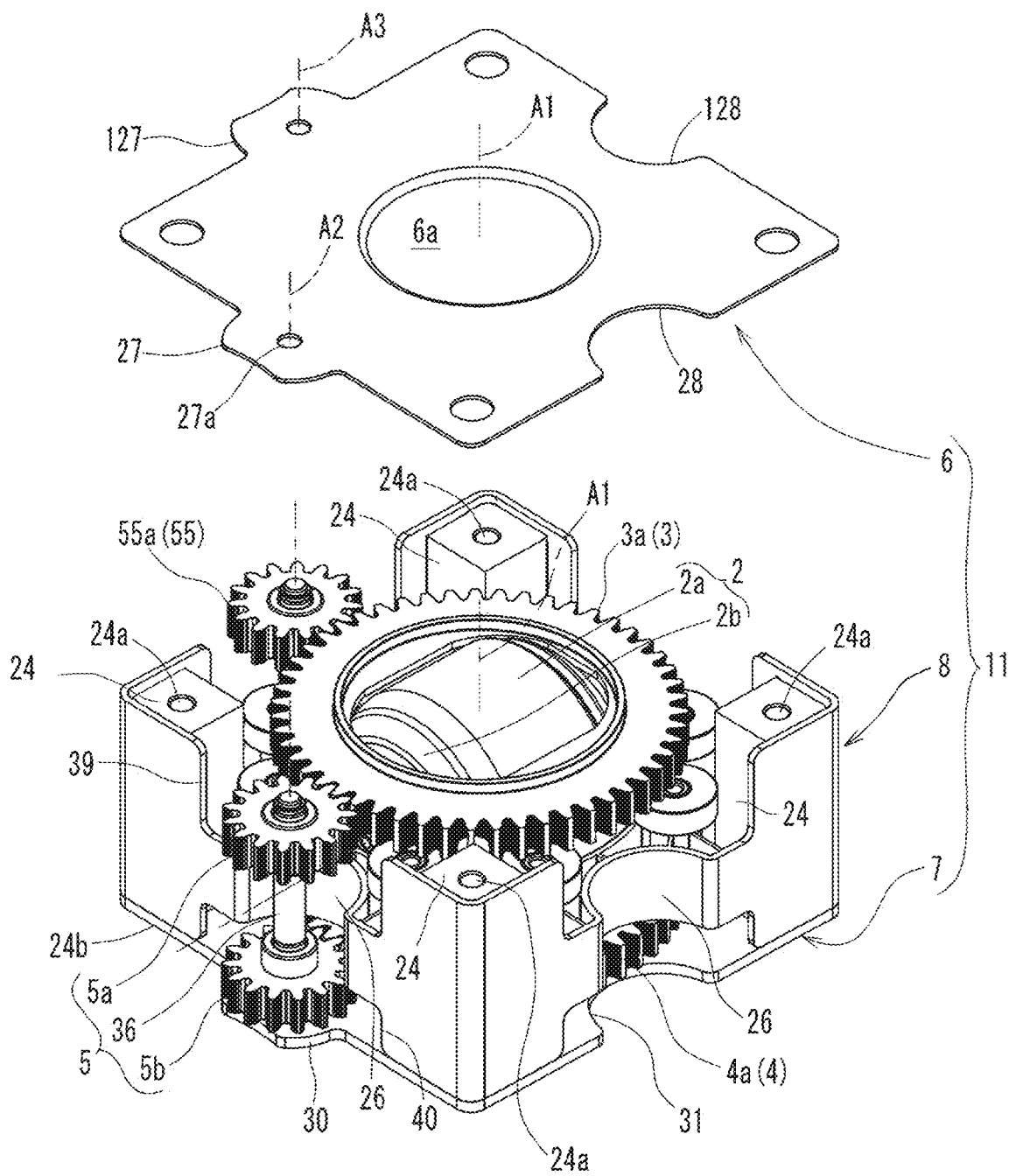
FIG. 2 is a perspective view illustrating a state in which a top plate of the conveyance unit of FIG. 1 is detached.

As illustrated in FIGS. 1 to 3, the rotational force transmission members 5 and 55 are arranged at positions on two adjacent surfaces (two sides) of the four sides of the housing 11. The rotational force transmission members 5 and 55 are arranged outside the main body 8 of the housing 11 so as to enter the recess portions 26.

The rotational force transmission members 5 and 55 include support body-side transmission portions 5a and 55a and driving body-side transmission portions 5b and 55b, which are external gears, and support shafts 36 and 136. The support shafts 36 and 136 are shafts facing the vertical direction. The support body-side transmission portions 5a and 55a are attached near the upper ends of the support shafts 36 and 136, and the driving body-side transmission portions 5b and 55b are attached near the lower ends of the support shafts 36 and 136. The support body-side transmission portions 5a and 55a and the driving body-side transmission portions 5b and 55b are attached to the support shafts 36 and 136 via bearings, and freely rotate.

The upper ends of the support shafts 36 and 136 are engaged with the support holes 27a and 127a of the protrusion portions 27 and 127 of the top plate 6. The lower ends of the support shafts 36 and 136 are engaged with the support holes 30a and 130a of the protrusion portions 30 and 130 of the bottom plate 7. That is, both ends of the support shafts 36 and 136 are supported by the housing 11. The support shafts 36 and 136 are non-rotatably fixed to the housing 11. As illustrated in FIG. 1A, the support shafts 36 and 136 coincide with the second axis A2 and the third axis A3. The support body-side transmission portion 5a and the driving body-side transmission portion 5b can smoothly rotate around the support shaft 36 (second axis). In addition, the support body-side transmission portion 55a and the driving body-side transmission portion 55b can smoothly rotate around the support shaft 136.

As illustrated in FIGS. 2 and 3, the support body-side transmission portions 5a and 55a are engaged with the second power transmission portion 3a of the support body 3 protruding from the openings 39 (upper portions of the recess portions 26). As illustrated in FIG. 3, the driving body-side transmission portions 5b and 55b are engaged with the first power transmission portion 4a of the driving body 4 protruding from the openings 40 (lower portions of the recess portions 26).

In the conveyance unit 1 described above, the support body 3 (the rotating body 2), the driving body 4, and the rotational force transmission members 5 and 55 are all attached to the housing 11. Therefore, the conveyance unit 1 is very easy to handle.

Next, the operation of the conveyance unit 1 will be described.

In a case where the conveyance unit 1 illustrated in FIG. 1A receives power from the outside, and the driving body-side transmission portion 5b of the rotational force transmission member 5 rotates, the rotational force (power) is transmitted to the driving body 4 (first power transmission portion 4a) engaged with the driving body-side transmission portion 5b, and the driving body 4 (first power transmission portion 4a) rotates. In a case where the driving body 4 (first power transmission portion 4a) rotates, the driving body-side transmission portion 55b (FIG. 3) of the rotational force transmission member 55 engaged with the driving body 4 (first power transmission portion 4a) rotates. That is, in a case where the rotational force (power) is input from one rotational force transmission member 5 and the conveyance unit 1 rotates, the other rotational force transmission member 55 also rotates in synchronization. Therefore, the rotational force can be transmitted to the outside via the rotational force transmission member 55.

The main rotating portion 2a and the sub rotating portion 2b of the rotating body 2 are mounted on the mounting surface 14a of the rotating body mounting member 14 (power applying portion) integrated with the driving body 4. In a case where the driving body 4 rotates, the rotating body mounting member 14 (the mounting surface 14a) also rotates, and the main rotating portion 2a and the sub rotating portion 2b rotate by being given the rotational force (power) from the rotating body mounting member 14. In this case, the main rotating portion 2a and the sub rotating portion 2b rotate in opposite directions to each other.

As illustrated in FIG. 11, only the main rotating portion 2a constituting the conveyance surface S protrudes from the hole 6a of the top plate 6, and only the main rotating portion 2a can apply force onto the object.

Figure 12:
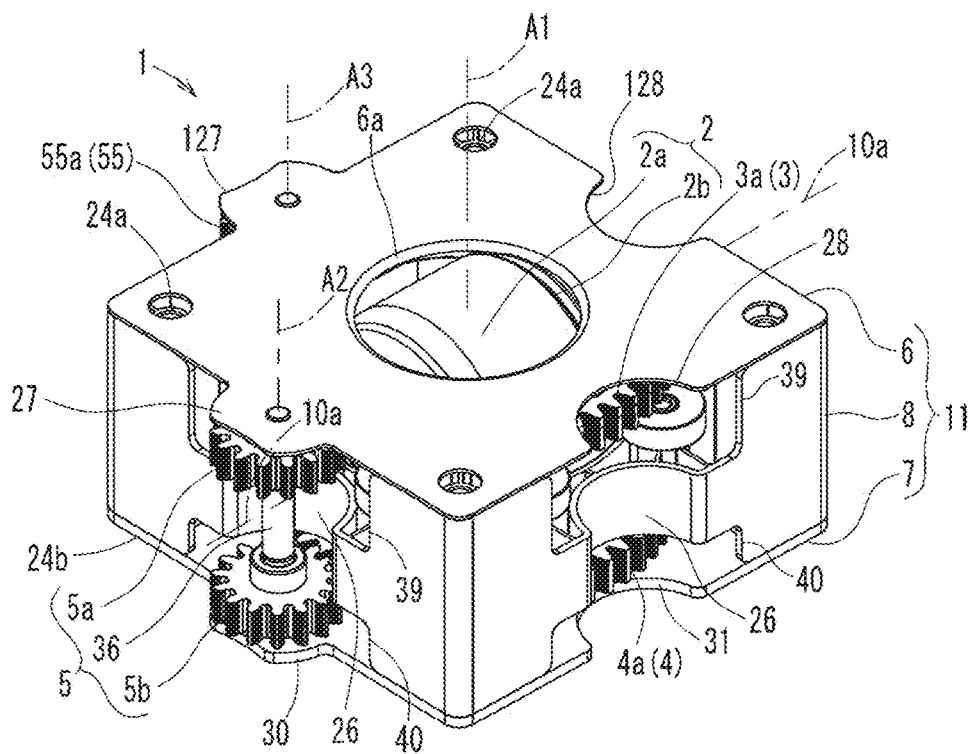
FIG. 12 is a perspective view illustrating a state in which a direction of a rotating body is changed by 90 degrees in the conveyance unit of FIG. 1A.

On the other hand, in a case where the support body-side transmission portion 5a of the rotational force transmission member 5 rotates, the rotational force (power) is transmitted to the support body 3 (the second power transmission portion 3a) engaged with the support body-side transmission portion 5a, and the support body 3 rotates. In this case, the orientation of the support shaft 10 (the axis 10a) in a horizontal posture of the support body 3 is changed, and the orientation of the rotating body 2 rotating around the support shaft 10 (the axis 10a) is also changed, for example, from the state illustrated in FIG. 1A to the state illustrated in FIG. 12. In FIG. 1A and FIG. 12, the orientations of the axes 10a are different from each other by 90 degrees. That is, the conveyance direction of the object (not illustrated) by the rotating body 2 is different by 90 degrees.

In a case where the support body 3 (the second power transmission portion 3a) rotates, the rotational force is also transmitted to the support body-side transmission portion 55a of the rotational force transmission member 55 engaged with the support body 3 (the second power transmission portion 3a), and the support body-side transmission portion 55a also rotates.

Here, the external shape of the combination of the main rotating portion 2a and the sub rotating portion 2b is a spherical shape, a barrel shape, or a columnar shape. Therefore, even in a case where the orientation of the support shaft 10 (the orientation of the rotating body 2) is changed, the periphery of a part of each of the main rotating portion 2a and the sub rotating portion 2b in a direction in which the support shaft 10 extends is always in contact with the mounting surface 14a of the rotating body mounting member 14 (the power applying portion) on the driving body 4 side. On the other hand, other parts of the main rotating portion 2a and the sub rotating portion 2b are substantially not in contact with the mounting surface 14a (power applying portion).

Here, the term "substantially" includes not only a state in which the main rotating portion 2a and the sub rotating portion 2b are not in contact at all, but also a case in which the main rotating portion 2a and the sub rotating portion 2b are in contact to such an extent that no force is exerted on the counterpart side.

Therefore, a state in which the rotational force (power) on the driving body 4 side is transmitted to the rotating body 2 (the main rotating portion 2a) is maintained. Further, in the rotating body 2, both the main rotating portion 2a and the sub rotating portion 2b that rotate around the support shaft 10 are mounted on the rotating body mounting member 14 (the mounting surface 14a), and the weight of the rotating body 2 is supported by the rotating body mounting member 14 in a well-balanced manner. Therefore, the rotating body 2 (the main rotating portion 2a) can smoothly rotate.

Here, the driving body-side transmission portion 5b and the support body-side transmission portion 5a of the rotational force transmission member 5 can rotate independently of each other. Similarly, the driving body-side transmission portion 55b and the support body-side transmission portion 55a of the rotational force transmission member 55 can also rotate independently of each other. Therefore, the support body 3 and the driving body 4 can rotate around the first axis A1 independently of each other, and can freely switch the conveyance speed of the object and the conveyance direction of the object.

Power can be applied from an external power source to the driving body-side transmission portions 5b and 55b and the support body-side transmission portions 5a and 55a of the rotational force transmission members 5 and 55. Further, the conveyance unit 1 can be connected to another conveyance unit 1. That is, the support body-side transmission portion 5a and the driving body-side transmission portion 5b of the rotational force transmission member 5 of one conveyance unit 1 can be engaged with the support body 3 (the second power transmission portion 3a) and the driving body 4 (the first power transmission portion 4a) of the other conveyance unit 1.

The conveyance units 1 do not include a power source (drive motor). Therefore, it is necessary to externally apply power to the rotational force transmission member 5 (the support body-side transmission portion 5a and the driving body-side transmission portion 5b), the first power transmission portion 4a, and the second power transmission portion 3a. Further, the conveyance units 1 can be connected to each other. That is, the conveyance units 1 can be connected to each other, and the operation of the rotating body 2 of one conveyance unit 1 and the operation of the rotating body 2 of the other conveyance unit 1 can be interlocked.

Specifically, by engaging the second power transmission portion 3a and the first power transmission portion 4a of one conveyance unit 1 to the support body-side transmission portion 5a and the driving body-side transmission portion 5b of the rotational force transmission member 5 of the other conveyance unit 1 respectively, in both the conveyance units 1, the rotating body 2 can rotate around the support shaft 10 and the rotating body 2 can turn around the first axis A1 in synchronization. Further, the power can be transmitted to still another conveyance unit 1 via the rotational force transmission member 55 (the support body-side transmission portion 55a and the driving body-side transmission portion 55b) of the other conveyance unit 1.

Next, a case where a large number of conveyance units 1 are connected to constitute a conveyance device 50 will be described.

Figure 13:
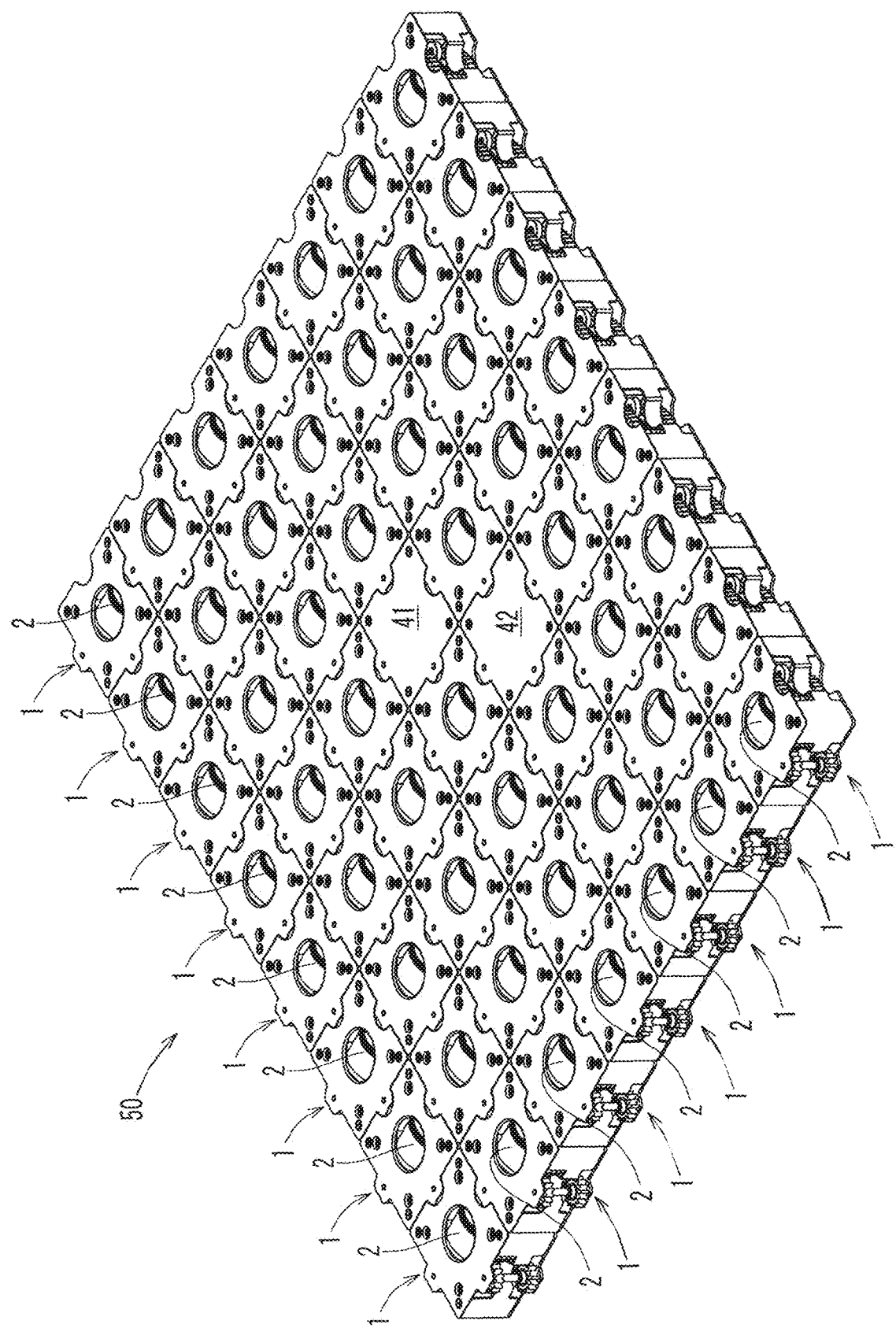
FIG. 13 is a perspective view of a conveyance device in which the conveyance units of FIG. 1 are arranged in a plane configuration.
Figure 16:
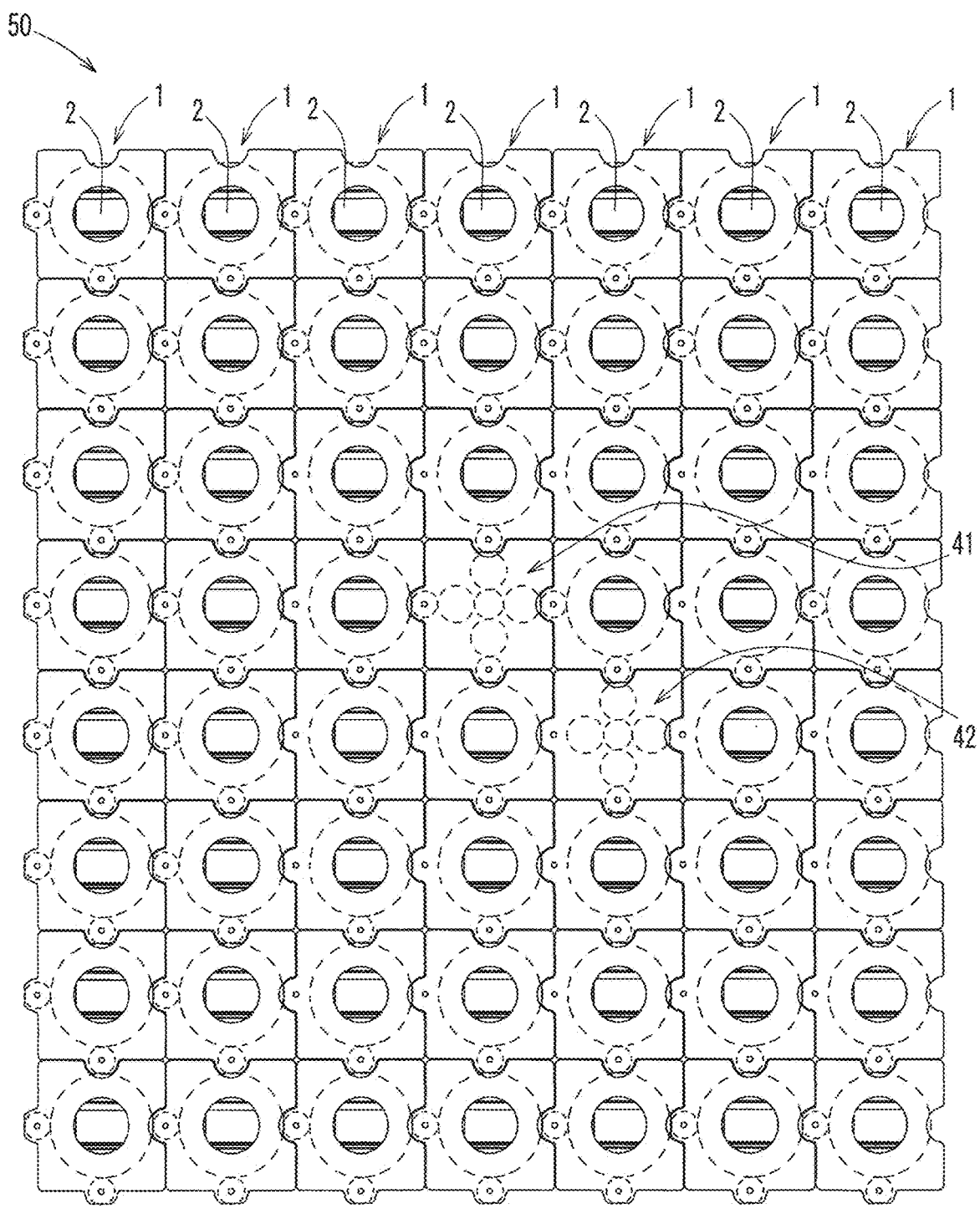
FIG. 16 is a plan view of the conveyance device of FIG. 13.

FIG. 13 is a perspective view of the conveyance device 50 in which a plurality of conveyance units 1 illustrated in FIG. 1A is arranged vertically and horizontally in a planar shape. FIG. 16 is a plan view of the conveyance device 50. As illustrated in FIGS. 13 and 16, in the conveyance device 50, the individual adjacent conveyance units 1 are connected to each other such that power is transmitted as described above. In the conveyance device 50, each conveyance unit 1 is installed on an installation base (flat base) (not illustrated).

In the present embodiment, in the conveyance unit 1 illustrated in FIG. 1A, the shapes of the protrusion portions 27 and 30 and the recess portions 28 and 31 of the housing 11 are different, but the protrusion portions 27 and 30 are accommodated in the recess portions 28 and 31 of another adjacent conveyance unit 1. Further, the rotational force transmission member 5 is accommodated in the recess portion 26 of another adjacent conveyance unit 1. Therefore, the conveyance units 1 can be adjacent to each other without a gap. Here, in a case where the shapes of the protrusion portions 27 and 30 and the recess portions 28 and 31 are made to coincide with each other, the protrusion portions 27 and 30 and the recess portions 28 and 31 function as uneven fitting portions that are fitted to each other in a concave-convex manner, and the conveyance units 1 are less likely to be displaced in position.

The conveyance device 50 includes a traveling motor 41 and a turning motor 42. The traveling motor 41 and the turning motor 42 are arranged similarly to the conveyance units 1 arranged lengthwise and breadthwise. That is, one of the conveyance units 1 arranged lengthwise and breadthwise is replaced with the traveling motor 41, and another conveyance unit 1 is replaced with the turning motor 42. Conversely, the traveling motor 41 and/or the turning motor 42 can be replaced with the conveyance unit 1. Here, the heights of the traveling motor 41 and the turning motor 42 used in the conveyance device 50 are shorter than the height of the conveyance unit 1 (the conveyance surface S).

The traveling motor 41 includes an output gear (gear train) that is engaged with the driving body 4 (the first power transmission portion 4a) or the rotational force transmission member 5 (the driving body-side transmission portion 5b) of the adjacent conveyance unit 1. The turning motor 42 includes an output gear (gear train) that is engaged with the support body 3 (the second power transmission portion 3a) or the rotational force transmission member 5 (the support body-side transmission portion 5a) of the adjacent conveyance unit 1.

In a case where the traveling motor 41 is driven, the driving body 4 (the first power transmission portion 4a) of the conveyance unit 1 adjacent to the traveling motor 41 is rotationally driven. The driving body 4 (the first power transmission portion 4a) of another conveyance unit 1 is also driven via the driving body-side transmission portion 5b of the rotational force transmission member 5 of the other conveyance unit 1 adjacent to the conveyance unit 1 adjacent to the traveling motor 41.

Then, the rotational force is transmitted to the driving bodies 4 of all the conveyance units 1 of the conveyance device 50, and the rotating bodies 2 (the main rotating portions 2a) of all the conveyance units 1 rotate at the same rotation speed. Here, since the driving bodies 4 of the respective conveyance units 1 are connected via the driving body-side transmission portions 5b (55b) of the rotational force transmission members 5 (55), the rotation directions of the driving bodies 4 (the rotating bodies 2) of the respective conveyance units 1 (the directions in which the object is given force) coincide with each other.

In a case where the turning motor 42 is driven, the support body 3 (the second power transmission portion 3a) of the conveyance unit 1 adjacent to the turning motor 42 is driven. The support body 3 (the second power transmission portion 3a) of another conveyance unit 1 is also driven via the support body-side transmission portion 5a (55a) of the rotational force transmission member 5 (55) of the other conveyance unit 1 adjacent to the conveyance unit 1 adjacent to the turning motor 42.

Then, the rotational force is transmitted to the support bodies 3 of all the conveyance units 1 of the conveyance device 50, and the rotating bodies 2 (the main rotating portions 2a) of all the conveyance units 1 simultaneously turn and face the same direction. Here, since the support bodies 3 of the conveyance units 1 are connected via the support body-side transmission portions 5a (55a) of the rotational force transmission members 5 (55), the orientations of the support bodies 3 (the rotating bodies 2) of the conveyance units 1 are changed all at once.

Figure 14:
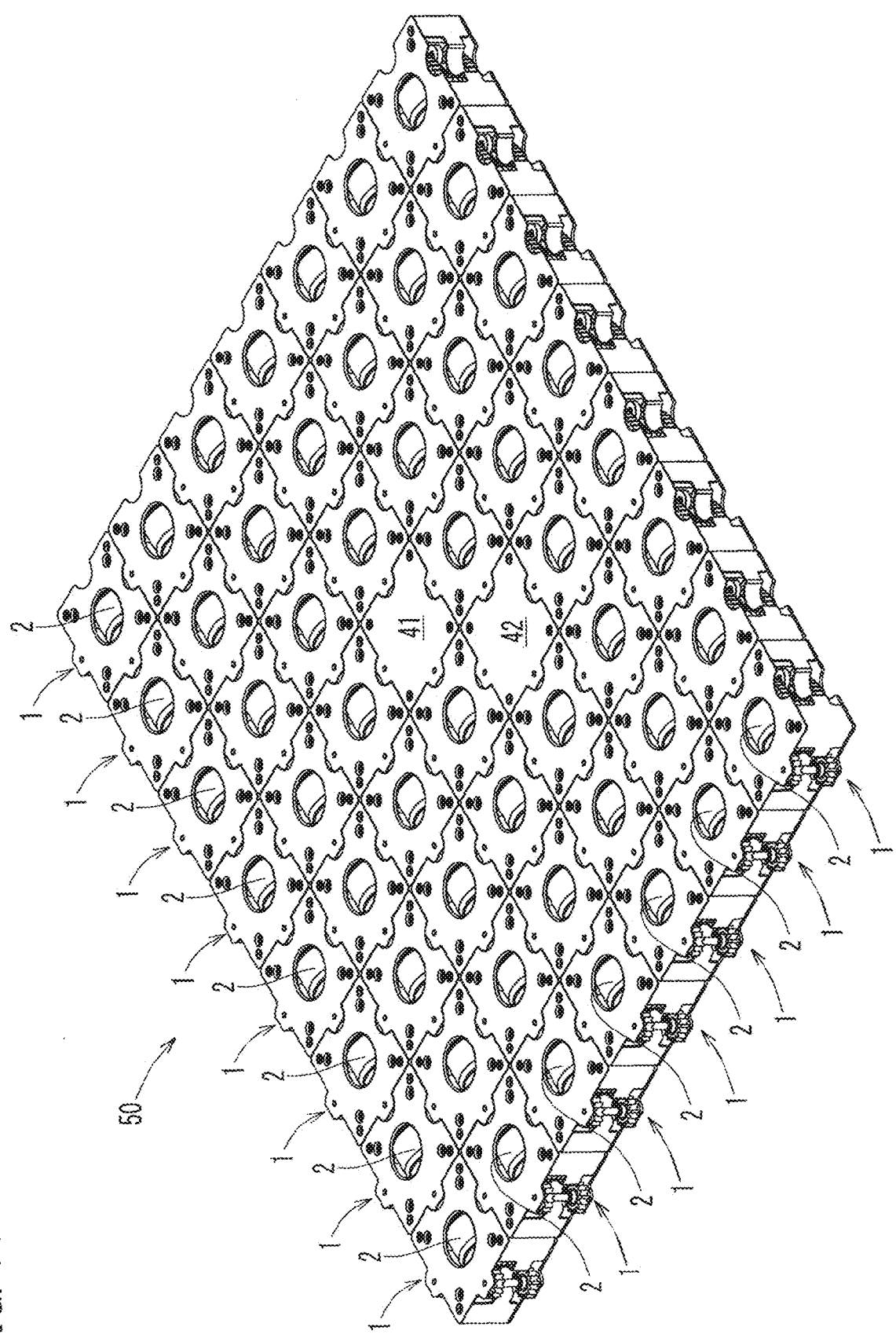
FIG. 14 is a perspective view illustrating a state in which the orientation of the rotating body of each conveyance unit of the conveyance device of FIG. 13 is changed by 90 degrees.

For example, the orientations of the rotating bodies 2 (the main rotating portions 2a) of the conveyance units 1 are changed all at once from the state illustrated in FIG. 13 to the state illustrated in FIG. 14. In the conveyance device 50, the conveyance direction of the object is different by 90 degrees between the state illustrated in FIG. 13 and the state illustrated in FIG. 14.

Furthermore, the traveling motor 41 and the turning motor 42 are preferably drive motors of the same type. That is, in a case where the output gear of the drive motor positioned at the height position of the driving body-side transmission portion 5b of the rotational force transmission member 5 and the first power transmission portion 4a of the conveyance unit 1 is turned upside down, it is preferable to use a drive motor positioned at the height position of the support body-side transmission portion 5a and the second power transmission portion 3a. In this way, the drive motor of the common specification can be used as the traveling motor 41 or used as the turning motor 42.

Figure 15:
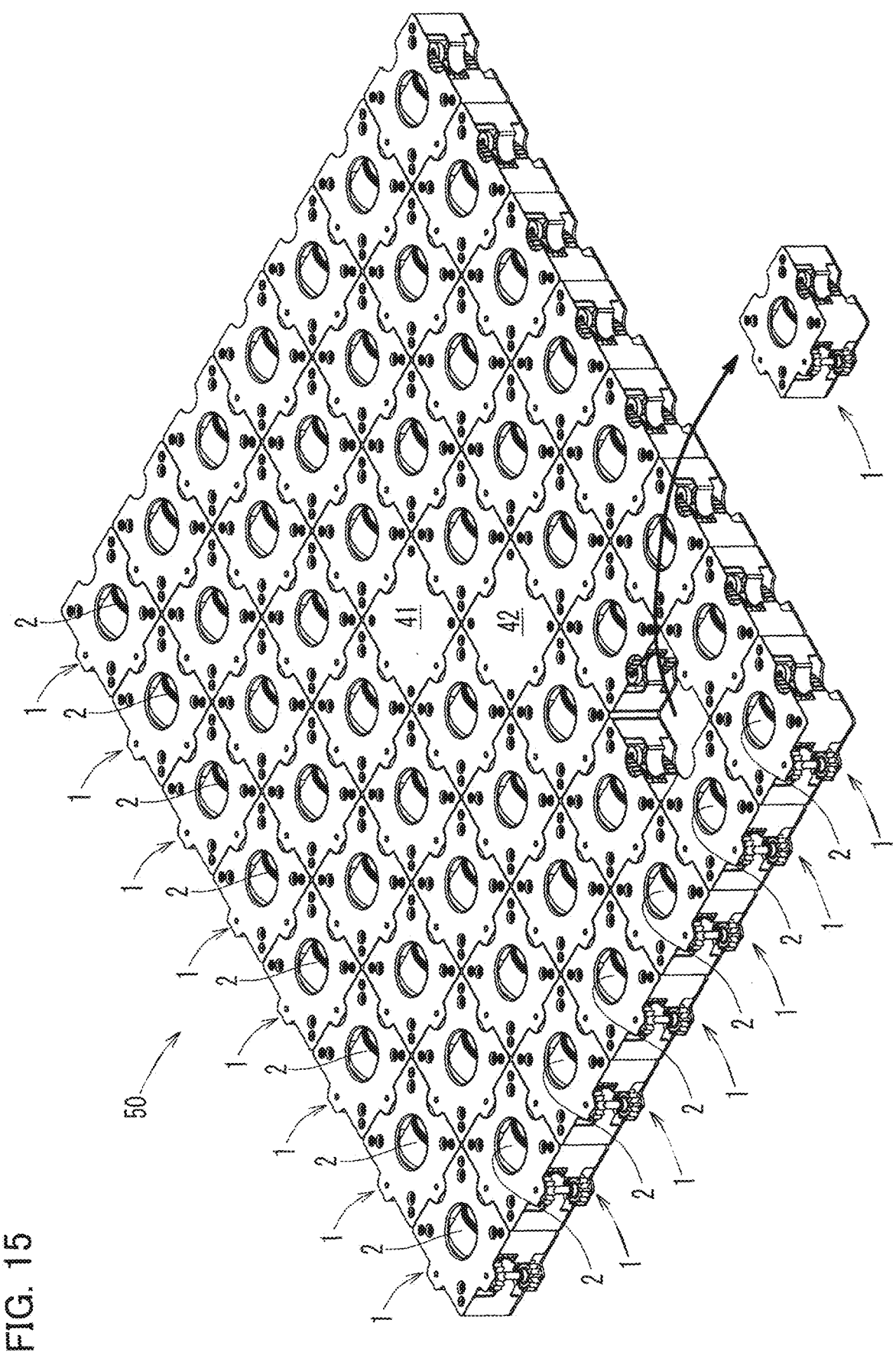
FIG. 15 is a perspective view illustrating a state in which one conveyance unit is removed from the conveyance device of FIG. 13.

The conveyance device 50 is configured by sequentially connecting individual conveyance units 1. Therefore, in a case where a specific conveyance unit 1 fails, only the conveyance unit 1 can be easily removed. FIG. 15 illustrates a state in which one conveyance unit 1 is removed from the conveyance device 50. In the conveyance device 50, a large number of conveyance units 1 are arranged lengthwise and breadthwise, and only one conveyance unit 1 can be removed from the conveyance device 50.

In the conveyance device 50, since the support bodies 3 (the second power transmission portions 3a), the driving bodies 4 (the first power transmission portions 4a), the rotational force transmission members 5 (the support body-side transmission portions 5a and the driving body-side transmission portions 5b), the rotational force transmission members 55 (the support body-side transmission portions 55a and the driving body-side transmission portions 55b) of the adjacent conveyance units 1 are engaged with one other, the mutual rotation is restricted. That is, the rotating bodies 2 of the respective conveyance units 1 cannot individually disorderly rotate or swing, and the conveyance speed and the conveyance direction (force applying direction) of the object can be switched all at once as the entire conveyance device 50.

As illustrated in FIGS. 13 to 16, the traveling motor 41 and the turning motor 42 can be arranged at vacant places where the conveyance unit 1 is not provided in the conveyance device 50. That is, in the conveyance device 50, the conveyance unit 1 can be replaced with the traveling motor 41, and the turning motor 42. This replacement can be easily performed even after the conveyance device 50 is assembled. In addition, the number of conveyance units 1 to be used and the layout of each conveyance unit 1 can be arbitrarily set as necessary.

In FIGS. 13 to 16, an example in which one traveling motor 41 and one turning motor 42 are provided is illustrated, but a plurality of these motors may be provided. For example, by providing a plurality of the traveling motors 41, it is possible to increase the force applied to the object. The same applies to the turning motor 42.

Next, a motor unit 200 that can be used as the above-described traveling motor 41 and can also be used as the turning motor 42 will be described in detail with reference to the drawings. The motor unit 200 can be used as the traveling motor 41 and the turning motor 42 described above.

Figure 17:
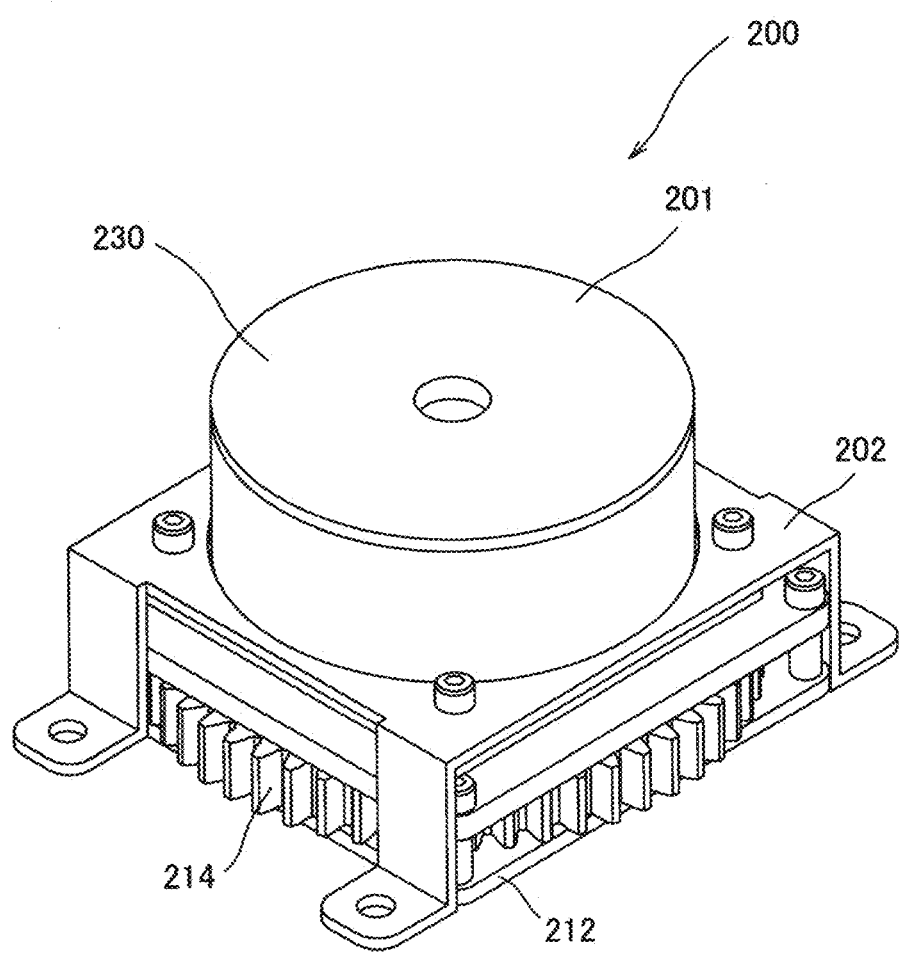
FIG. 17 is a perspective view illustrating a motor unit according to an embodiment of the present invention.
Figure 18:
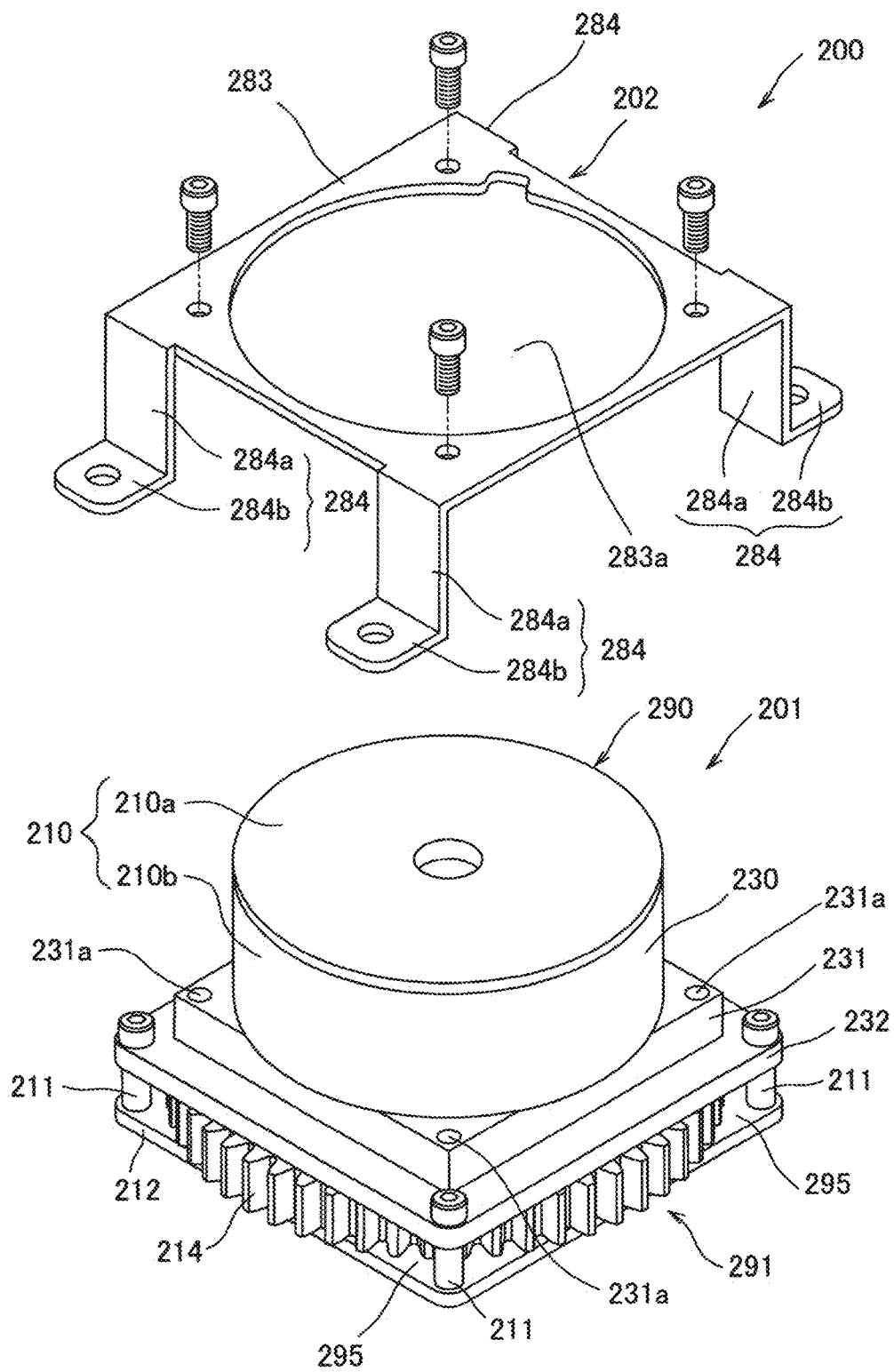
FIG. 18 is an exploded perspective view illustrating the motor unit of FIG. 17.

As illustrated in FIGS. 17 and 18, the motor unit 200 includes a unit main body portion 201 (motor unit main body portion), and an attachment fitting 202 (attachment member), and is formed by attaching the attachment fitting 202 to the unit main body portion 201 via a temporary fastening element such as a screw.

Here, the temporary fastening element is a superordinate concept such as a combination of a screw and a bolt nut, and is a fastening element that can perform fastening and releasing without destruction in principle.

In the following description, unless otherwise specified, the description will be given with reference to the posture illustrated in FIG. 17.

Figure 19:
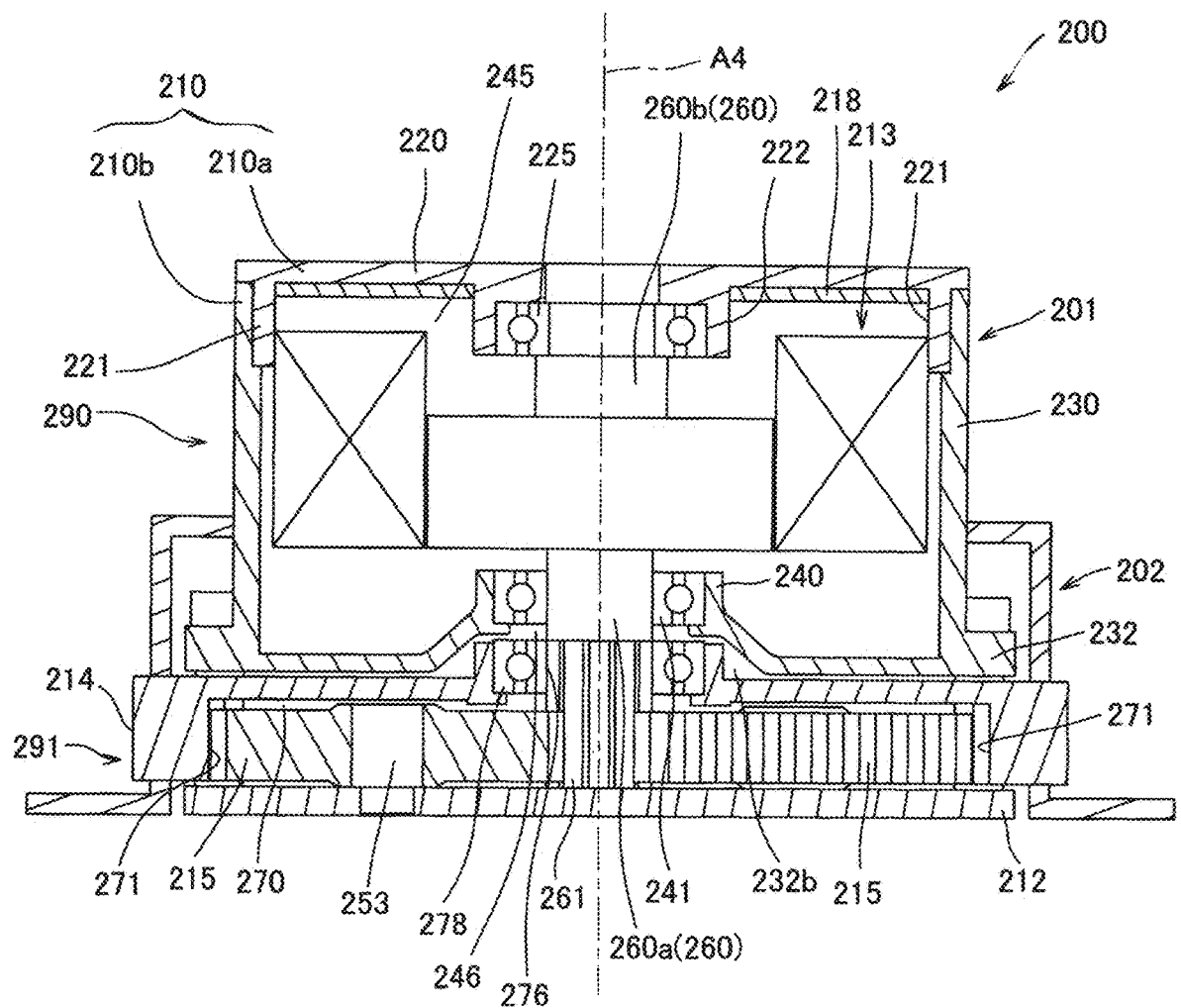
FIG. 19 is a cross-sectional view schematically illustrating the motor unit of FIG. 17.

As illustrated in FIGS. 18 and 19, the unit main body portion 201 includes a housing member 210, a connection pillar member 211 (refer to FIG. 18), a plate-shaped member 212, a motor 213 (drive motor, refer to FIG. 19), an output member 214, and a small gear member 215 (small gear portion, refer to FIG. 19). A substrate member 218 is incorporated in the housing member 210 together with the motor 213.

As illustrated in FIGS. 18 and 19, the housing member 210 includes a lid portion 210a, and a housing main body portion 210b. In the housing member 210 of the present embodiment, the lid portion 210a is detachable from the housing main body portion 210b.

As illustrated in FIG. 19, the lid portion 210a has a circular plate-shaped lid plate portion 220. An insertion piece 221 and a bearing attachment portion 222 are provided on one main surface side (on the back surface side, and on the lower side in FIG. 19) of the lid plate portion 220.

The insertion piece 221 is a standing plate-shaped portion protruding from one main surface of the lid plate portion 220. The insertion piece 221 is a portion that is inserted into an accommodation space 245 (to be described in detail later) of the housing main body portion 210b in a case where the lid portion 210a is mounted onto the housing main body portion 210b, and abuts on an inner wall portion surrounding the accommodation space 245 from the inside.

The bearing attachment portion 222 is a bottomed cylindrical portion provided so as to protrude from the lid plate portion 220. That is, the bearing attachment portion 222 has a recess portion depressed toward the lid plate portion 220 side at the center, and a bearing member (a first bearing member 225 in the present embodiment) can be fitted into the recess portion.

In the present embodiment, the first bearing member 225 is fitted substantially exactly into the bearing attachment portion 222 to be integrally attached to the lid portion 210a. The first bearing member 225 is a bearing. An opening of a through-hole penetrating the lid plate portion 220 in the thickness direction is positioned in a bottom portion of the recess portion of the bearing attachment portion 222. That is, a through-hole penetrating from one main surface to the other main surface is formed in the lid plate portion 220, one opening is positioned on the one main surface, and the other opening is positioned at the bottom portion of the recess portion. Therefore, the inner space of the recess portion and the outer space communicate with each other through the through-hole.

Figure 20A:
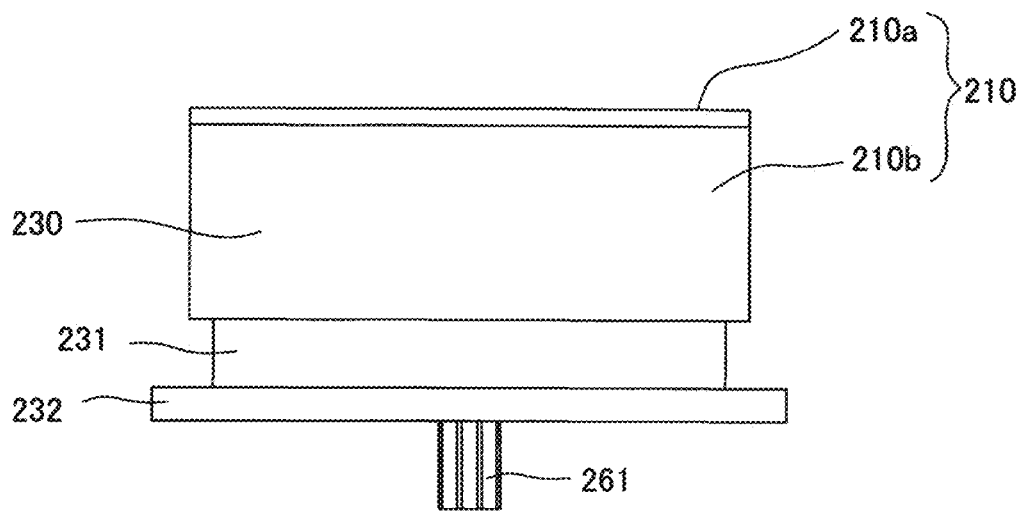
FIGS. 20A and 20B are views illustrating an upper portion of a unit main body portion of FIG. 18, where
Figure 20B:
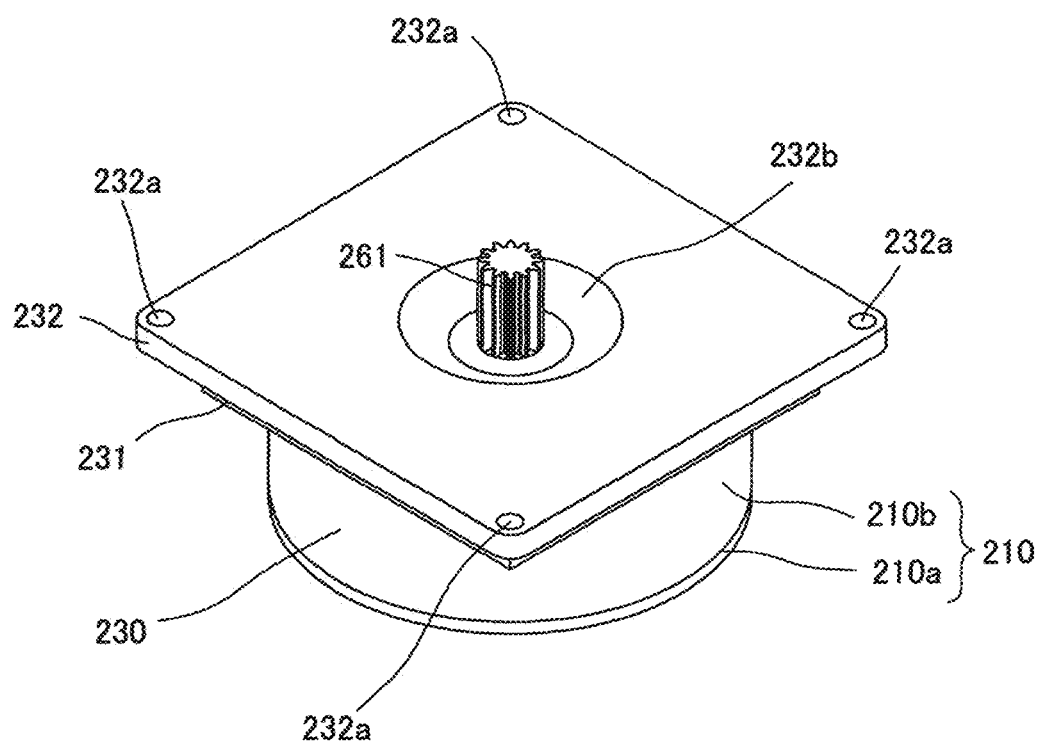

Focusing on the external shape of the housing main body portion 210b, the housing main body portion 210b has a cylindrical portion 230, an attachment base portion 231, and a gear-side plate-shaped portion 232 in order from the top as illustrated in FIGS. 18 and 20.

The cylindrical portion 230 is a substantially cylindrical portion extending in the vertical direction.

The attachment base portion 231 has a thick plate shape in an outer appearance and is a portion having a substantially quadrangular plate shape. In the present embodiment, as illustrated in FIG. 18, the most part is positioned below the position overlapping the cylindrical portion 230 (the cylindrical portion 230) in plan view, and the four corners and peripheral portions thereof are positioned on the outer side of the outer peripheral surface of the cylindrical portion 230 in plan view. That is, at least a part of the attachment base portion 231 is positioned on the outer side of the outer periphery (peripheral edge) of the cylindrical portion 230 in plan view, and an attachment hole 231a is formed in the portion positioned on the outer side of the outer periphery. The attachment hole 231a is a hole through which the temporary fastening element can be inserted, and is a screw hole in the present embodiment.

The gear-side plate-shaped portion 232 is a portion having a substantially quadrangular plate shape. An upper surface of the gear-side plate-shaped portion 232 (a surface on the cylindrical portion 230 side) and an upper surface of the attachment base portion 231 are continuous via a step. That is, in plan view, the four sides corresponding to the respective portions of the peripheral edge portion of the gear-side plate-shaped portion 232 are positioned on the outer side of the four sides corresponding to the respective portions of the peripheral edge portion of the attachment base portion 231. That is, in plan view, the entire region of the attachment base portion 231 is at a position overlapping the gear-side plate-shaped portion 232, and the peripheral portion of the peripheral edge including the four corners of the gear-side plate-shaped portion 232 surrounds the attachment base portion 231.

Attachment holes 232a (refer to FIGS. 20 and 21) are formed in portions near the four corners in the gear-side plate-shaped portion 232, that is, portions positioned on the outer side of the attachment base portion 231. The attachment hole 232a is a hole through which the temporary fastening element can be inserted, and is a screw hole in the present embodiment.

As illustrated in FIG. 20, a depressed portion 232b is formed on a lower surface of the gear-side plate-shaped portion 232 (a main surface opposite to the main surface on the cylindrical portion 230 side).

Here, as illustrated in FIG. 19, a bearing attachment portion 240 is provided in a portion (in FIG. 19, a portion adjacent to the upper side) adjacent to the bottom portion of the depressed portion 232b.

The bearing attachment portion 240 is a bottomed cylindrical portion provided to protrude from the inner side surface of the gear-side plate-shaped portion 232 (surface facing the accommodation space 245) toward the cylindrical portion 230. That is, the bearing attachment portion 240 has a recess portion depressed toward the lower side (the output member 214 side) at the center, and a bearing member (a second bearing member 241 in the present embodiment) can be fitted into the recess portion.

In the present embodiment, the second bearing member 241 is fitted substantially exactly into the bearing attachment portion 240 to be integrally attached to the housing main body portion 210b. The second bearing member 241 is a bearing.

In a state where the housing main body portion 210b is attached to the lid portion 210a, the bearing attachment portion 222 of the lid portion 210a and the bearing attachment portion 240 of the housing main body portion 210b described above are arranged at positions overlapping each other (positions separated in the vertical direction) in plan view. Therefore, the first bearing member 225 and the second bearing member 241 are also arranged at positions overlapping each other in plan view.

Here, the housing main body portion 210b is a hollow member, and has the accommodation space 245 therein. The accommodation space 245 is a space formed inside from one end (upper end) of the cylindrical portion 230 to a middle portion in the thickness direction of the gear-side plate-shaped portion 232 via the attachment base portion 231 (refer to FIG. 18 and the like).

One end side of the housing main body portion 210b in the vertical direction (the height direction, the longitudinal direction) is opened to the outside, and an opening portion that allows the communication between the inside and the outside (the accommodation space 245 and the outside) is formed. Then, the most part of the opening portion can be closed by mounting the lid portion 210a. With the lid portion 210a removed, the motor 213 can be replaced (taken out or inserted) through the opening (upper opening) of the housing main body portion 210b.

On the other hand, the most part on the other end side in the vertical direction is closed by the gear-side plate-shaped portion 232. Here, the housing main body portion 210b has an output shaft insertion hole 246 that allows communication between the accommodation space 245 and the outside. The output shaft insertion hole 246 is formed at a position adjacent to the depressed portion 232b of the gear-side plate-shaped portion 232. The output shaft insertion hole 246 is a hole in which a through-hole penetrating the gear-side plate-shaped portion 232 and an inner hole of the second bearing member 241 are continuously formed.

Figure 21:
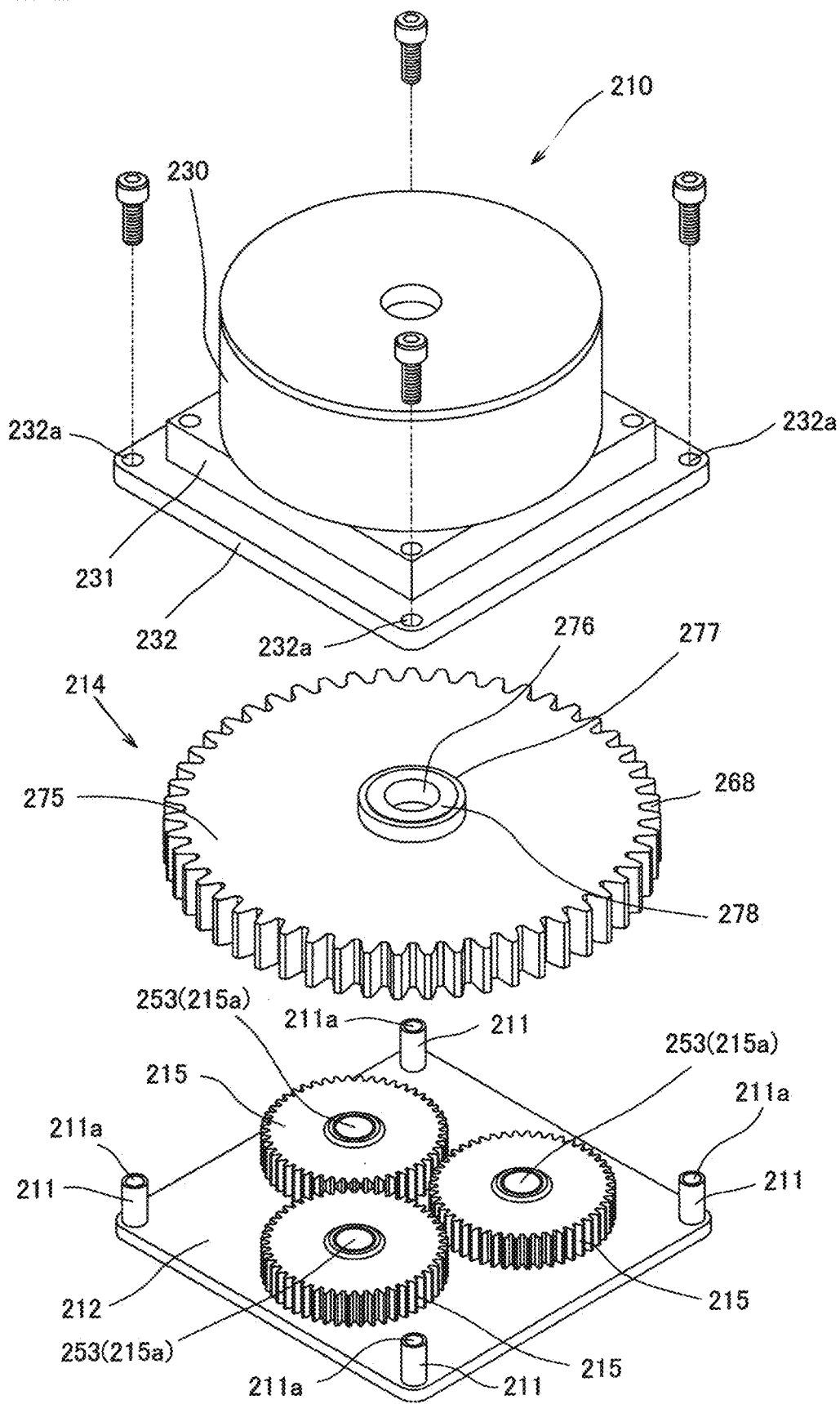
FIG. 21 is an exploded perspective view illustrating the unit main body portion of FIG. 18.

As illustrated in FIG. 21, the connection pillar member 211 has a substantially columnar shape extending in the vertical direction in an outer appearance. In the connection pillar member 211, an attachment hole 211a having an opening at an upper end (an end portion on the housing member 210 side) is formed. The attachment hole 211a is a bottomed hole extending toward the lower side (plate-shaped member 212 side), and is a screw hole in the present embodiment.

The plate-shaped member 212 is a metal member having a quadrangular flat plate shape in an outer appearance. The plate-shaped member 212 is a portion having substantially the same size and shape in plan view as those of the gear-side plate-shaped portion 232 described above, and is arranged at a position where the entire region (or substantially the entire region) overlaps the gear-side plate-shaped portion 232 in plan view (refer to FIG. 18).

The above-described connection pillar member 211 is integrally fixed to the plate-shaped member 212. That is, the connection pillar member 211 protrudes from one main surface (upper surface) of the plate-shaped member 212 toward the housing member 210 (upper side).

A rotary shaft member 253 is attached to the plate-shaped member 212. The rotary shaft member 253 is a member serving as a rotary shaft of the small gear member 215.

As illustrated in FIG. 19, the rotary shaft member 253 is a rod-shaped member extending in the vertical direction, and two portions (columnar portions) having different thicknesses (diameters) are continuously formed. That is, the upper portion (first portion) has a larger diameter than the lower portion (second portion), and the outer peripheral surface of the upper portion and the outer peripheral surface of the lower portion are continuous via a step. The upper portion is positioned closer to the housing member 210 (upper side) than one main surface (upper surface) of the plate-shaped member 212, and is a portion exposed to the outside. The lower portion is a portion inserted into an attachment hole formed in the plate-shaped member 212.

The rotary shaft member 253 is integrally fixed to the plate-shaped member 212, and is in a state where the rotary shaft member and the plate-shaped member do not move relative to each other.

As illustrated in FIG. 19, the motor 213 includes a stator, a rotating body, and a shaft portion 260 that rotates with the rotating body. The shaft portion 260 includes a first shaft portion 260a (output shaft) protruding outward from one side of the rotating body, and a second shaft portion 260b protruding outward from a side opposite to the first shaft portion 260a. The first shaft portion 260a is a portion serving as an output shaft of the motor 213.

The shaft portion 260 has a substantially round rod shape, and is in a state where two portions separated in the longitudinal direction, that is, a part of the first shaft portion 260a and a part of the second shaft portion 260b are respectively inserted into the inner holes of the bearing members (the first bearing member 225 and the second bearing member 241). That is, the shaft portion 260 is pivotally supported in a rotatable state with respect to the housing member 210. The shaft portion 260 extends in the vertical direction, the first shaft portion 260a is a portion extending downward (toward the plate-shaped member 212), and the second shaft portion 260b is a portion extending upward (toward the lid plate portion 220).

A drive gear portion 261 (drive gear) is formed in a portion of the first shaft portion 260a on the distal end side in the protrusion direction. In the present embodiment, the drive gear portion 261 has a tooth train formed on the outer peripheral surface of the first shaft portion 260a. The drive gear portion 261 may be formed by integrally attaching a separately formed gear member to the shaft portion 260. That is, in a case where the first shaft portion 260a rotates in the circumferential direction, the drive gear portion 261 also rotates in the same direction.

Figure 22A:
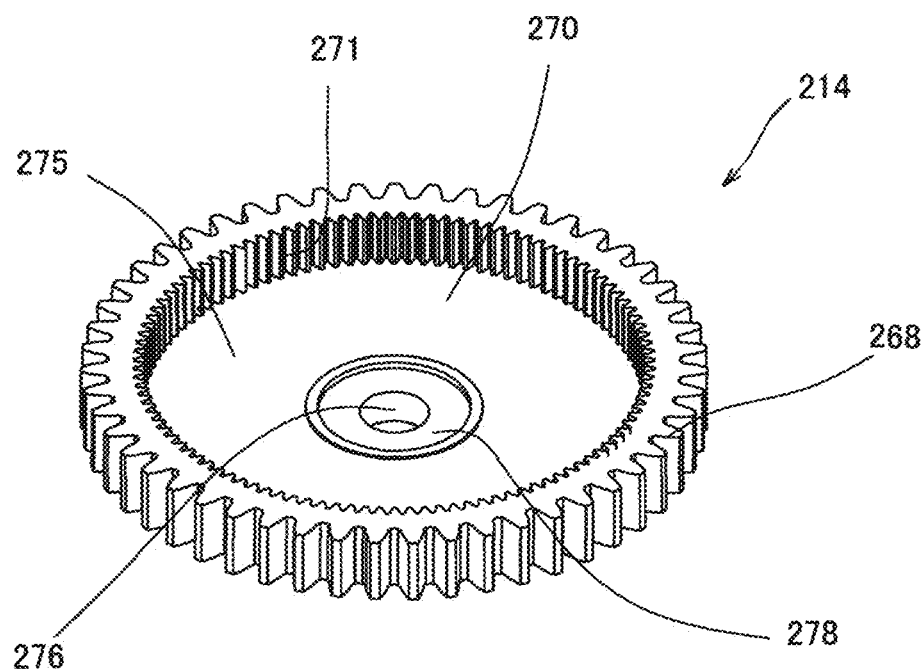
FIG. 22A is a perspective view illustrating a state in which an output member of FIG. 21 is viewed from a direction different from that in FIG. 21.

As illustrated in FIG. 21, the output member 214 is a gear (gear member) having a substantially circular plate shape in an outer appearance. That is, an output tooth train portion 268 is formed in an outer peripheral portion continuous in an annular shape. The output tooth train portion 268 is formed by arranging a plurality of teeth in an annular shape (annular shape). As illustrated in FIG. 22, the output member 214 includes a gear accommodation portion 270.

The gear accommodation portion 270 is a recess portion depressed from a main surface (a surface on the plate-shaped member 212 side, refer to FIG. 21) positioned on one end side in the thickness direction of the output member 214, toward a main surface (a surface on the housing member 210 side, refer to FIG. 21) on the other side. That is, the gear accommodation portion 270 is surrounded by a standing wall-shaped portion extending annularly along the circumferential direction of the output member 214. The above-described output tooth train portion 268 is formed on the outer peripheral surface of the standing wall-shaped portion. An inner side tooth train portion 271 (inner tooth train portion) is formed on an inner peripheral surface (inner wall portion) of one standing wall-shaped portion.

The inner side tooth train portion 271 is formed by arranging a plurality of teeth in an annular shape (annular shape). Although not particularly limited, in the present embodiment, the teeth belonging to the inner side tooth train portion 271 are smaller than the teeth belonging to the output tooth train portion 268. The groove width of the groove formed between the two teeth of the inner side tooth train portion 271 is smaller than the groove width of the groove formed between the two teeth of the output tooth train portion 268.

The bottom portion of the gear accommodation portion 270 is formed by a flat plate portion 275. The flat plate portion 275 is a flat plate-shaped portion having a smaller thickness than the peripheral edge portion. A shaft insertion hole 276 is formed on the center side of the gear accommodation portion 270 (on the center side in the radial direction of the output member 214) (to be described in detail later).

Figure 22B:
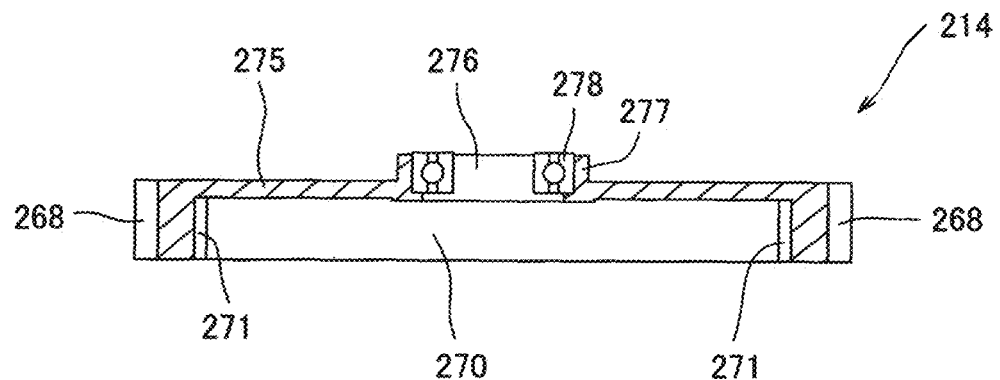
FIG. 22B is a cross-sectional view of the output member of FIG. 21.

As illustrated in FIGS. 21 and 22B, the output member 214 includes a bearing attachment portion 277. Specifically, the bearing attachment portion 277 has a short cylindrical portion protruding outward (upward) from one main surface (the upper surface in FIG. 22B) in the thickness direction. Then, a recess portion into which a third bearing member 278 can be substantially exactly fitted is formed on the inner side from the opening portion of the inner hole formed at a protruding end (upper end) of the short cylinder portion to the middle portion in the thickness direction of the flat plate portion 275 through the inner side of the short cylindrical portion. The third bearing member 278 is a bearing.

The shaft insertion hole 276 is a hole in which a through-hole penetrating the flat plate portion 275 in the thickness direction and an inner hole of the third bearing member 278 are continuously formed. The hole allows communication between the gear accommodation portion 270 and an external space.

The small gear member 215 is a disk-shaped gear, has a tooth train portion in an outer peripheral portion, and has a shaft insertion hole 215a formed on the center side, as illustrated in FIG. 21.

The small gear member 215 is attached to the plate-shaped member 212 via the rotary shaft member 253, and is attached in a state of being rotatable in the circumferential direction of the rotary shaft member 253 with the rotary shaft member 253 as a rotary shaft.

In the present embodiment, the substrate member 218 is attached to the lid portion 210a, and is accommodated in the accommodation space 245 together with the motor 213. The substrate member 218 has a Hall element and functions as a Hall sensor. That is, the magnetic pole of a permanent magnet of the rotor of the motor 213 can be detected, and the rotation speed, the rotation direction, and the rotation angle of the rotor can be acquired. Then, a control device (not illustrated) controls the motor 213 on the basis of information detected by the substrate member 218 (performs energization control or the like), and thereby controls the rotation speed, the rotation direction, and the rotation angle of the output shaft of the motor 213.

The substrate member 218 of the present embodiment generates and outputs a pulse signal on the basis of the output from the Hall element. Then, in a case where the output (the rotation speed, the rotation direction, and the rotation angle) of the motor 213 is controlled by a control device (not illustrated), the pulse signal is controlled to be a target value (desired state). For example, the output shaft of the motor 213 is rotated by a desired rotation angle by rotating the output shaft of the motor 213 so that the number of pulses of the output pulse signal becomes a predetermined value.

As illustrated in FIG. 18, the attachment fitting 202 includes a flat plate-shaped attachment plate portion 283, and a plurality of (four in the present embodiment) leg portions 284.

The attachment plate portion 283 includes a cylinder insertion hole 283a, and a fixing hole portion through which a fastening element such as a screw can be inserted. These holes penetrate the attachment plate portion 283 in the thickness direction.

The cylinder insertion hole 283a is a hole through which the above-described cylindrical portion 230 can be substantially exactly inserted. The fixing hole portion is formed on the outer side of (around) the cylinder insertion hole 283a.

The leg portion 284 includes a standing plate-shaped portion 284a extending from an edge portion of the attachment plate portion 283, and a flat plate-shaped portion 284b formed by bending an extending end of the standing plate-shaped portion 284a. The standing plate-shaped portion 284a is a portion extending to one side (lower side in FIG. 18) in the thickness direction of the attachment plate portion 283. The flat plate-shaped portion 284b is a flat plate-shaped portion, and includes a hole through which a fastening element such as a screw can be inserted. The thickness direction of the flat plate-shaped portion 284b is the same as the vertical direction, and one main surface (lower surface in FIG. 18) of the flat plate-shaped portion 284b becomes a contact surface portion (contact surface part) that comes into contact with another member at the time of attachment.

Next, an assembly structure of the motor unit 200 of the present embodiment will be described.

As illustrated in FIG. 20, the motor 213 (refer to FIG. 19) is accommodated in the housing member 210. In this case, the drive gear portion 261 (the first shaft portion 260a) protrudes to the outside from the housing member 210.

Then, as illustrated in FIG. 21, the plurality of small gear members 215 are attached to the plate-shaped member 212, and the output member 214 is arranged above the plurality of small gear members. Then, the tooth train portions of the small gear members 215 and the inner side tooth train portion 271 of the output member 214 mesh with each other.

Subsequently, the gear-side plate-shaped portion 232 of the housing member 210 and the plate-shaped member 212 are made to overlap each other, the attachment hole 232a of the gear-side plate-shaped portion 232 and the attachment hole 211a of the connection pillar member 211 are made to overlap each other, and a temporary fastening element such as a screw is inserted therethrough. Thus, the unit main body portion 201 is formed.

Subsequently, as illustrated in FIG. 18, the attachment fitting 202 is attached to the unit main body portion 201. That is, the cylindrical portion 230 is inserted into the cylinder insertion hole 283a of the attachment fitting 202, and the attachment plate portion 283 is brought into contact with the attachment base portion 231 from the cylindrical portion 230 side. In this case, the motor unit 200 is formed by overlapping the fixing hole portion of the attachment plate portion 283 and the attachment hole 231a of the attachment base portion 231 and inserting a fastening element such as a screw (refer to FIG. 17).

In the motor unit 200, as illustrated in FIG. 19, a gear portion 291 formed by accommodating at least a part of the drive gear portion 261 and the plurality of small gear members 215 in the output member 214 is positioned below a motor portion 290 formed by accommodating the most part of the motor 213 in the accommodation space 245.

That is, the most part (more than half) of the gear portion 291 is at a position overlapping the motor portion 290 in plan view (position overlapping in the vertical direction in FIG. 19).

In this case, the first shaft portion 260a is inserted into the output shaft insertion hole 246 of the housing main body portion 210b and the shaft insertion hole 276 of the output member 214. That is, the first shaft portion 260a extends from the inside of the accommodation space 245 to the inside of the gear accommodation portion 270 through a gap portion between the housing main body portion 210b and the output member 214. Then, a part of the first shaft portion 260a is fitted into the inner hole of the second bearing member 241. A part of the drive gear portion 261 is positioned on the inner side of the third bearing member 278, and the other part is disposed inside the gear accommodation portion 270.

Figure 23A:
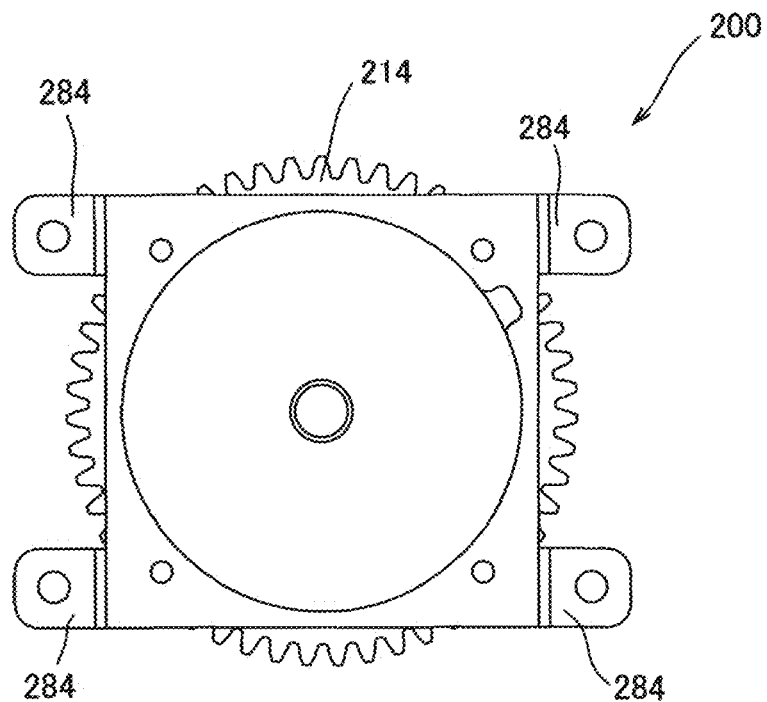
FIG. 23A is a plan view illustrating the motor unit of FIG. 17.
Figure 23B:
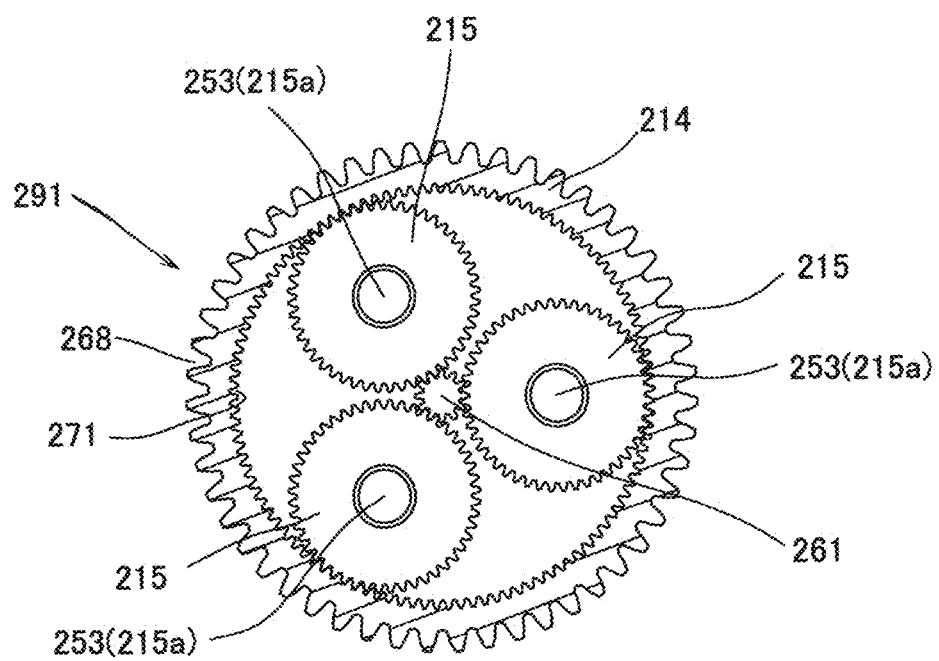
FIG. 23B is an explanatory view schematically illustrating the inside of the output member while breaking the output member of FIG. 17.

In the gear portion 291, as illustrated in FIGS. 19 and 23B, a plurality of (three) small gear members 215 is positioned around the drive gear portion 261, and meshes with each other. The plurality of (three) small gear members 215 also mesh with the inner side tooth train portion 271. Therefore, in a case where the drive gear portion 261 rotates by operating the motor 213, each of the plurality of small gear members 215 rotates, and the output member 214 rotates accordingly. In this case, the small gear member 215 rotates (autorotates) around the rotary shaft member 253. On the other hand, the small gear member 215 has a structure that does not move relative to the plate-shaped member 212 (refer to FIG. 21). That is, the small gear member 215 does not revolve around the drive gear portion 261.

Note that the rotation direction of the drive gear portion 261 is the same as the rotation direction of the output member 214 in plan view. That is, in a case where the drive gear portion 261 rotates clockwise in FIG. 23B, the output member 214 also rotates clockwise, and in a case where the drive gear portion 261 rotates counterclockwise in FIG. 23B, the output member 214 also rotates counterclockwise. Note that the rotation direction of the plurality of small gear members 215 is opposite to the rotation direction of the drive gear portion 261 in plan view. Further, the rotation speed of the output member 214 is slower than the rotation speed of the drive gear portion 261.

Further, the rotation center of the drive gear portion 261 and the rotation center of the output member 214 are at the same position. That is, the drive gear portion and the output member rotate around an axis A4 which is the vertical axis line (refer to FIG. 19).

In addition, in the motor unit 200 of the present embodiment, as illustrated in FIG. 18, a gap portion 295 is formed at a position between the gear-side plate-shaped portion 232 and the plate-shaped member 212 and between the two connection pillar members 211. That is, four gap portions 295 (two gap portions 295 are not illustrated) are formed respectively in the four directions. In other words, a portion in which the most part of the peripheral edge is a void is formed at a position adjacent to the motor portion 290 (a position adjacent to the lower side).

Then, a part of the output member 214 protrudes laterally outward from each gap portion 295. In other words, a part of the output member 214 protrudes laterally outward at a position between both ends (upper end and lower end) in the height direction of the motor unit 200.

Therefore, in the motor unit 200, as illustrated in FIG. 23A, a part of the output member 214 protrudes laterally outward in each of the four directions.

Figure 24A:
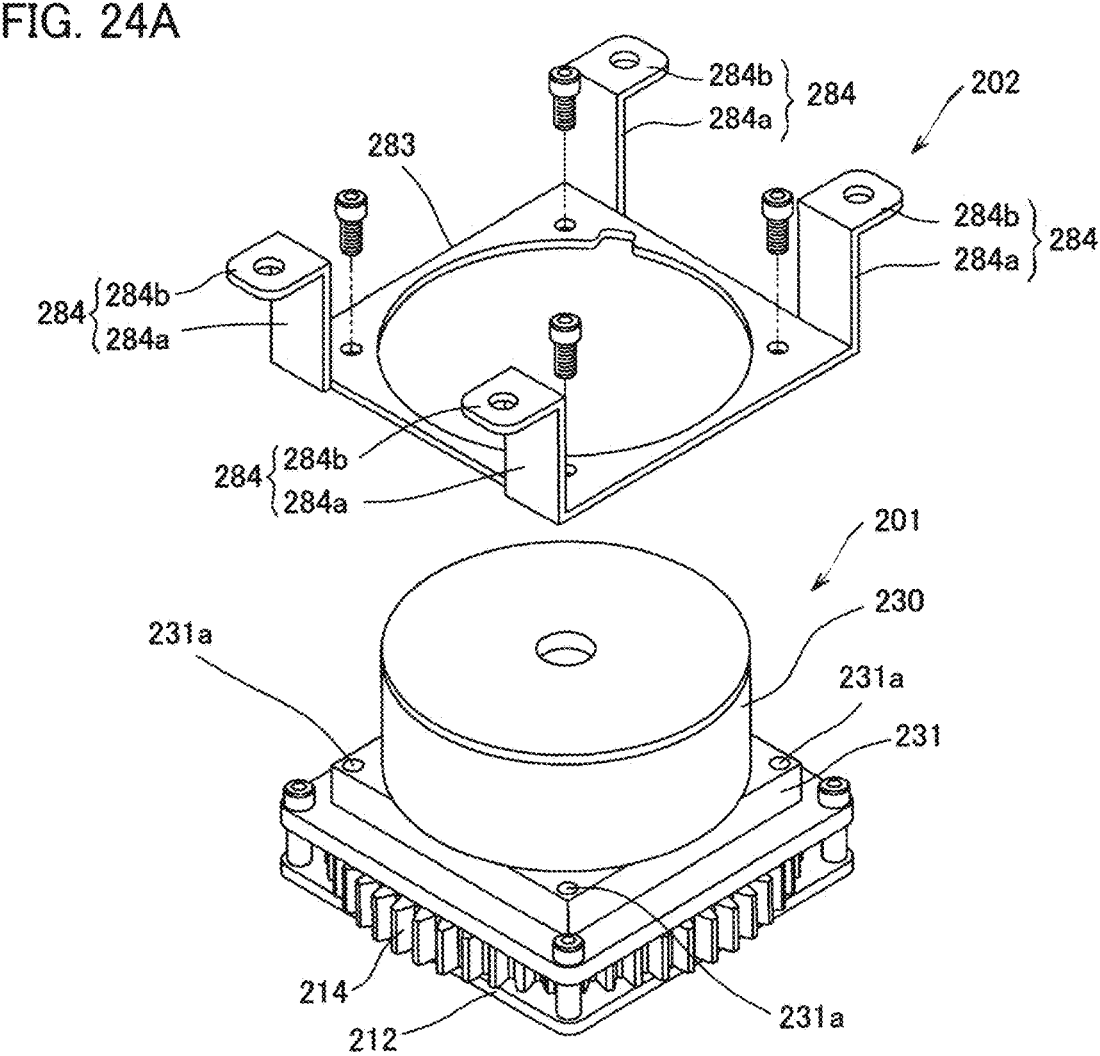
FIG. 24A is an explanatory view illustrating a state in which the attachment fitting is attached to the unit main body portion in a posture vertically opposite to that in FIG. 18.
Figure 24B:
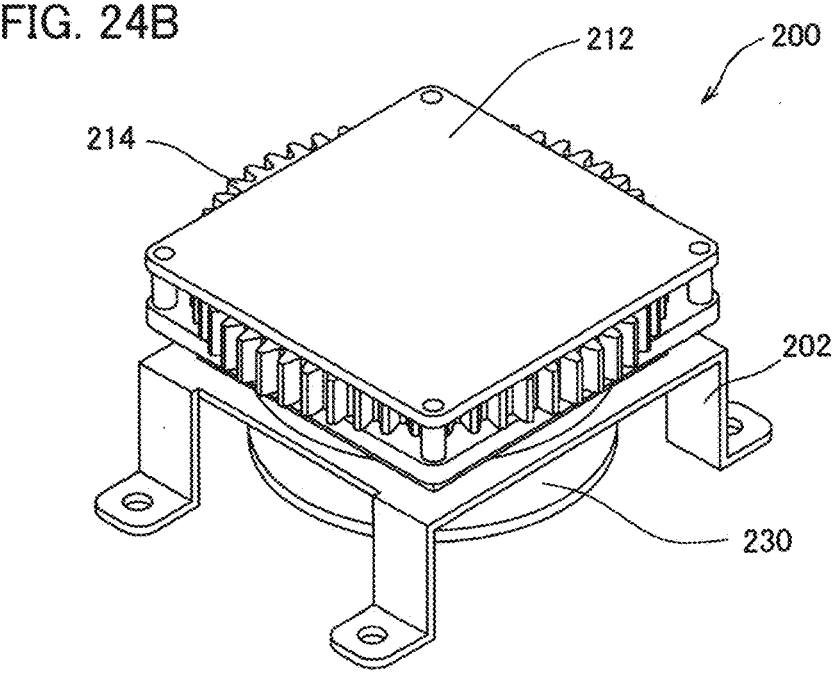
FIG. 24B is an explanatory view illustrating a state in which the motor unit of FIG. 18 is in a second posture.

As illustrated in FIGS. 17 and 24B, the motor unit 200 of the present embodiment can be used in a first posture (refer to FIG. 17) and in a second posture (refer to FIG. 24B).

As illustrated in FIG. 24, the second posture is a posture in which the attachment fitting 202 is attached, in a vertically opposite posture, to the unit main body portion 201 in a posture in which the cylindrical portion 230 faces upward, and the entire motor unit 200 is turned upside down. That is, in the second posture, the unit main body portion 201 takes a posture vertically opposite to the first posture, and the attachment fitting 202 takes the same posture as the first posture.

By changing the posture of the motor unit 200 between the first posture and the second posture, the arrangement height of the output member 214 can be changed. As a result, it is possible to switch between the state of transmitting the power to the above-described first power transmission portion 4a (refer to FIG. 1) and the state of transmitting the power to the second power transmission portion 3a (refer to FIG. 1), and the use as the traveling motor 41 and the use as the turning motor 42 are possible.

That is, the output member 214 is disposed at a position close to one end of the unit main body portion 201 in the vertical direction (a position close to the lower end in the first posture and a position close to the upper end in the second posture).

Figure 25A:
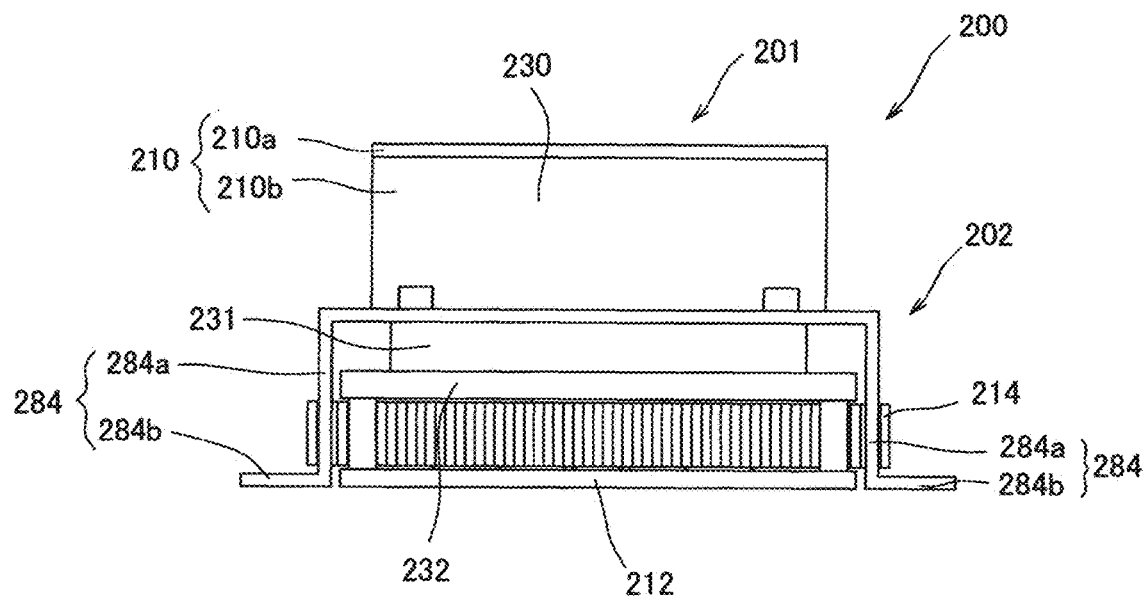
FIG. 25A is a side view illustrating the motor unit in the first posture of FIG. 17.
Figure 25B:
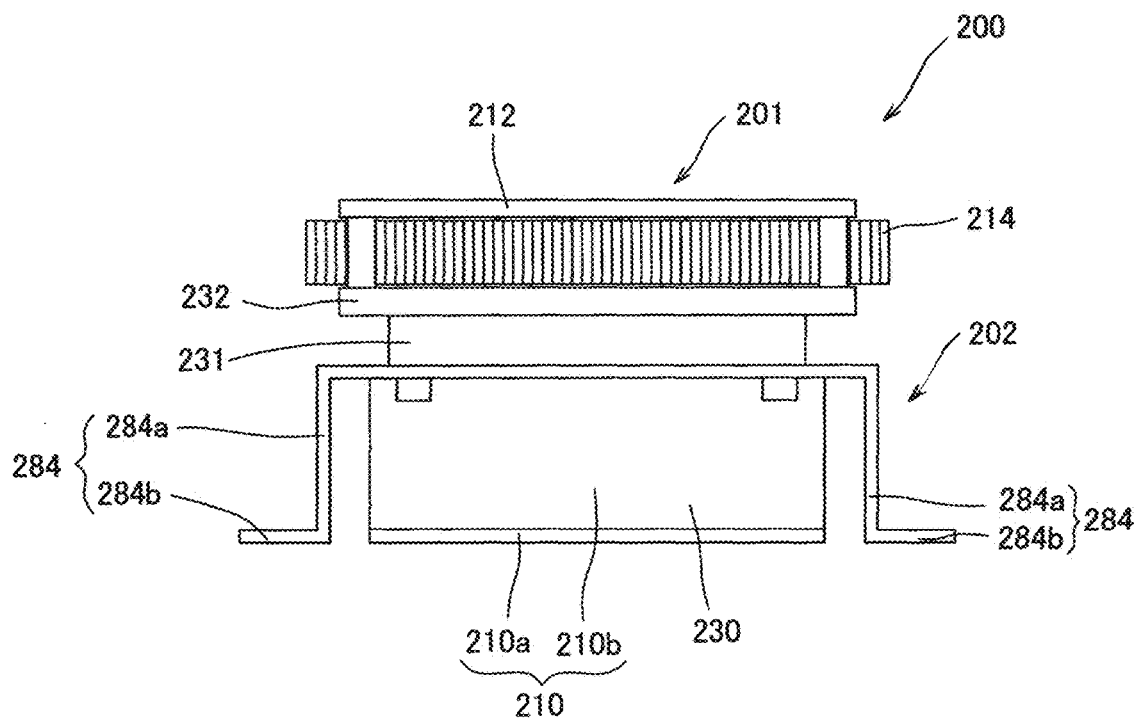
FIG. 25B is a side view illustrating the motor unit in the second posture of FIG. 24.

In the present embodiment, as illustrated in FIG. 25, one main surface (the lower surface, the contact surface part) of the flat plate-shaped portion 284b is positioned flush with the lower end portion of the unit main body portion 201 in both the first posture and the second posture.

In the first posture, one main surface (the lower surface) of the plate-shaped member 212 serves as the lower end portion of the unit main body portion 201, and in the second posture, the lower surface of the lid portion 210a serves as the lower end portion of the unit main body portion 201. Thus, the overall height of the motor unit 200 can be reduced in any posture.

Next, a motor unit 400 according to another embodiment different from the above-described motor unit 200 will be described in detail. In the following description, unless otherwise specified, the description will be given with reference to the posture of FIG. 26.

Figure 26A:
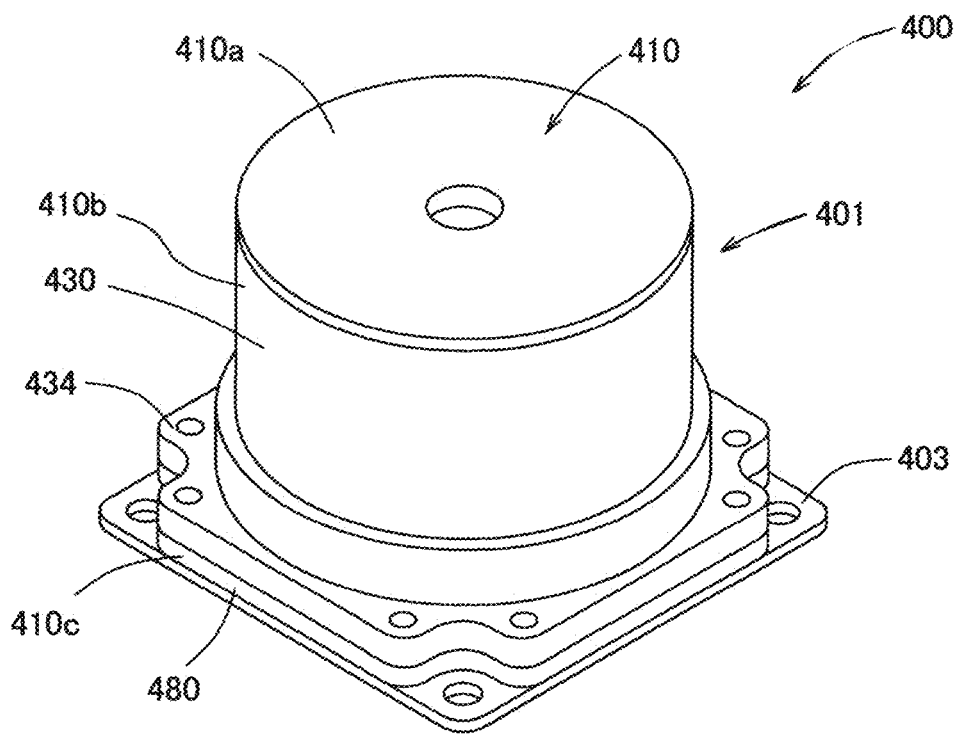
FIGS. 26A and 26B are views illustrating a motor unit according to an embodiment different from FIG. 17, where
Figure 26B:
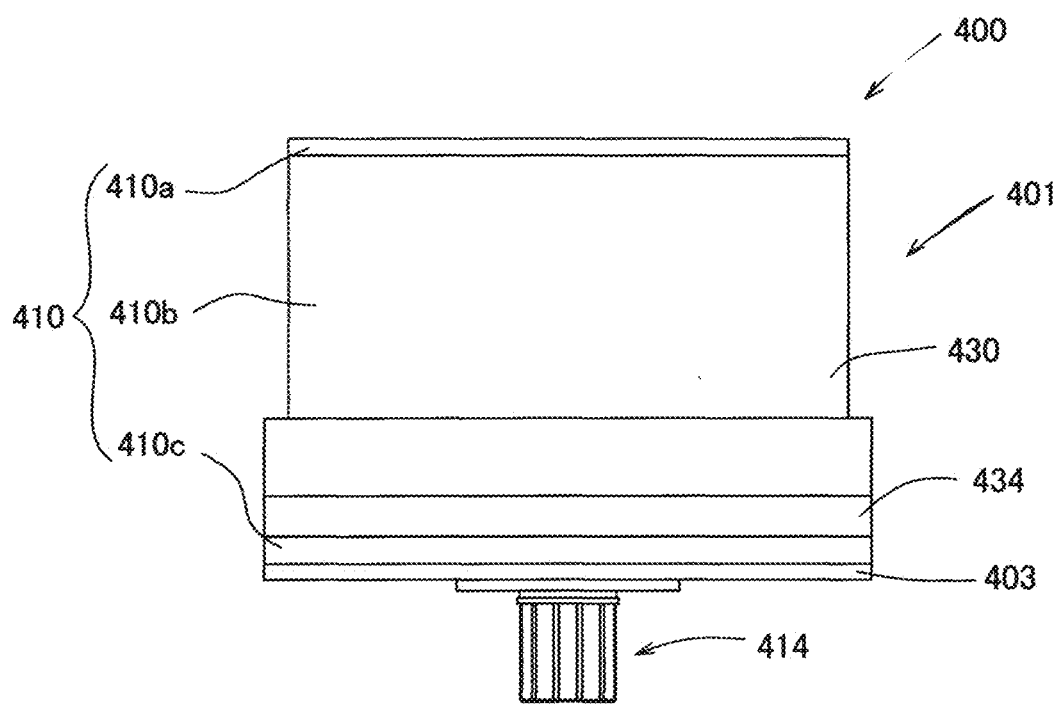

As illustrated in FIG. 26, the motor unit 400 includes a unit main body portion 401, and an attachment plate member 403.

Figure 27:
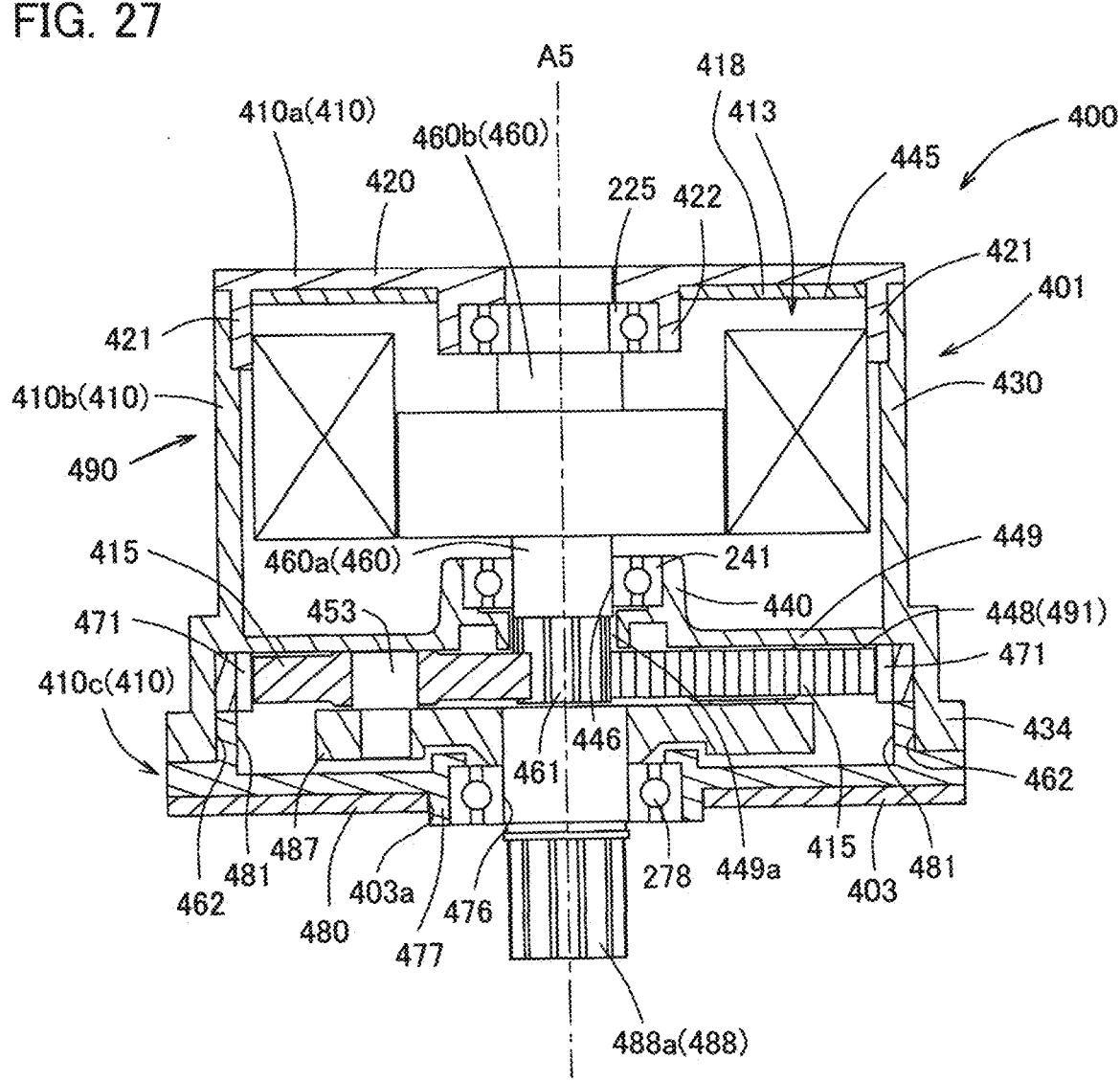
FIG. 27 is a cross-sectional view illustrating the motor unit of FIG. 26.

As illustrated in FIGS. 26 and 27, the unit main body portion 401 includes a housing member 410, a motor 413 (drive motor, refer to FIG. 27), an output member 414, and a plurality of small gear members 415 (small gear portions, refer to FIG. 27). A substrate member 418 is incorporated in the housing member 410 together with the motor 413.

The housing member 410 includes a lid portion 410a, a housing main body portion 410b, and an output-side closing portion 410c.

The lid portion 410a is a member substantially similar to the above-described lid portion 210a, and overlapping detailed description will be omitted. That is, as illustrated in FIG. 27, the lid portion 410a includes a lid plate portion 420, an insertion piece 421, and a bearing attachment portion 422. The first bearing member 225 is fitted substantially exactly into the bearing attachment portion 422. The lid portion 410a is detachable from the housing main body portion 410b.

Focusing on the external shape of the housing main body portion 410b, as illustrated in FIG. 26, the housing main body portion 410b includes a cylindrical portion 430, and a flange portion 434.

The cylindrical portion 430 is a substantially cylindrical portion extending in the vertical direction. In the present embodiment, a part on the flange portion 434 side is thicker (larger in diameter) than a part on the lid portion 410a side. That is, the outer peripheral surface on the lid portion 410a side and the outer peripheral surface on the flange portion 434 side are continuous via a step.

The flange portion 434 is a flat plate-shaped portion projecting outward from the outer peripheral surface of the cylindrical portion 430, and has a thickness in the vertical direction. An attachment hole penetrating the flange portion 434 is formed in an appropriate portion of the flange portion 434. The attachment hole is a hole through which a fastening element such as a screw can be inserted.

The housing main body portion 410b is a hollow member, and has a motor accommodation space 445, a gear accommodation space 448 (gear accommodation portion), and an attachment piece insertion space 462 therein as illustrated in FIG. 27. A partition wall portion 449 is provided between the motor accommodation space 445 and the gear accommodation space 448.

Both the motor accommodation space 445 and the gear accommodation space 448 are spaces formed inside the cylindrical portion 430. A communication hole 449a penetrating the partition wall portion 449 in the thickness direction is formed in the partition wall portion 449, a bearing attachment portion 440 is formed above the communication hole.

The bearing attachment portion 440 is a bottomed cylindrical portion provided to protrude further upward from an upper side (the lid portion 410a side) portion of the partition wall portion 449. That is, the bearing attachment portion 440 has a recess portion depressed toward the lower side (the output member 414 side) at the center, and a bearing member (the second bearing member 241 in the present embodiment) can be fitted into the recess portion. The opening of the communication hole 449a is positioned at the bottom of the recess portion. The second bearing member 241 is substantially exactly fitted into the bearing attachment portion 440, and is integrally attached.

The inner hole of the second bearing member 241 and the communication hole 449a are continuous to form a shaft insertion hole 446 that allows communication between the motor accommodation space 445 and the gear accommodation space 448.

Also in the present embodiment, in a state where the housing main body portion 410b is attached to the lid portion 410a, the bearing attachment portion 422 of the lid portion 410a and the bearing attachment portion 440 of the housing main body portion 410b are arranged at positions overlapping each other in plan view. The first bearing member 225 and the second bearing member 241 are also arranged at positions overlapping each other in plan view.

Figure 28:
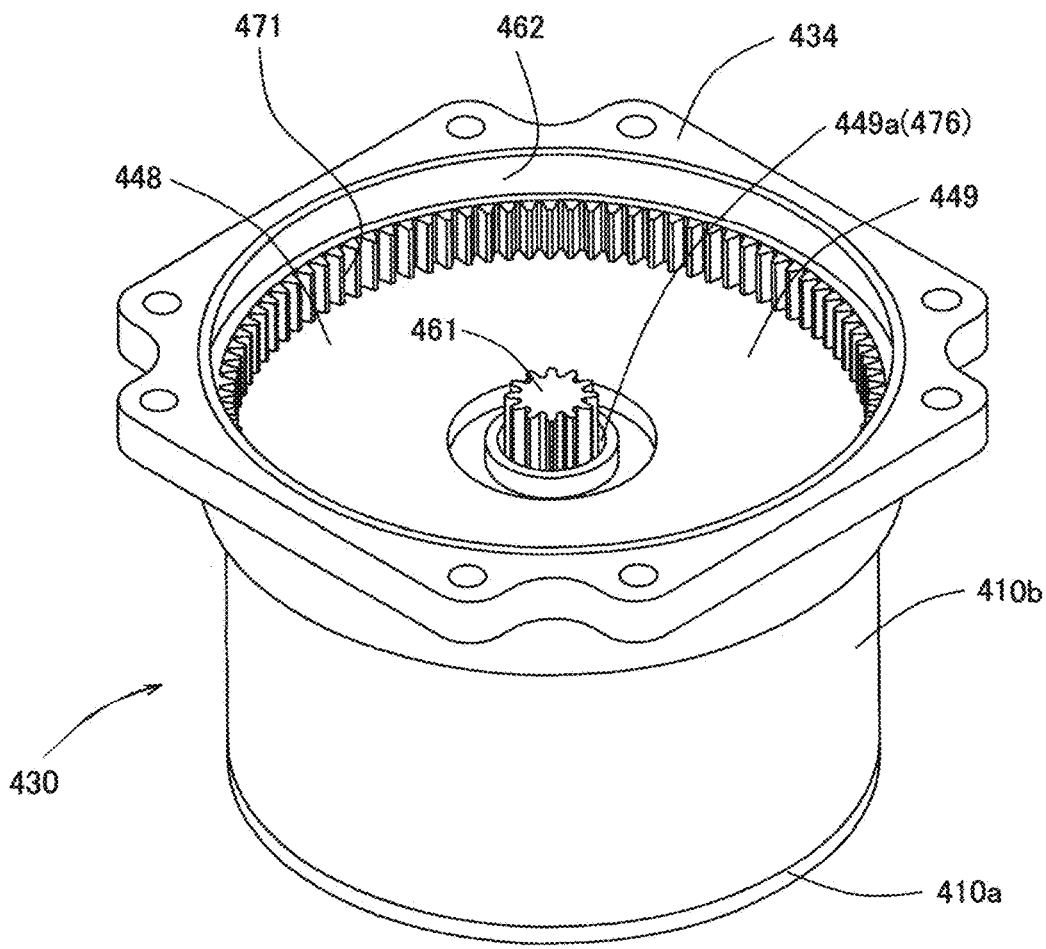
FIG. 28 is a perspective view illustrating a state in which a portion of the motor unit of FIG. 26 upper than the housing main body portion is viewed from a lower side.

As illustrated in FIG. 28, the gear accommodation space 448 is surrounded by an inner side tooth train portion 471 (inner tooth train portion). The inner side tooth train portion 471 is formed by arranging a plurality of teeth in an annular shape (circularly annular shape). The inner side tooth train portion 471 is formed in an inner wall portion extending in an annular shape inside the housing main body portion 410b, and is integrally inseparable from the housing main body portion 410b (the housing member 410). Specifically, each tooth belonging to the inner side tooth train portion 471 protrudes inward from the inner peripheral surface of the inner wall portion.

Note that the attachment piece insertion space 462 is positioned at a position (the position is on the upper side in FIG. 28, and is on the output member 414 side at the time of assembly) further below the gear accommodation space 448. The attachment piece insertion space 462 is a space having a longer length in a radial direction than the gear accommodation space 448. That is, the inner wall portion of the attachment piece insertion space 462 and the inner wall portion of the gear accommodation space 448 (the portion positioned on the outer side of the inner side tooth train portion 471) are continuous via a step.

Figure 29:
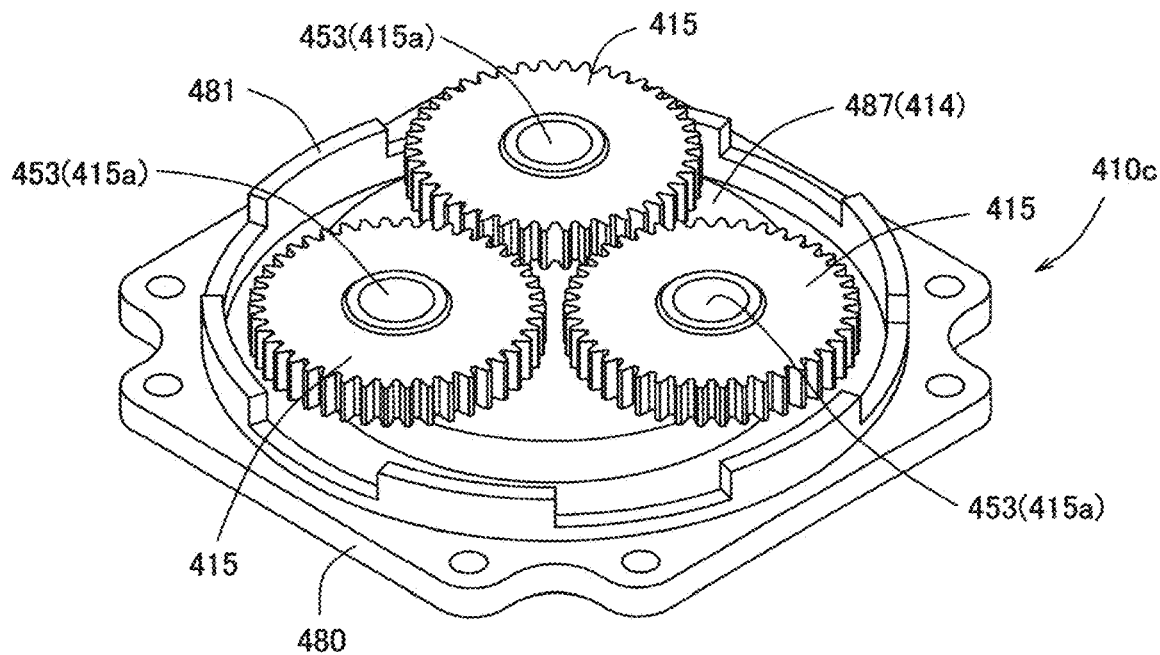
FIG. 29 is a perspective view illustrating an output-side closing portion of the housing member and a peripheral portion thereof in the motor unit of FIG. 26.

As illustrated in FIG. 29, the output-side closing portion 410c includes a base plate portion 480, and an insertion piece portion 481.

The base plate portion 480 is a substantially quadrangular flat plate-shaped portion whose four corners are missing.

The insertion piece portion 481 is a standing wall-shaped portion protruding upward from the main surface on the upper side (the motor 413 side at the time of assembly) of the base plate portion 480, and is a standing wall-shaped portion continuous in an annular shape. In the upper portion of the insertion piece portion 481, missing portions are provided at respective positions spaced apart in the circumferential direction of the insertion piece portion 481. The missing portion is a portion depressed toward the base plate portion 480.

In addition, a portion of the base plate portion 480 positioned on the outer side of the insertion piece portion 481 has a shape in plan view which is substantially the same as the shape of the above-described flange portion 434 (refer to FIG. 28 and the like). An attachment hole penetrating the base plate portion 480 is formed in an outer portion of the base plate portion 480. The attachment hole is a hole through which a fastening element such as a screw can be inserted.

That is, the base plate portion 480 and the flange portion 434 are made to vertically overlap each other, the attachment holes formed in the base plate portion and the flange portion are made to overlap each other to form the communication hole, and the fastening element is inserted therethrough, so that the output-side closing portion 410c can be attached to the housing main body portion 410b.

In the upper surface of the base plate portion 480, a portion on the outer side of the insertion piece portion 481 is arranged at a higher position than a portion on the inner side of the insertion piece portion 481.

Here, as illustrated in FIG. 27, the output-side closing portion 410c includes a bearing attachment portion 477. Specifically, the bearing attachment portion 477 has a substantially cylindrical short cylindrical portion protruding downward from one main surface of the base plate portion 480 (detailed illustration is omitted). In addition, bearing attachment portion has a protrusion portion protruding upward from the other main surface of the base plate portion 480. A recess portion depressed upward from a protruding end (lower end) of the short cylindrical portion is formed, and the recess portion is a recessed portion into which the third bearing member 278 can be substantially exactly fitted.

The bottom portion of the recess portion is formed by the above-described protrusion portion. The above-described protrusion portion is provided with a through-hole that allows communication between the upper space of the base plate portion 480 and the inner portion of the recess portion. That is, the through-hole and the inner hole of the third bearing member 278 are continuous to form an output shaft insertion hole 476.

Both ends of the housing main body portion 410b in the vertical direction (the height direction, the longitudinal direction) are opened to the outside, and an opening portion allowing communication between the inside and the outside is formed. Then, the most part of one opening portion can be closed by mounting the lid portion 410a, and the most part of the other opening portion can be closed by attaching the output-side closing portion 410c.

The motor 413 is substantially the same as the motor 213 described above, and a detailed description thereof will be omitted. That is, the motor 413 also includes a shaft portion 460. The shaft portion 460 includes a first shaft portion 460a (output shaft) protruding outward from one side of the rotating body, and a second shaft portion 460b protruding outward from a side opposite to the first shaft portion 460a. The first shaft portion 460a is a portion serving as an output shaft of the motor 413. Also in the shaft portion 460, each of two portions separated in the longitudinal direction is inserted into the bearing member.

In addition, similarly to the above-described motor 213, a drive gear portion 461 (drive gear) is formed in a portion of the first shaft portion 460a on the distal end side in the protrusion direction.

Figure 30A:
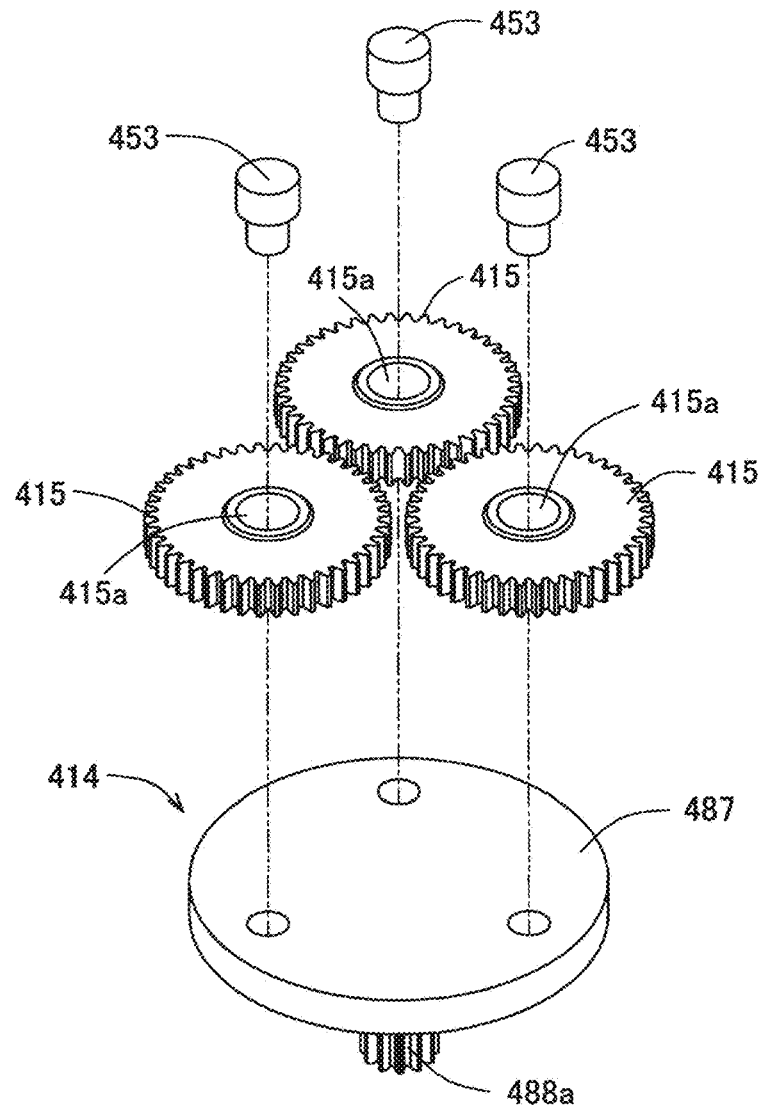
FIG. 30A is a perspective view illustrating a state in which a plurality of small gear members are attached to an output member.

As illustrated in FIG. 30, the output member 414 includes a substrate portion 487 (plate-shaped portion), and an output shaft portion 488.

The substrate portion 487 is a flat plate-shaped portion, and is a circular plate-shaped portion in the present embodiment. The plurality of small gear members 415 are arranged on one main surface side of the substrate portion 487, and the output shaft portion 488 is arranged on the other main surface side opposite to the one main surface side.

Figure 30B:
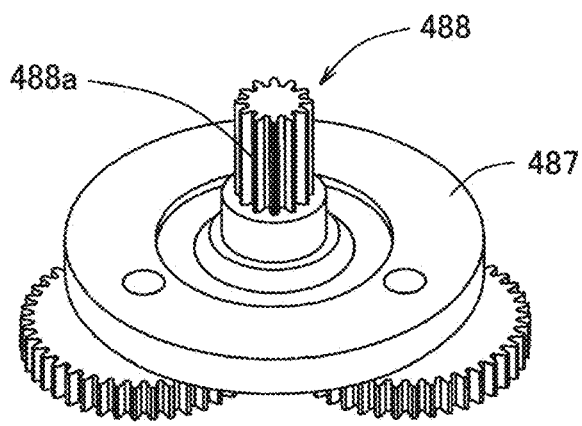
FIG. 30B is a perspective view of the member formed by attaching the plurality of small gear members to the output member as viewed from a direction different from that of FIG. 30A.

As illustrated in FIG. 30B, a recess portion surrounding the output shaft portion 488 is formed on the other main surface of the substrate portion 487. The recess portion is continuous in an annular shape.

A part of the output shaft portion 488 is positioned inside the substrate portion 487 (refer to FIG. 27), and a part of the output shaft portion 488 is exposed to the outside of the substrate portion 487. The portion exposed to the outside protrudes outward from one main surface of the substrate portion 487. The output shaft portion 488 has an output gear portion 488a (output tooth train portion) formed at a portion on the protruding end side. Note that the output gear portion 488a of the present embodiment is obtained by forming the tooth train on the outer peripheral surface of the output shaft portion 488, but a separately formed gear member may be integrally attached. In a case where the output shaft portion 488 rotates, the output gear portion 488a also rotates.

In the output member 414, the substrate portion 487 and the output shaft portion 488 are integrally formed, and the output shaft portion 488 does not rotate relative to the substrate portion 487. That is, in a case where the substrate portion 487 rotates around the vertical axis positioned at the center in the radial direction, the output shaft portion 488 also rotates in the circumferential direction of the same vertical axis (details will be described later).

The small gear member 415 is a disk-shaped gear, has a tooth train portion in an outer peripheral portion, and has a shaft insertion hole 415a formed on the center side, as illustrated in FIG. 30.

As illustrated in FIG. 26, the attachment plate member 403 is a thin plate-shaped member of which the shape in plan view is a substantially rounded quadrangular shape. Attachment holes penetrating the attachment plate member 403 in the thickness direction are formed in portions near the four corners. The attachment hole is a hole through which a fastening element such as a screw can be inserted. As illustrated in FIG. 27, the attachment plate member 403 has an insertion hole portion 403a. The insertion hole portion 403a is a hole penetrating the attachment plate member 403 in the thickness direction, and is a hole through which a lower portion (short cylindrical portion) of the bearing attachment portion 477 can be inserted.

In the present embodiment, the substrate member 418 is attached to the lid portion 410a, and is accommodated in the motor accommodation space 445 together with the motor 413. The substrate member 418 is a member substantially similar to the above-described substrate member 218, and overlapping detailed description will be omitted.

Next, an assembly structure of the motor unit 400 of the present embodiment will be described.

As illustrated in FIG. 28, the motor 413 (refer to FIG. 27) is accommodated in the housing main body portion 410*b*.

In addition, as illustrated in FIG. 30, the plurality of small gear members 415 is attached to the substrate portion 487 of the output member 414 via a rotary shaft member 453 (shaft member). The rotary shaft member 453 is a rod-shaped member extending in the vertical direction, and two portions (columnar portions) having different thicknesses (diameters) are continuously formed. Then, as illustrated in FIG. 27, the upper portion is positioned above one main surface (upper surface) of the substrate portion 487, and the lower portion is positioned inside the substrate portion 487.

The small gear member 415 is rotatable around the rotary shaft member 453 as a rotary shaft.

Further, as illustrated in FIG. 29, the output member 414 to which the small gear members 415 are attached is placed on the output-side closing portion 410*c*. In this case, the output shaft portion 488 is inserted into the output shaft insertion hole 476 (refer to FIG. 27). In the substrate portion 487, a small portion adjacent to the output shaft portion 488 is in contact with the third bearing member 278 (the output-side closing portion 410*c*) from above, while the other portion is not in contact with the output-side closing portion 410*c*. That is, substantially the entire lower side of the substrate portion 487 is disposed at a position separated upward from the output-side closing portion 410*c*.

Then, as described above, the output-side closing portion 410*c* is attached to the housing main body portion 410*b*. That is, as illustrated in FIG. 26, the base plate portion 480 and the flange portion 434 are made to vertically overlap each other, and the fastening element is inserted and attached thereto. In this case, the insertion piece portion 481 (refer to FIGS. 27 and 29) of the output-side closing portion 410*c* is inserted into the attachment piece insertion space 462 (refer to FIGS. 27 and 28) of the housing main body portion 410*b*. As illustrated in FIG. 27, the insertion piece portion 481 abuts on the inner wall portion of the attachment piece insertion space 462 from the inside, and abuts on a portion positioned on the outer side of the inner side tooth train portion 471 from the lower side.

In this manner, the unit main body portion 401 is formed. Then, as illustrated in FIGS. 26 and 27, the motor unit 400 is formed by attaching the attachment plate member 403 to the base plate portion 480 positioned on the lower side of the unit main body portion 401.

In the motor unit 400 of the present embodiment, as illustrated in FIG. 27, a gear portion 291 formed by accommodating at least a part of the drive gear portion 461 and the plurality of small gear members 415 in the gear accommodation space 448 is positioned below a motor portion 490 formed by accommodating the most part of the motor 413 in the motor accommodation space 445. Then, the most part (more than half) of the gear portion 491 is at a position overlapping the motor portion 490 in plan view (position overlapping in the vertical direction in FIG. 27).

In this case, the first shaft portion 460*a* is inserted into the shaft insertion hole 446. That is, a part of the first shaft portion 460*a* is fitted into the inner hole of the second bearing member 241.

Figure 31:
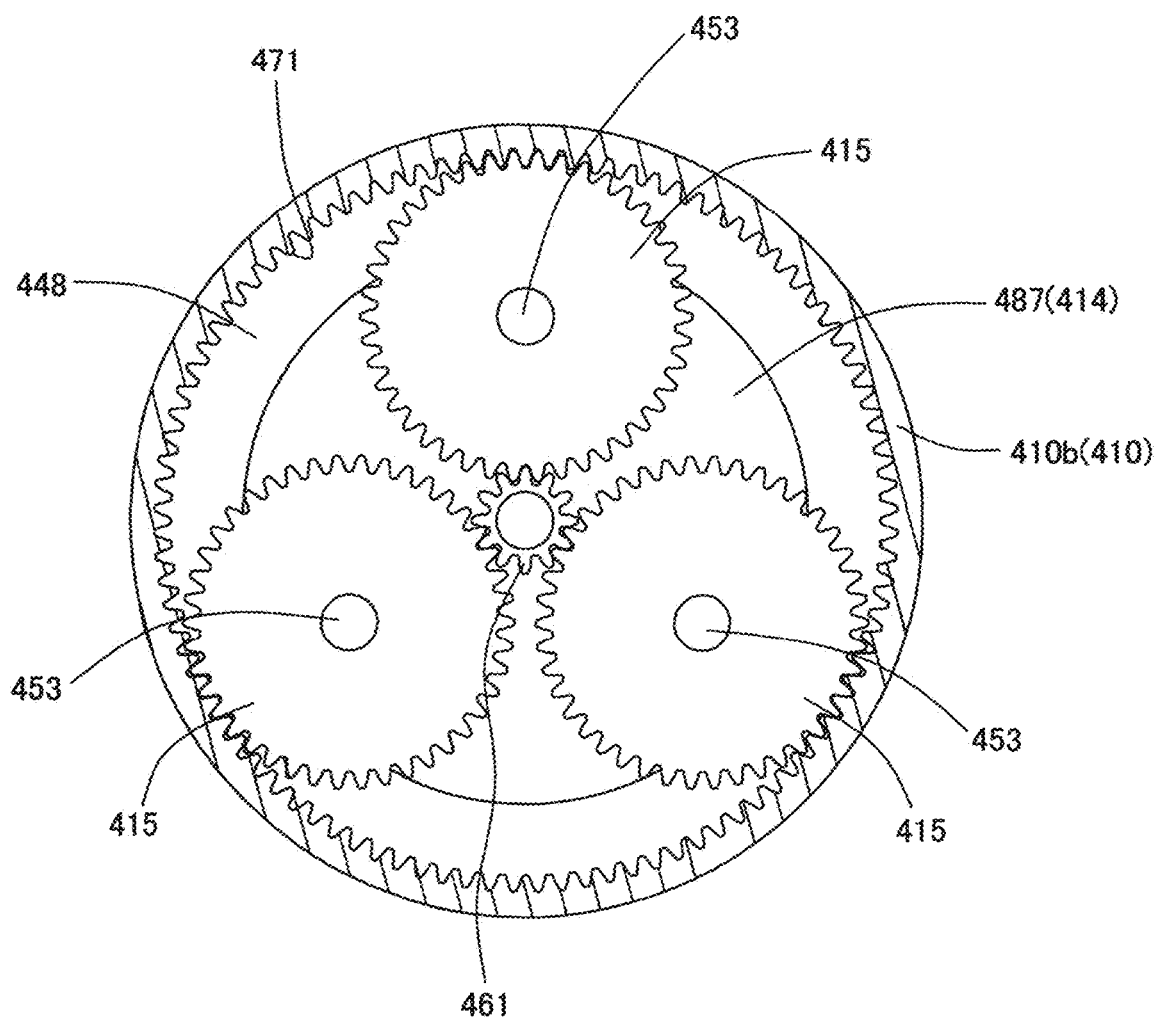
FIG. 31 is an explanatory view schematically illustrating the output member and the inside of the gear accommodation space of FIG. 27.

In the gear portion 491, as illustrated in FIGS. 27 and 31, a plurality of (three) small gear members 415 are positioned around the drive gear portion 461, and mesh with each other.

The plurality of (three) small gear members 415 also mesh with the inner side tooth train portion 471.

In the present embodiment, in a case where the drive gear portion 461 rotates by operating the motor 413, the plurality of small gear members 415 revolves around the drive gear portion 461 while rotating. That is, all the small gear members 415 move (revolve) while turning around the drive gear portion 461 when the small gear members 415 rotate (rotate) around the rotary shaft member 453 as a rotary shaft.

Along with the revolution of the small gear members 415, the plurality of (three) rotary shaft members 453 integrally fixed to the substrate portion 487 also move around the drive gear portion 461. The plurality of rotary shaft members 453 are made to simultaneously move around the drive gear portion 461, so that the substrate portion 487 rotates, and as a result, the output shaft portion 488 also rotates.

In this case, the rotation center of the drive gear portion 461 and the rotation center of the output member 414 (the substrate portion 487, the output shaft portion 488) are at the same position. The drive gear portion and the output member rotate around an axis A5 which is the vertical axis line (refer to FIG. 27).

Note that the rotation direction of the drive gear portion 461 is the same as the rotation direction of the output member 414 (the output shaft portion 488) in plan view. That is, in a case where the drive gear portion 461 rotates clockwise in FIG. 31, the output member 414 also rotates clockwise, and in a case where the drive gear portion 461 rotates counterclockwise in the same plan view, the output member 414 also rotates counterclockwise. Note that the rotation direction of the plurality of small gear members 415 in the rotation is opposite to the rotation direction of the drive gear portion 461 in plan view. The moving direction of the plurality of small gear members 415 in the revolution is the same as the rotation direction of the drive gear portion 461. Then, the rotation speed of the output member 414 is slower than the rotation speed of the drive gear portion 461.

Figure 32:
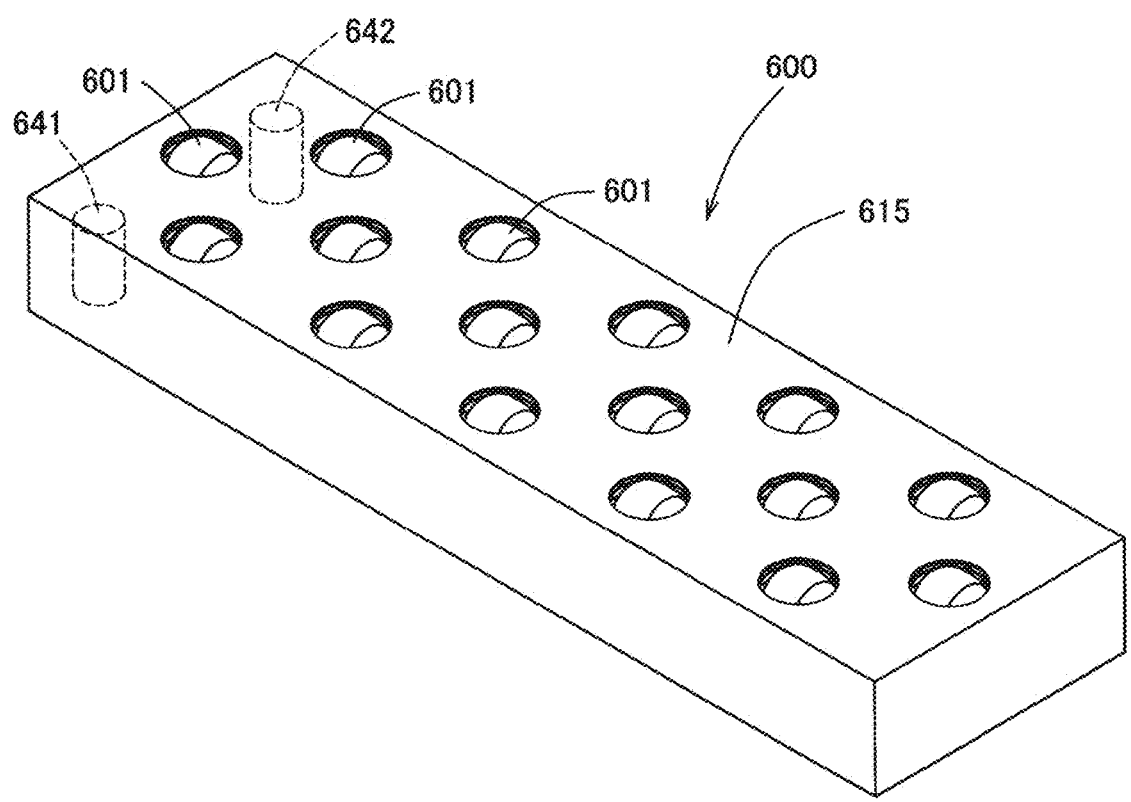
FIG. 32 is a perspective view illustrating a conveyance device according to an embodiment different from the conveyance device of FIG. 13.

The motor unit 400 of the present embodiment is not particularly limited, but can be used as a traveling motor 641, and a turning motor 642 (posture changing motor) in a conveyance device 600 as illustrated in FIG. 32.

The conveyance device 600 is a transfer device (conveyance direction switching device) capable of changing the conveyance direction, and is formed by arranging a large number of small-sized small conveyance devices 601 (conveyance units) in a planar shape. For convenience of drawing, only some small conveyance devices 601 are denoted by reference signs, and reference signs to the others are omitted.

Figure 33:
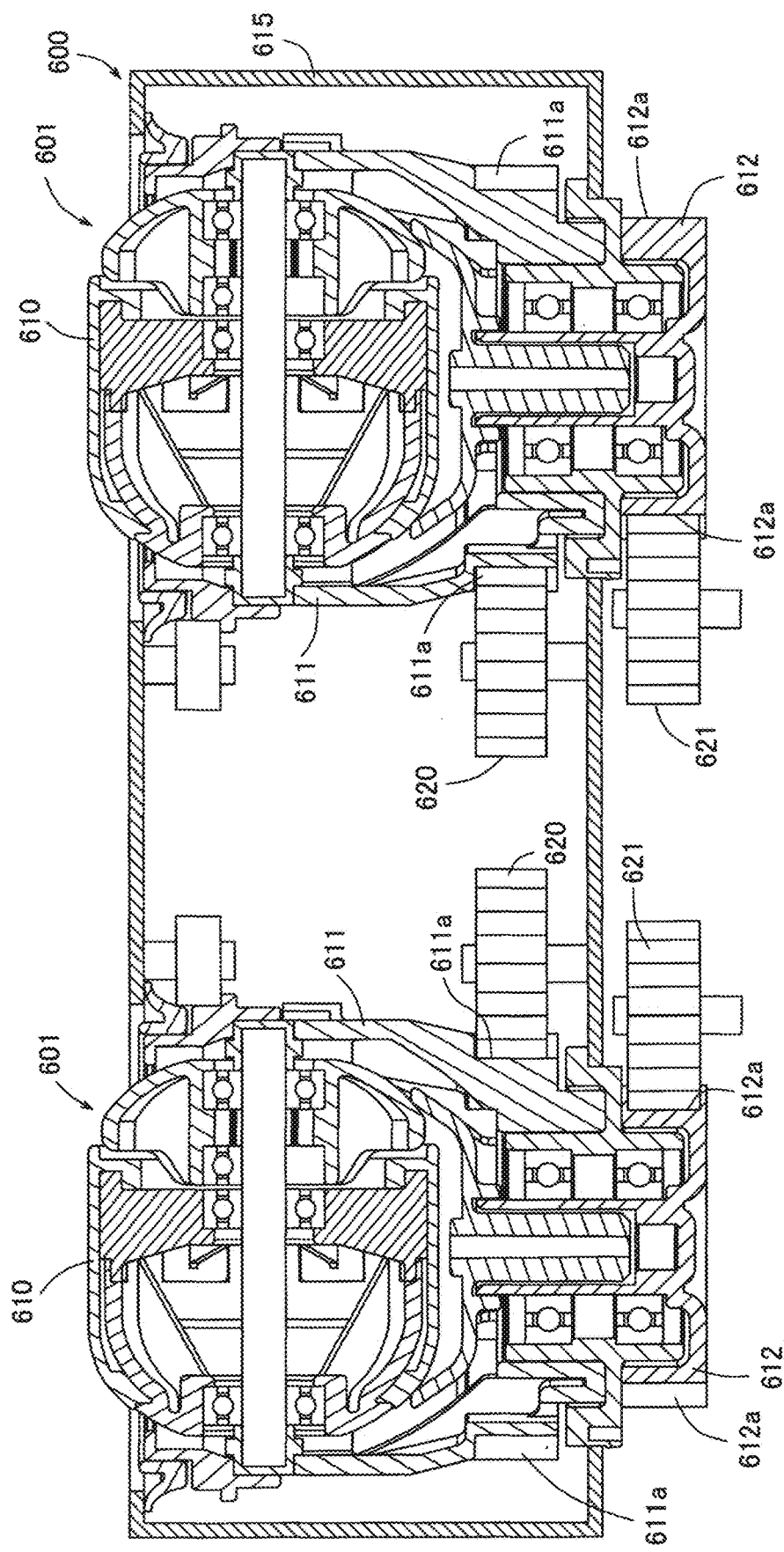
FIG. 33 is a cross-sectional view of the conveyance device of FIG. 32.

As illustrated in FIG. 33, the small conveyance device 601 includes a roller portion 610 (rotating body), a roller receiving member 611, and a driving force transmission member 612. The most part of the small conveyance device 601 is arranged inside a housing member 615, and a part of the upper side and a part of the lower side are positioned outside the housing member 615.

The roller portion 610 (rotating body) is pivotally supported by the roller receiving member 611. The roller receiving member 611 has a gear portion 611*a* on the outer peripheral surface. That is, a tooth train portion formed by arranging a plurality of teeth in an annular shape (annular shape) is provided. Then, in a case where the rotational force is applied to the gear portion 611*a* (in a case of rotating around the axis which is the vertical axis line), the entire roller portion 610 rotates together with the rotary shaft. That is, similarly to the conveyance unit 1 described above, the roller portion 610 turns, and the conveyance direction can be changed.

The driving force transmission member 612 has a gear portion 612a on the lower side, and a part of the upper side is in contact with the roller portion 610. As the gear portion 612a rotates, the rotational force is transmitted to the roller portion 610, and the roller portion 610 is rotationally driven around the rotary shaft. That is, it is possible to apply force to the object placed on the roller portion 610.

That is, in the conveyance device 600, by turning the roller receiving members 611 of the plurality of small conveyance devices 601, the plurality of roller portions 610 turn together with the roller receiving members 611 to change the posture, and the orientations of the plurality of roller portions 610 are changed all at once. As a result, the conveyance direction of the object is changed.

In addition, the roller portions 610 of the plurality of small conveyance devices 601 rotate synchronously around the respective rotary shafts, whereby the object on the conveyance device 600 can be given force and be moved.

Specifically, the gear portion 611a of the roller receiving member 611 meshes with an external gear member 620, and the rotational force is applied from the gear member 620 so that the gear portion 611a rotates.

That is, the gear member 620 may be arranged between the output gear of the turning motor 642 and the gear portion 611a or between the gear portions 611a of the two different small conveyance devices 601. The plurality of roller portions 610 may turn together with the rotary shaft by operating the turning motor 642. That is, the gear portions 611a of all the small conveyance devices 601 may be engaged with each other via the gear member 620 (idle gear) to form one gear train as a whole. Further, by the rotation of any gear by the driving of the turning motor 642, the roller receiving members 611 of all the small conveyance devices 601 may turn (rotate) by a predetermined angle, and the orientations thereof may be changed all at once.

The output gear of the turning motor 642 and the gear portion 612a may directly mesh with each other.

In a case where the above-described motor unit 400 is adopted as the turning motor 642, it is not particularly limited, but it is preferable to provide an interlocking member such as the gear member 620 between the output gear portion 488a and the gear portion 611a.

Further, the gear portion 612a of the driving force transmission member 612 meshes with an external gear member 621, and the rotational force is applied from the gear member 621 so that the gear portion 612a rotates.

That is, the gear member 621 may be arranged between the output gear of the traveling motor 641 and the gear portion 612a or between the gear portions 612a of the two different small conveyance devices 601. The plurality of roller portions 610 may rotate around the respective rotary shafts by operating the traveling motor 641. The output gear of the traveling motor 641 and the gear portion 612a may directly mesh with each other.

In a case where the above-described motor unit 400 is adopted as the traveling motor 641, it is not particularly limited, but it is preferable to provide an interlocking member such as the gear member 621 between the output gear portion 488a and the gear portion 612a.

EXPLANATION OF REFERENCE NUMBERS

1: Conveyance unit
2: Rotating body
2a: Main rotating portion
2b: Sub rotating portion
3: Support body
3a: Second power transmission portion
4: Driving body
4a: First power transmission portion
5: Rotational force transmission member
5a: Support body-side transmission portion
5b: Driving body-side transmission portion
10: Support shaft
11: Housing
14: Rotating body mounting member (power applying portion)
33: Main body
41: Traveling motor
42: Turning motor
50: Conveyance device
200, 400: Motor unit
201: Unit main body portion (motor unit main body portion)
202: Attachment fitting (attachment member)
210, 410: Housing member
213, 413: Motor (drive motor)
214, 414: Output member
215, 415: Small gear member (small gear portion)
260a, 460a: First shaft portion (output shaft)
261, 461: Drive gear portion (drive gear)
268: Output tooth train portion
270: Gear accommodation portion
271, 471: Inner side tooth train portion (inner tooth train portion)
283: Attachment plate portion
284: Leg portion
290, 490: Motor portion
291, 491: Gear portion
448: Gear accommodation space (gear accommodation portion)
453: Rotary shaft member (shaft member)
487: Substrate portion (plate-shaped portion)
488: Output shaft portion
488a: Output gear portion (output tooth train portion)

The invention claimed is:

1. A motor unit that can be used in a conveyance device, comprising:
   a drive motor;
   a drive gear;
   an inner tooth train portion having a continuously annular shape; and
   a plurality of small gear portions,
   the drive gear being provided on an output shaft of the drive motor,
   wherein the motor unit further includes: a motor portion; and a gear portion,
   the motor portion including a housing member accommodating at least a majority of the drive motor therein,
   the gear portion including:
   a space surrounded by the inner tooth train portion;
   at least a part of the drive gear in the space; and
   the plurality of small gear portions in the space, the plurality of small gear portions being positioned around the drive gear in the space,
   wherein each of the plurality of small gear portions meshes with the drive gear as well as the inner tooth train portion, thereby rotation of the drive gear causing rotation of each of the plurality of small gear portions, and
   wherein at least a part of the gear portion is at a position overlapping the motor portion in plan view, wherein the housing member includes a gear accommodation portion that accommodates at least a part of the drive gear and the plurality of small gear portions, and wherein the inner tooth train portion is provided on an inner peripheral surface of the gear accommodation portion.

2. The motor unit according to claim 1, further comprising an output member that outputs rotational force transmitted from the drive motor, wherein the output member includes:

a plate-shaped portion; and an output shaft portion that protrudes outward from one end portion of the plate-shaped portion in a thickness direction, an output tooth train portion for output being formed on a protruding end side of the output shaft portion, the plurality of small gear portions each being attached to the plate-shaped portion via a shaft member, wherein with rotation of the drive gear, the plurality of small gear portions each rotates around the shaft member while revolving around the drive gear, thereby this revolution of the small gear portions causing movement of the shaft member that generates rotation of the plate-shaped portion and the output shaft portion.

* * * * *